US012660794B2

(12) United States Patent
Baxter et al.

(10) Patent No.: US 12,660,794 B2
(45) Date of Patent: Jun. 23, 2026

(54) AUTOMATED LIQUID DISPENSING DEVICE

(71) Applicant: AUTOMATED PET CARE PRODUCTS, LLC, Auburn Hills, MI (US)

(72) Inventors: Brad Baxter, Bloomfield Hills, MI (US); Patrick McCormick, Clarendon Hills, IL (US)

(73) Assignee: AUTOMATED PET CARE PRODUCTS, LLC, Auburn Hills, MI (US)

( * ) Notice: Subject to any disclaimer, the term of this patent is extended or adjusted under 35 U.S.C. 154(b) by 89 days.

(21) Appl. No.: 18/851,842

(22) PCT Filed: Mar. 30, 2023

(86) PCT No.: PCT/US2023/016999
§ 371 (c)(1),
(2) Date: Sep. 27, 2024

(87) PCT Pub. No.: WO2023/192540
PCT Pub. Date: Oct. 5, 2023

(65) Prior Publication Data
US 2025/0234836 A1 Jul. 24, 2025

Related U.S. Application Data

(60) Provisional application No. 63/325,480, filed on Mar. 30, 2022.

(51) Int. Cl.
*A01K 7/02* (2006.01)
*C02F 1/00* (2023.01)
*C02F 1/32* (2023.01)

(52) U.S. Cl.
CPC ................ *A01K 7/02* (2013.01); *C02F 1/003* (2013.01); *C02F 1/32* (2013.01); *C02F 2303/02* (2013.01); *C02F 2303/04* (2013.01)

(58) Field of Classification Search
CPC ................................ A01K 7/02; B01F 33/841
(Continued)

(56) References Cited

U.S. PATENT DOCUMENTS 329,351 A * 10/1885 Williamson ............ F03B 7/003
198/702
2,877,051 A * 3/1959 Cushman ................ B05B 17/08
415/6
(Continued)

FOREIGN PATENT DOCUMENTS

CN 212116649 U 12/2020
JP 3221848 U 6/2019

OTHER PUBLICATIONS

International Search Report and Written Opinion, Application No. PCT/US23/16999, mailed Mar. 30, 2022.
(Continued)

*Primary Examiner* — Christopher D Hutchens
*Assistant Examiner* — Nevena Aleksic
(74) *Attorney, Agent, or Firm* — The Dobrusin Law Firm, P.C.; Daniela M. Thompson-Walters

(57) ABSTRACT

A liquid dispensing device (1) having a) a serving bowl (10) configured to retain liquid for consumption by an animal; b) a fresh tank (50) configured to store a fresh liquid therein; c) a used tank (80) configured to store a used liquid therein, wherein used liquid is the liquid which has already been available for consumption of the animal; and d) a carousel (100) having one or more circulation tubs (107) and one or more empty tubs (105), wherein the carousel is configured to rotate about its rotational axis (AR) in a first direction (D1) and in a second direction (D2) opposing the first direction.

25 Claims, 19 Drawing Sheets

(58) Field of Classification Search
USPC ............................................ 224/144.5, 318
See application file for complete search history.

(56) References Cited

U.S. PATENT DOCUMENTS

| | | | |
|---|---|---|---|
| 4,844,014 | A | 7/1989 | Gershman |
| 5,329,876 | A | 7/1994 | Tracy |
| 8,104,431 | B2 | 1/2012 | Klenotiz |
| 8,261,696 | B1 | 9/2012 | Lipscomb et al. |
| 8,381,685 | B2 | 2/2013 | Lipscomb et al. |
| 8,763,557 | B2 | 7/2014 | Lipscomb et al. |
| 9,113,610 | B2 | 8/2015 | Lipscomb |
| 11,026,400 | B1 * | 6/2021 | Riva ....................... F03B 7/003 |
| 2004/0182326 | A1 | 9/2004 | Polimeni, Jr. |
| 2007/0277738 | A1 | 12/2007 | Dentsbier |
| 2020/0068848 | A1 | 3/2020 | Sayers et al. |

OTHER PUBLICATIONS

International Preliminary Report on Patentability, Application No. PCT/US2023/016999, completed on May 10, 2024.
Dog Mate Large Resh Water Plastic Dog & Cat Fountain, 192oz; access Sep. 17, 2024 https://www.chewy.com/dog-mate-large-fresh-water-plastic/dp/154554?utm_source=goodle-product&utm_medium=cpc&utm_campaign=hg&utm_content=Dog9%20Mate&utm_term=&gelid=CjKCAjwxo6IBhBKEiwAXSYS-d0U9elvCet_lih4z0ofFiRADnjPXuXupfwRWyqeKpE8jxoCVo0QAvD_BwE¶.
Petlibro Automatic Dog & Cat Water Fountain, accessed Sep. 17, 2024 https://www.chewy.com/petlibro-automatic-dog-cat-water/dp/303876?utm_source=google-product&utm&medium=cpc&utm_campaign=hg&utm_content=Petlibro&utm_term=& gclid=CwKCAjwxo6IBhBKEiwAXSYBs1_vN8epXG_GmUlTiL9FSVkypYJssrIq26VxtJB2hYRQ0EfoP79hoCqRUQAvD_BWE¶.

* cited by examiner

AUTOMATED LIQUID DISPENSING DEVICE

CROSS-REFERENCE TO RELATED APPLICATION

This application claims priority from U.S. Provisional Application No. 63/325,480, filed on Mar. 30, 2022, and which is incorporated herein by reference in its entirety for all purposes.

FIELD

The present teachings relate to devices and methods for operating an automated liquid dispensing device. The automated liquid dispensing device may be beneficial in providing clean drinking water for an animal. The clean drinking water may be achieved through differing modes: filling with clean water, circulating water, emptying stale water, refilling with clean water, or a combination thereof. The modes may be achieved through the use of a rotating carousel and a valve assembly.

BACKGROUND

Domestic animals often prefer running water, freshly poured water, and filtered water over still water that has been resting in a bowl. This preference may be attributed to moving water being cooler and more oxygenated, thus having a better taste; filtered water tasting fresher; the sound of the water stream drawing the animal's attention; and even an animal's eyesight not allowing them to see standing water very well, thus relying on their other senses. To address these needs, there are a number of automated water fountains adapted for pet use. Conventional pet fountains face drawbacks related to their water circulation systems, filtering systems, and refill processes.

One challenge associated with conventional water fountains for domesticated animals is the use of a pump and tubes. The pump may typically be a centrifugal pump. This pump relies on an impeller assembly to impart centrifugal force to discharge water and to create negative pressure for bringing in water. Often after a period of use with tap or well water, these water fountains, including pumps and associated tubes, have a build up of minerals and biofilm deposits on the surfaces which the water may come in contact with, including the interior and exterior of the pump, and interior and exterior of the tubing. Users (e.g., pet owners) typically find it tedious and time-consuming to take the fountain and pump apart and rinse it to remove the deposits. Even more challenging, in some fountain assemblies, the pump and tubing is not accessible for cleansing. Overtime, without maintaining the components, the animal(s) may become disinterested in the water provided by the fountain due to the build-up of deposits impacting the taste of the water, and the fountain may even become nonoperational.

Another challenge associated with such water fountains is the refill process, or lack thereof. Generally, automated water fountains provide circulation of a fixed volume, or they may have a reservoir tank that automatically adds water as the water level drops. In the case of a fixed volume water fountain, as the water evaporates and is consumed, there is less water to dilute contaminants, as well as mineral and biofilm deposits that collect over time. In the case of a reservoir that automatically adds water to keep the volume of circulated water constant, the incremental clean water volume added is relatively small compared to the volume circulating, thus the density of contaminants increases over time. Additionally, many of these fountains do not provide a means of easily draining previously circulated water. As such, even when an owner refills the fountain, the fresh water is combined with old, used water.

SUMMARY

The present teachings relate to a liquid dispensing device comprising: a) a serving bowl configured to retain liquid for consumption by an animal; b) a fresh tank configured to store a fresh liquid therein; c) a used tank configured to store a used liquid therein, wherein used liquid is the liquid which has already been available for consumption of the animal; and d) a carousel having one or more circulation tubs and one or more empty tubs, wherein the carousel is configured to rotate about its rotational axis in a first direction and in a second direction opposing the first direction.

The present teachings relate to a liquid dispensing, circulating, and emptying device comprising: a) a serving bowl which is perforated, removable, and configured to allow a liquid to pass therethrough, and configured to retain the liquid for consumption by an animal; b) one or more filters in fluid communication with the serving bowl; c) a reservoir configured to retain the liquid and communicate water from the serving bowl to the carousel; d) a fresh tank configured to store a fresh liquid therein; e) a used tank configured to store a used liquid therein, wherein used liquid is the liquid which has already been available for consumption of the animal; and f) a carousel having one or more circulation tubs and one or more emptying tubs, wherein the carousel is configured to rotate about its rotational axis in a first direction and in a second direction opposing the first direction.

The present teachings may also relate to one or more methods of using the device. The device may be used in a filling mode, circulating mode, emptying mode, the like, or a combination thereof.

The device of the present teachings may avoid the drawbacks associated with typical fountain pumps and tubes by avoiding the use of a pump and tubes altogether. The device of the present teachings may provide for a device comprised of easy to access and disassemble components which can then be easily washed to clean deposits therefrom. The device of the present teachings may provide for circulation of water through a filtering system to catch debris and deposits such that deposits do not build up on surfaces of the device. The device of the present teachings may include a fresh tank retaining water for later dispensing into the serving bowl, reservoir, or both. The fresh tank may allow for an owner to go a number of days before refilling the fresh tank. The present teachings may include a used tank. The used tank may allow for liquid, such as stale or previously circulated liquid, to be automatically emptied from the reservoir, prior to being consumed or evaporating, allowing for fresh liquid and/or circulated liquid to be refilled into the serving bowl and/or reservoir.

BRIEF DRAWING DESCRIPTIONS

DETAILED DESCRIPTION

Figures 1, 2:
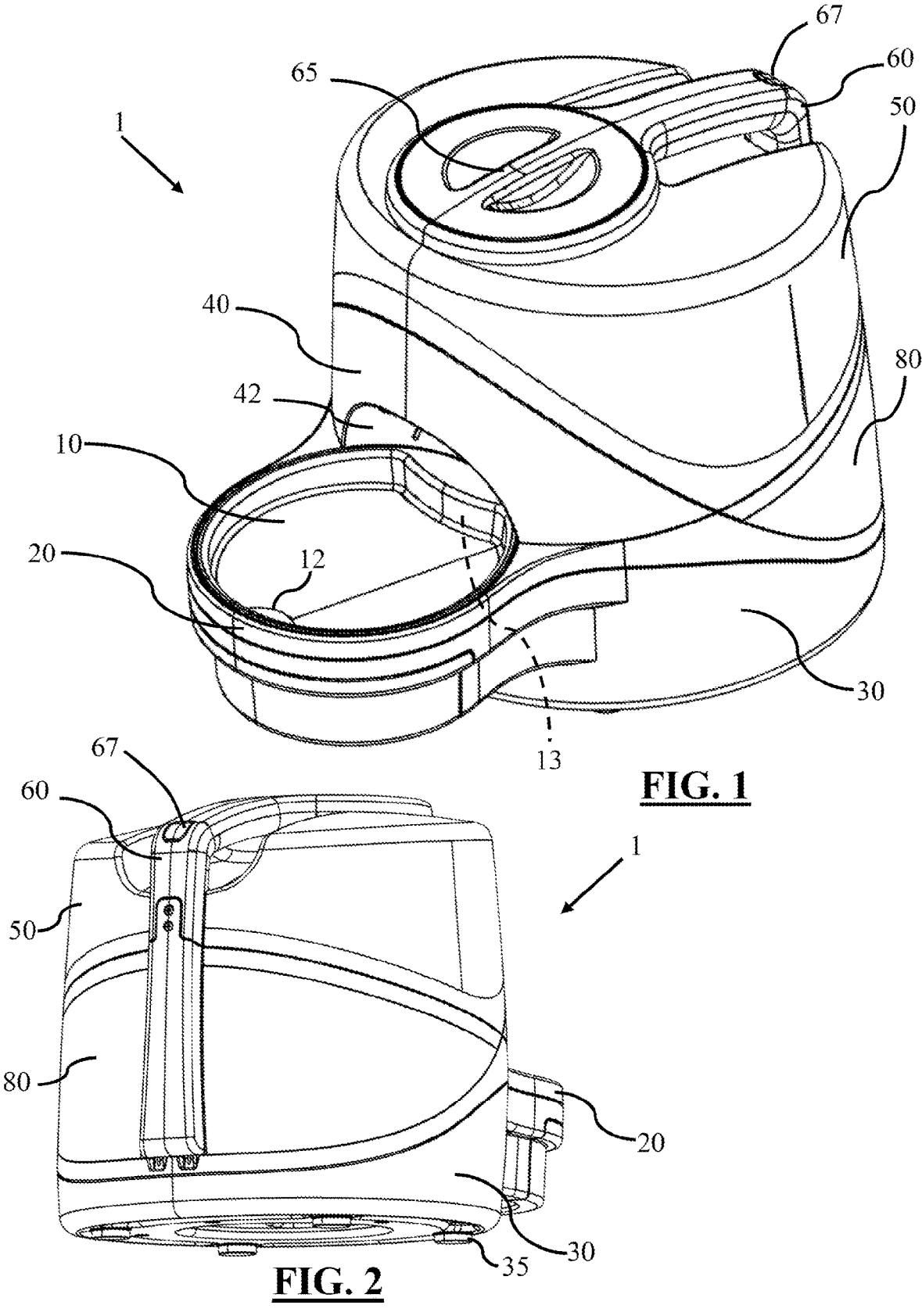
FIG. 1 is a front perspective view of a device which may find use as a liquid dispensing device.
FIG. 2 is a rear perspective view of the device.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Liquid Dispensing Device

The present disclosure relates to a device. The device may be referred to as a dispensing device, circulating device, emptying device, liquid dispensing device, automated dispensing device, automated liquid dispensing device, or a combination thereof. For example, the device may be referred to as a liquid dispensing device or a liquid dispensing, circulating, and emptying device. The device may function to dispense one or more liquids and/or solid consumables. The device may function to provide liquid suitable for consumption by an animal. Liquid may include water, semi-liquid food, and/or the like. The animal may be any domestic animal. A domestic animal may include a dog, cat, pig, rabbit, hamster guinea pig, ferret, the like, or any combination thereof. In a typical pet-owning household, the domestic animal may include one or more cats, dogs, or both. The device may function in one or more modes. One or more modes may include a filling mode, circulating mode, emptying mode, or a combination thereof. One or more modes may occur simultaneously. The device may include a carousel, cap assembly, one or more valve assemblies (e.g., valve assembly, stopper assembly), actuator assembly, one or more tanks (e.g., fresh tank, used tank), one or more housing portions (e.g., bottom, intermediate, and front), one or more spout covers, one or more serving bowls, one or more filters, one or more sensing devices, one or more sanitation devices, one or more lighting elements, the like, or a combination thereof. In general, a carousel may function like a water wheel to transfer liquid from one area of the device to one or more other areas of the device. The carousel may rotate to receive and/or dispense fresh liquid, receive and/or dispense used liquid, or both. Fresh water may be dispensed from a tank via one or more actuator assemblies, valve assemblies, or both. The one or more actuator assemblies may be engaged by rotation of the carousel in one or more directions. A direction of rotation of the carousel may be determined by the mode in which in the device is operating.

The device may include one or more carousels. One or more carousels may function to transfer liquid within the device, function as a water wheel, or both. One or more carousels may transfer water from one or more tanks to one or more serving bowls, one or more tanks to one or more spouts, a reservoir to a spout funnel, a reservoir to a channel, a reservoir to a tank, the like, or any combination thereof. One or more carousels may have any shape which allows it to rotate, collect, and dispense a liquid, semi-solid, and/or solid. One or more carousels may have a three-dimensional shape which is substantially and/or partially annular, cylindrical, spherical, ovoidal, hemispherical, cuboidal, conical, pyramidical, the like, or any combination thereof. For example, a carousel may have a shape which resembles a cross-section of an annular cylinder and/or spherical ring. The cross-section may be taken perpendicular to an axis of rotation of the carousel. One or more carousels may be a single carousel able to rotate in one or more (e.g., two) directions. One or more carousels may be two or more carousels, each able to rotate in one direction. The carousel may include an outer peripheral wall, inner peripheral wall, bottom surface, track, track plane, one or more tubs, one or more tub openings, one or more tub spouts, one or more tabs, one or more frames, or any combination thereof. The carousel may include one or more tubs integrated therein (e.g., one-piece carousel) or may include one or more frames with one or more tubs affixed thereto (e.g., multi-piece carousel). A frame may be a one-piece or multi-piece unit. For example, a frame may be molded. As another example, a frame may be comprised of multiple linked pieces. Linked pieces could be similar to chain links which define gaps for the tubs. A one-piece carousel may be advantageous in providing simplicity in manufacturing, assembly, and disassembly. A multi-piece carousel may be advantageous in providing flexibility in size (e.g., volume) of tubs, accommodating different emptying and circulating speeds and volumes.

One or more carousels may be located above, below, adjacent to, and/or distanced from one or more tanks. A carousel may be located below, adjacent, or both a fresh tank. A carousel may be located above, adjacent, below, or a combination thereof a used tank. One or more carousels may be located above, below, adjacent to, and/or distanced from one or more housing portions. A carousel may be supported by one or more housing portions. A carousel may be located above a front housing, an intermediate housing, a bottom housing, or any combination thereof. A carousel may be partially or fully supported by a spout cover. One or more carousels may be located at least partially within one or more reservoirs. One or more carousels may be in fluid communication with one or more reservoirs. One or more carousels may be located within one or more carousel cavities. One or more components of the device may have one or more portions of a carousel cavity formed therein. The cavity may be reciprocal with an overall contour of the carousel. The cavity may allow for the carousel to be located therein, affixed therein while still allowing rotation, or both. One or more carousels may be located about, within, and/or adjacent to a channel, a portion of a tank, a cap assembly, valve assembly, actuator assembly, reservoir, the like, or a combination thereof.

A carousel may define a void. The void may be defined by an inner peripheral wall (e.g., interior surface). The void may be defined with a track. The void may be defined by a hub. The hub may be a centrally or off-centered driven hub. The track and/or hub may have engagement features. The hub may be engaged with a drive unit indirectly or indirectly. For example, the hub may be a splined hub which is mated with the drive unit (e.g., to a drive shaft or similar). A channel, fill extension, cap assembly, valve assembly, actuator assembly, drive gear, reservoir, or a combination thereof may be located within the void. The void may be concentric and/or off-center with an axis of rotation of the carousel.

The carousel may be located within the device at an angle. The angle may be perpendicular, parallel, or any angle therebetween. The carousel may be located at an angle defined by a track, track plane, hub, and/or central axis. The angle may be tilted such that it is between parallel and perpendicular. A tilted placement may allow for space savings within an interior of the device. Spacing savings may be created by having one or more components located within the void, still allowing for sufficient angle that gravity aids in liquid flowing out of the tubs, or both.

The carousel may be rotated in one or more directions. One or more directions may include a first direction, second direction, or both. One or more directions may be associated with one or more modes of the carousel. One or more modes may include filling, circulating, and/or emptying. When rotated in a first direction, the carousel may function to fill a reservoir with fresh liquid (e.g., from a fresh tank), recirculate liquid from a reservoir into a serving bowl, or both. A first direction may be referred to as a fill and/or recirculate direction. When rotated in a second direction, the carousel may function to dispose of used liquid from a reservoir into a used tank. A second direction may be referred to as an empty direction. The first direction, second direction, or both may be clockwise, counterclockwise, or both. The direction may be the direction when looking down at the device from a top view. For example, the first direction may be counterclockwise, and the second direction may be clockwise. To rotate in one or more directions, the carousel may be driven by receiving torque. Torque may be received from one or more gears (e.g., drive gear). The one or more gears may be part of a drive unit. Torque may be received by any portion of the carousel configured to engage with a drive unit. Torque may be received by a track of the carousel.

A carousel may include a track or be free of a track. A track may function to receive torque, rotate the carousel about a rotational axis, cooperate with a drive unit, or a combination thereof. The track may have any suitable configuration for cooperating with and being driven by a drive unit. The track may include or be a gear, toothed, or both. A gear may be a spur gear, helical gear, internal gear, the like, or a combination thereof. For example, the track may be a spur gear with teeth evenly spaced and projecting about the perimeter. The track may mate and/or engage with one or more gears. One or more gears may be one or more gears of a drive unit. The track may engage with one or more drive gears. For example, the track may engage with a drive gear. The track may engage with a drive gear at or near an upper portion, front portion, side portion, rear portion, lower portion, or any combination thereof. The track may be located about at least a portion of, or the entirety of, an exterior periphery, interior periphery, or both of the carousel. The track may at least partially or completely encircle a perimeter (e.g., circumference) of an outer wall, inner wall, or both of the carousel. The track may encircle and/or even define a void of a carousel. The track may be located at, biased toward, and/or or near one or more edges of a peripheral wall (e.g., upper, exterior, interior) of the carousel. The track may be located at an upper surface, lower surface, extend partially and/or completely between the upper and lower surface, or any combination thereof. The track may be fairly centered between an upper and lower surface of the carousel. The track may be biased closer to an upper surface and/or lower surface. The track may be substantially concentric, off-set, or both relative to a center, great circle, lesser circle, or a combination thereof of the carousel. The track may be affixed to and/or integrated into the body of the carousel. For example, the track may be integral with an interior peripheral wall of the carousel. The track may be used to rotate the carousel about the axis of rotation during a filling mode, circulating mode, and/or emptying mode. The track may be used to rotate the carousel clockwise, counterclockwise, or both.

The track may lay in and/or form a plane referred to as a track plane. The track plane may form an angle relative to the vertical plane, horizontal plane, or a combination thereof. The track plane may be substantially normal to an axis of rotation. The track plane may be at an angle relative to the vertical plane. The track plane may form an angle with the vertical plane of about 0 degrees or more, about 10 degrees or more, about 20 degrees or more, about 30 degrees or more, about 40 degrees or more, or even about 45 degrees or more. The track plane may form an angle with the vertical plane of about 90 degrees or less, about 80 degrees or less, about 70 degrees or less, about 60 degrees or less, or even about 55 degrees or less. For example, the track plane may form an angle with the vertical plane of about 45 degrees to about 55 degrees. The angle with the vertical plane may be the upward facing angle, angle closest to the fresh tank, or both. Rotation of the track may result in rotation of the carousel about the axis of rotation. Rotation of the track may result in rotation of one or more tubs about the axis of rotation.

A carousel may include one or more tubs. One or more tubs may function to collect and/or transfer one or more liquids. One or more tubs may cooperate with one or more spouts to dispose of one or more liquids. One or more tubs may cooperate with one or more openings to collect one or more liquids therein. One or more tubs may be formed as one or more depressions within the carousel. One or more tubs may be open from an upper surface, bottom surface, or both of the carousel. A tub may or may not have a taper. A tub may have a cross-sectional shape which is substantially circular, ovular, elliptical, square, rectangular, trapezoidal, triangular, rhombus, the like, or any combination thereof. For example, a tub may have a cross-sectional shape which is ovular, circular, and/or elliptical on one side (e.g., curved walls) and more rectangular (e.g., straighter walls) on the other. The cross-section may be a cross-section taken substantially perpendicular to a rotational axis of the carousel, parallel with a track plane, or both. One or more tubs may include one or more circulation tubs, empty tubs, or both. One or more circulation tubs may function to recirculate liquid within the device. One or more circulation tubs may function to collect liquid from a reservoir and transfer into a spout funnel or spout. One or more circulation tubs may function to transfer liquid from a reservoir to a serving bowl. One or more circulation tubs may function to transfer liquid that has passed through a filter. One or more empty tubs may function to dispose liquid into a used tank. One or more empty tubs may function to collect liquid from a reservoir and transfer to a channel. One or more empty tubs may function to transfer liquid from a reservoir into a used tank. One or more circulation tubs may be adjacent to and/or spaced from one or more other circulation tubs, empty tubs, or both. The one or more circulation tubs and empty tubs may be arranged in an alternating fashion, repeating pattern, and/or the like. For example, a circulation tub may be adjacent to an empty tub and this pattern repeats about the carousel. An alternating pattern may allow for a fairly constant stream of circulated liquid and/or used liquid to be collected by a tub and/or dispensed via the spout. As another example, a circulation tub may be adjacent to a circulation tub which may be adjacent to an empty tub, and this pattern repeats about the carousel. Having more circulation tubs may allow for quicker circulation and dispensing of circulated liquid. As another example, a circulation tub may be adjacent to an empty tub which may then be adjacent to another empty tub, and this pattern repeats about the carousel. Having more empty tubs may allow for quicker emptying of used liquid before filling with clean liquid. A circulation tub may be adjacent to an empty tub. A circulation tub and an empty tub may have a separating wall located therebetween. The one or more tubs may include a plurality of tubs. The plurality of tubs may be arranged in a circular (e.g., radial) fashion within the carousel. The plurality of tubs may include 2 or more tubs, 4 or more tubs, 6 or more tubs, or even 8 or more tubs. The plurality of tubs may include 30 or less tubs, 20 or less tubs, 18 or less tubs, 16 or less tubs, or even 14 or less tubs. As an example, the plurality of tubs may include 10 to 16 tubs.

One or more tubs may include one or more openings (e.g., tub opening). The one or more openings may allow liquid to be flow into the one or more tubs. The one or more openings may be located at a leading edge and/or corner of the tub. Leading edge and/or corner may be an edge and/or corner of the tub which comes into contact first upon rotation of the carousel. The one or more openings may be formed adjacent to a separating wall of the tubs. The one or more openings may be mirrored about a separating wall with one or more other openings. The one or more tubs may be adjacent and/or biased toward an outer periphery (e.g., peripheral wall, exterior surface) of the carousel. The one or more openings may be formed on a bottom surface, upper surface, or both of the carousel. The one or more openings may be formed on a bottom surface. The bottom surface may come into contact with and/or be submerged into a liquid. The bottom surface may be partially submerged within a liquid in a reservoir when being rotated therethrough.

One or more circulation tubs may be rotated into and/or through a reservoir. If liquid is within the reservoir, the liquid may enter a circulation tub through a tub opening. The liquid may pass through the tub opening and into the circulation tub. The liquid may flow into a circulation tub through the opening when the carousel rotates in a first direction. The liquid may flow from the circulation tub toward a circulation spout while the carousel continues to rotate (e.g., in the first direction).

One or more empty tubs may be rotated into and/or through a reservoir. If liquid is within the reservoir, the liquid may enter an empty tub through a tub opening. The liquid may pass through the tub opening into the empty tub. The liquid may flow into an empty tub through the tub opening when the carousel rotates in a second direction. The liquid may be directed toward a spout via one or more guide walls. One or more guide walls within a spout may function to guide the flow of liquid away from a tub opening, toward a spout, allow a sufficient volume of liquid to build up to then have sufficient volume to be dispensed via gravity (e.g., overcome friction). One or more guide walls may extend from within a middle area of a tub toward an end of a spout. One or more guide walls may be formed as a rib. Liquid received via one or more tub openings into one or more tubs may be discharged from the tub via one or more spouts.

A carousel may include one or more spouts (e.g., tub spouts). The one or more tub spouts may function to dispel liquid from a carousel, transfer liquid from a carousel to one or more other components of the device, or both. The one or more tub spouts may function to dispel liquid toward another spout, toward a channel, toward a serving bowl, toward one or more tanks, or any combination thereof. The one or more spouts may guide liquid away and out of the tub. The one or more spouts may be at the inner periphery, outer periphery, within the bounds of, or a combination thereof of the carousel. The one or more spouts may be biased and/or at the interior periphery of the carousel. The one or more tub spouts may be located generally opposite the one or more tub openings. The one or more spouts may project away from the carousel, toward another portion of the carousel, or both. The one or more spouts may project away from an interior peripheral wall of the carousel, toward the center of the carousel, toward a bottom surface of the carousel, toward an upper surface of the carousel, toward an exterior peripheral wall, toward an interior peripheral wall, the like or any combination thereof. One or more spouts may project toward a channel when a tub is rotated into position over the channel. One or more spouts may project toward a spout or spout funnel when a tub is rotated into position over a spout funnel or other spout. One or more spouts may be located adjacent to and/or share a wall with a separating wall. A separating wall may form one of the surfaces of a spout. One or more spouts may include one or more circulation spouts, one or more used liquid spouts, or both. One or more circulation spouts may project from, be in fluid communication with, and/or be part of one or more circulation tubs. One or more used liquid spouts may project from, be in fluid communication with, and/or be part of one or more empty tubs. One or more spouts may be rotated through a reservoir, over a spout funnel, over a channel, the like, or any combination thereof. One or more circulation spouts may be rotated over a spout funnel. When rotated to be located over the spout funnel, any liquid within a tub (e.g., circulation tub) may flow away from the tube opening, through the tub, and toward the circulation spout and into a spout funnel. Such rotation may be a first direction of the carousel. When rotated to be located over the channel, any liquid within a tub (e.g., empty tub) may flow from the tub opening, through the tub, and toward the used liquid spout and into the channel. Such rotation may be a second direction of the carousel.

A carousel may include one or more tabs. The one or more tabs may function to cooperate with one or more actuator assemblies. The one or more tabs may have any shape suitable for engaging and/or bypassing one or more portions of an actuator assembly. The one or more tabs may be configured as one or more protrusions from a surface of the carousel. The one or more tabs may project from a bottom surface, upper surface, inner periphery, outer periphery, or any combination thereof of the carousel. The one or more tabs may have a shape suitable for engaging and/or bypassing a yoke of an actuator assembly. The one or more tabs may have a shape suitable for engaging and/or bypassing one or more tangs of an actuator assembly. The one or more tabs may have one or more actuation surfaces, bypass ramps, or both. One or more actuation surfaces may be one or more surfaces which actuate an actuator assembly. Actuating may mean coming into contact with a portion of a yoke, such as a tang, causing rotation of a yoke, or both. One or more actuation surfaces may project at an angle such that the actuation surface may be substantially parallel and/or flush with an inward-facing flat surface of a tang upon coming into contact with the tang, face toward the tang, or both. One or more bypass ramps may be one or more surfaces which bypass an actuator assembly. Bypass may mean avoiding engagement, avoiding causing rotation, or both of a yoke. Bypass may mean still contacting or avoiding contact with the actuator assembly. One or more bypass ramps may be sloped (e.g., ramped). A sloped surface may allow for the bypass ramp to come into contact with a portion of the actuator assembly and prevent any subsequent motion upon contact. The tabs may cooperate with one or more biasing devices to allow for the subsequent motion to be prevented. The one or more tabs may include one or more open tabs, close tabs, or both. One or more open tabs may cooperate with an actuator assembly to open a valve assembly. One or more close tabs may cooperate with an actuator assembly to close a valve assembly. The carousel may include one open tab and one close tab, a plurality of open tabs and one close tab, one open tab and a plurality of close tabs, or even a plurality of open tabs and a plurality of close tabs. A plurality of open and/or closed tabs may be evenly and/or unevenly spaced about the carousel.

The device may include one or more actuator assemblies. An actuator assembly may function to prevent and/or allow the flow of liquid from one or more tanks into a reservoir. An actuator assembly may or may not cooperate with a carousel to open and/or close a valve assembly. An actuator assembly may function to raise or lower one or more components, rotate one or more components, or both. An actuator assembly may function to directly or indirectly cause raising or lowering of a valve assembly. By raising a valve assembly, actuator assembly may unseal a fresh tank. By lowering a valve assembly, the actuator assembly may seal a fresh tank. An actuator assembly may be located near and/or adjacent to one or more carousels. An actuator assembly may be located within a central void of a carousel. An actuator assembly may be affixed (e.g., mounted) to one or more housing portions. An actuator assembly may be affixed to an intermediate housing. An actuator assembly may be affixed to the intermediate housing at the reservoir. An actuator assembly may be located adjacent to, distanced from, and/or between one or more tanks, housing portions, or both. An actuator assembly may be located between a fresh tank and an intermediate housing. An actuator assembly may be located between a front housing and/or spout cover and a fresh tank and/or used tank. An actuator assembly may be electrical, mechanical, or both (e.g., electrotechnical).

An actuator assembly may be an electromechanical actuator. An actuator assembly may function to convert an electronic control signal into a linear force, torque, or both. An actuator assembly may receive a control signal from a controller to open and/or close a valve assembly. An actuator assembly may include one or more electromechanical components. An electromechanical component may include a solenoid (e.g., linear solenoid, rotational solenoid) or another linear or rotational actuator. The actuator assembly may be in-line with a valve assembly or form part of the valve assembly. For example, a portion of a solenoid may be inline and connected with a seal extension or seal. An electromechanical actuator assembly may be sealed from liquid in the reservoir, fresh tank, or similar. For example, a solenoid may have a sleeve or similar around it or may be mounted below the reservoir and sealed from the liquid. A rotational solenoid may function to rotate one or more other components of an actuator assembly. A rotational solenoid may be in rotational communication with a disc. The rotational solenoid upon receiving a control signal may cause rotation of the disc in a first or second direction. A rotational solenoid may be used in lieu of the rotatable mount and yoke to cause rotational movement of the disc. A rotational solenoid may be mounted below a disc, below the intermediate housing, outside of the reservoir, or a combination thereof. Being mounted away from the reservoir may allow for the rotational solenoid to be sealed from liquid in the reservoir while still being able to drive rotation of the disc. One or more sealing elements may be used for the electromechanical components, for example a gasket or O-ring.

An actuator assembly may be a mechanical actuator. An actuator assembly may function to convert torque from a carousel into a linear force. An actuator assembly may function to convert torque from a carousel to open and/or close one or more tanks (e.g., fresh tank). An actuator assembly may cooperate with one or more tabs of a carousel to receive torque, transfer torque, or both. An actuator assembly may include one or more yokes, rotatable mounts, pins, one or more tangs, discs, pushers, springs, inserts, stops, the like, or a combination thereof. An insert may function as a supportive and/or static mount for all or a majority of the components of the actuator assembly.

The actuator assembly may include a pusher. A pusher may function to advance a valve assembly into an open position, allow a valve assembly to rest in a closed position, or both. A pusher may cooperate with a valve assembly, seal extender, disc, cap assembly, or any combination thereof. A pusher may be configured such as to move into a raised position and a lowered position. A pusher may have a shape which is substantially cylindrical, spherical, ovoidal, cuboidal, conical, pyramidical, the like, or any combination thereof. The pusher may be partially and/or completely hollow or solid. The pusher may be hollow to allow a seal extender to at least partially reside therein. A seal extender may be fixed into an interior of the pusher. A pusher may include opposing ends. The ends of the pusher may be defined as edges.

The pusher may include one or more extensions. The one or more extensions may cooperate with a disc such as to drive a pusher into a raised position, lower or allow the pusher into a lowered position, or both. The one or more extensions may be affixed to, integrated with, or both one or more edges of the pusher. The one or more extensions may project from a bottom edge of the pusher. A bottom edge may be an edge facing toward a disc, away from a pusher, or both. The one or more extensions may include 1 or more, 2 or more, 3 or more, or even 4 more extensions. The one or more extensions may include 10 or less, 8 or less, or even 6 or less extensions. There may be the same or a differing number of extensions as ramp surfaces. The one or more extensions may be arranged to project from the edge (e.g., bottom edge). A plurality of extensions may be spaced apart evenly about the edge (e.g., spaced radially apart). A plurality of extensions may be spaced evenly or unevenly about the edge. The one or more extensions may have any suitable shape for cooperating with the disc, such as one or more ramped and/or non-ramped surfaces of the disc. The one or more extensions may have a cross-sectional shape which is substantially and/or partially circular, ovular, elliptical, square, rectangular, trapezoidal, triangular, rhombus, the like, or any combination thereof. For example, the one or more extensions may have a cross-sectional shape which is partially circular or partially elliptical (e.g., semi-circular, D-shaped). A cross-section may be a cross-section taken substantially parallel to a longitudinal axis of the pusher. The one or more extensions may have a height about equal to, less than, and/or greater than the height of a ramped surface of a disc. Having a height about equal to and/or greater than the height of the ramped surface may allow for the one or more extensions to rest on the non-ramped surface of the disc when in a lowered position. The one or more extensions may rest on the non-ramped surface of the disc when the pusher is in a lowered position. The one or more extensions may rest on a ramped surface of the disc when the pusher is in a raised position. The pusher may be rotationally fixed and/or rotate to move from the lowered to the raised position. The pusher may be rotationally fixed relative to a seal extender, disc, or both.

The actuator assembly may include one or more discs. One or more discs may function to cooperate with a pusher, one or more rotatable mounts, an electromechanical actuator, or a combination thereof. One or more discs may function to raise and/or lower a pusher. One or more discs may function to receive torque from a yoke, one or more rotatable mounts, or both. One or more discs may have any size and/or shape to receive torque from a yoke, convert rotational motion to linear motion, transfer force to a pusher, or any combination thereof. A disc may have a cross-sectional shape which is substantially and/or partially circular, ovular, elliptical, square, rectangular, trapezoidal, triangular, rhombus, the like, or any combination thereof. For example, the disc may have a cross-sectional shape which is circular. A disc may have one or more mating features. One or more mating features may function to mate with a rotatable mount. One or more mating features may include one or more gear teeth. The disc may be formed as a gear. The gear may be a spur gear, helical gear, internal gear, sector gear, the like, or a combination thereof. For example, the disc may be formed as a sector gear with its teeth facing toward and engaging with a rotatable mount. Being formed as a sector gear with teeth only about a portion of the disc's circumference may be useful in supporting partial rotation of the disc. The teeth may project from the periphery of the disc. The disc may include one or more ramped surfaces, non-ramped surfaces, or both. The ramped surfaces, non-ramped surfaces, or both may be formed on an upper surface. An upper surface may be adjacent to the geared teeth. An upper surface may face toward a pusher, one or more extensions, a seal extender, a cap, a tank (e.g., fresh tank) or any combination thereof. The number of ramped surfaces and non-ramped surfaces may each match the number of extensions of a pusher. The ramped surfaces may be arranged about the upper surface. The ramped surfaces may be evenly and/or unevenly spaced about the upper surface. The ramped surfaces may be radially spaced about the upper surface.

The actuator assembly may include one or more rotatable mounts. One or more rotatable mounts may function to receive torque from a yoke, transfer torque to a disc, house a yoke, support rotation of a yoke, or any combination thereof. A rotatable mount may have a cross-sectional shape which is substantially and/or partially circular, ovular, elliptical, square, rectangular, trapezoidal, triangular, rhombus, the like, or any combination thereof. For example, the rotatable mount may have a cross-sectional shape of a semicircle adjoined to a rounded trapezoid forming an overall ovular shape. The rotatable mount may include one or more engagement features. One or more engagement features may function to mate with one or more engagement features of a disc, transfer torque to a disc, or both. One or more engagement features may include one or more gear teeth. A rotatable mount may be formed as a gear. The gear may be a spur gear, helical gear, internal gear, sector gear, the like, or a combination thereof. For example, the rotatable mount may be formed as a sector gear with its teeth facing toward and engaging with a disc. Being formed as a sector gear with teeth only about a portion of the rotatable mount's periphery may be useful in supporting partial rotation of the rotatable mount. Rotation of the rotatable mount may be limited by one or more stops. One or more stops may be located on either side of the rotational mount such as to limit rotation apply a counter force, or both. One or more stops may be part of an insert. The counter force may be applied when one or more tabs of a carousel come into contact with and transfer torque to one or more tangs of the yoke. Adjacent to the peripheral surface of the rotatable mount may be an upper surface. Projecting from the upper surface may be one or more brackets. The one or more brackets may include two or more opposing brackets. The two or more opposing brackets may be distanced from one another to form a gap therebetween. The two or more opposing brackets may support a yoke therebetween.

The two or more opposing brackets may retain a yoke via one or more pins. The one or more pins may extend from one bracket across the gap to the opposing bracket. The pin may be located through a yoke. The pin may allow for a yoke to rotate about an axis of the pin. The pin may cooperate with a biasing device.

The actuator assembly may include one or more biasing devices. The one or more biasing devices may allow for one or more yokes to deflect, rotate at least partially about one or more pins, bias a yoke back into position, the like, or any combination thereof. The one or more biasing devices may have any configuration which allows the device to bias a yoke in one direction, allow a yoke to deflect in an opposing direction, or both. The one or more biasing devices may be one or more springs. One or more springs may include one or more compression springs, coil springs, torsion springs, spring belts, the like, or any combination thereof. The one or more biasing devices may be affixed to the yoke, rotatable mount, pin, a surface of the reservoir (e.g., the spout cover, intermediate housing), the like, or a combination thereof. The one or more biasing devices may be located between two brackets of a rotatable mount. The one or more biasing devices may be located between a yoke and rotatable mount. The one or more biasing devices may be located between a yoke and a bracket of a rotatable mount. The one or more biasing devices may be affixed on a pin. For example, two torsion springs may be affixed on the pin, one on each side of the yoke, and between the yoke and bracket of the rotatable mount. The one or more biasing devices may be affixed on a yoke on an opposite side of one or more tanks. The one or more biasing devices may be affixed on a yoke on an opposite side of a yoke's rotational axis, a pin, or both as one or more tangs. For example, a compression spring may be located between a yoke and a rotatable mount and affixed to a yoke on an opposite side of a pin from one or more tangs. The one or more biasing devices may allow for a yoke to deflect. For example, a force may be applied to one or more tangs which causes a yoke to rotate about a pin and compress a spring. The force may be applied by one or more tabs of a carousel. The one or more biasing devices may drive a yoke back into a normal, resting position. For example, when a force is released from one or more tangs, a spring may apply a force to the yoke such that it rotates about a pin and back into position.

The actuator assembly may include one or more yokes. A yoke may function to receive torque from a carousel, transfer torque, or both. A yoke may be formed by a main body having one or more tangs projecting therefrom. A main body may have a shape compatible with the rotatable mount. A main body may have a shape which is substantially cylindrical, spherical, ovoidal, cuboidal, conical, pyramidical, the like, or any combination thereof. For example, a main body may have a shape which is substantially cuboidal such as to be reciprocal with a portion of the rotatable mount. A main body may be affixed to a rotatable mount. A main body may be located within a gap of the rotatable mount. A main body may be rotatable affixed to a rotatable mount. A main body may be located between two brackets of a rotatable mount. A main body may be affixed to a rotatable mount via a pin. The main body may be able to rotate, at least partially, about the pin. The rotatable axis of the main body about the pin may be generally perpendicular to a rotational axis of the rotatable mount.

The one or more yokes may include one or more tangs. The tang(s) may function to receive torque from the carousel, such as one or more tabs of the carousel, transfer torque from the carousel to a body of the yoke, or both. The one or more tangs may have a cross-sectional shape which is substantially and/or partially circular, ovular, square, rectangular, trapezoidal, triangular, rhombus, the like, or any combination thereof. For example, the one or more tangs may have a cross-sectional shape which is a combination of a rectangle and half-circle forming a P-shape. The cross-section may be substantially perpendicular to a longitudinal axis of the device, parallel to a longitudinal axis of the yoke, or both. The one or more tangs may include a single tang or a plurality. A plurality may include two more tangs. Two or more tangs may bifurcate and/or diverge from the main body. The two or more tangs may diverge such as to create an angle of divergence. The angle of divergence may be the angle formed between the two tangs. The angle divergence may be about 10 degrees or greater, about 15 degrees or greater, about 20 degrees or greater, about 30 degrees or greater, or even about 35 degrees or greater. The angle of divergence may be about 90 degrees or less, about 80 degrees or less, about 70 degrees or less, about 60 degrees or less, or even about 50 degrees or less. For example, the angle of divergence may be about 30 degrees or greater to about 50 degrees or less. The angle of divergence may refer to the angle observed from a top view looking down onto the yoke. The one or more tangs may project at an angle from the main body relative to a longitudinal axis of the main body. The angle may be acute, obtuse, and/or substantially perpendicular. The angle may be the angle facing toward the rotatable mount between the tang and the main body. The angle may be about 90 degrees or greater, about 100 degrees or greater, about 110 degrees or greater, or even about 120 degrees or greater. The angle may be about 180 degrees or less, about 160 degrees or less, about 150 degrees or less, or even about 140 degrees or less. For example, the angle may be about 120 degrees to about 140 degrees. The one or more tangs may include an upper tang, a lower tang, or both. Each tang may cooperate with an associated tab of a carousel.

The device may include or be free of one or more cap assemblies. The one or more cap assemblies may function to seal liquid into a tank, allow the flow of liquid from a tank, allow liquid to flow into a reservoir, cooperate with one or more actuator assemblies, cooperate with one or more valve assemblies, or any combination thereof. The cap assembly may include a cap, valve assembly, or both. The cap assembly may be affixed to, located in and/or adjacent to one or more tanks. The cap assembly may be affixed to a fresh tank. The cap assembly may be affixed to one or more walls of a tank. The cap assembly may be affixed to a bottom wall of a fresh tank. The cap assembly may be located within and/or about a fill extension of a fresh tank. The cap assembly may close off and/or be located at one or more outlets, inlets, or both of a tank.

A cap of a cap assembly may have any size and/or shape to be affixed about an inlet, outlet, extension, the like, or any combination thereof of a wall (e.g., bottom wall) of a tank (e.g., fresh tank). The cap may have a single continuous shape or have a plurality of shapes. The cap may have a shape at least partially similar to an inlet, outlet, extension, pusher, the like or combination thereof. The cap may have a three-dimensional shape which is substantially cylindrical, cuboidal, spherical, ovoidal, conical, pyramidical, the like, or any combination thereof. For example, the cap may have a first cylindrical portion affixed to and/or integral with a second cylindrical portion. The first cylindrical portion may have a diameter larger or smaller than the second cylindrical portion. A first cylindrical portion may be located about or within an inlet, outlet, and/or extension of a tank. A first cylindrical portion may be located about or within a seal, seal extender, pusher, or a combination thereof. A second cylindrical portion may be located about or within a pusher, seal extender, and/or seal. A cap may be partially and/or completely hollow such as to allow liquid therethrough, have a valve assembly reside therein, or a combination of both. A seal may have a diameter equal to or larger than a diameter of a hollow interior of the cap. A seal may rest on a surface of the cap between the first cylindrical portion and second cylindrical portion, a surface of the first cylindrical portion adjacent to the second cylindrical portion, a surface of the second cylindrical portion adjacent to the first cylindrical portion, or a combination thereof.

The device may include one or more valve assemblies. One or more valve assemblies may function to seal a tank and prevent the flow of liquid from the tank, unseal a tank and allow for the flow of liquid from the tank, cooperate with an actuator assembly, cooperate with a cap, or any combination thereof. A valve assembly may cooperate with the reservoir, gravity, liquid within a fresh tank, liquid within the reservoir, or any combination thereof. A valve assembly may function as a flow-control valve. The valve assembly may function to allow liquid to be dispensed from the fresh tank while the valve assembly is open, there is a gap between liquid in the reservoir and liquid within the fresh tank, or both. The valve assembly may be in open position while the carousel is rotating in one or more directions, is in a resting position, or both. A valve assembly may include a seal extender, seal, or both.

The valve assembly may include a seal. The seal may have any shape and/or size to seal an inlet, outlet, or both of a tank; an opening of a cap; or any combination thereof. A seal may have any configuration to prevent the flow of liquid from a tank, block off an opening, or both. The seal may have a shape at least partially reciprocal with an opening of a tank, cap, or both. The seal may have a three-dimensional shape which is substantially cylindrical, cuboidal, spherical, ovoidal, conical, pyramidical, the like, or any combination thereof. For example, the seal may have a shape which is partially conical (e.g., truncated cone). For example, the seal may be a rubber stopper.

A seal may receive a driving force, retracting force, or both from a seal extender. A retracting force may be a force which causes the seal to sit within an opening, have a friction and/or interference fit in an opening, prevent the flow of liquid from the opening, or any combination thereof. A retracting force may be a force in an axial direction, parallel to a longitudinal axis of a seal extender and/or pusher, or a combination thereof. A retracting force may be toward a disc, away from a tank, away from a cap, or any combination thereof. A driving force may be a force which causes the seal to be at least partially displaced from within an opening, allow the flow of liquid, create a gap between a seal and an opening, or any combination thereof. The driving force may be in an axial direction, parallel to a longitudinal axis of a seal extender and/or pusher, in an opposing direction as a retracting force, or any combination thereof. A driving force may be away from a disc, toward a tank, toward a cap, or any combination thereof.

A valve assembly may include a seal extender. A seal extender may be fixed relative to the pusher, seal, or both. A seal extending may be affixed to or integral with a seal. A seal extender may be affixed to or integral with a portion of an actuator assembly. For example, a seal extender may be affixed to a linear solenoid. A seal extender may be located within and/or about a pusher. A seal extender may be affixed to a pusher on an opposite end as it is affixed to a seal. A seal may be affixed to an end of the seal extender located within the cap, tank, an extension of the tank, or a combination thereof. A seal extender may have any configuration to prevent the flow of liquid from a tank, block off an opening, or both. The seal extender may have any suitable shape for residing within one or more portions of a cap, a pusher, or both. The seal extender may have any suitable shape for receiving a driving force, retracting force, or both from a pusher, disc, or both. The seal extender may have a three-dimensional shape which is substantially cylindrical, cuboidal, spherical, ovoidal, conical, pyramidical, the like, or any combination thereof. The seal extender may have portions of varying width (e.g., diameter). The seal may have a shaft portion affixed to and/or integral with a head portion. A head portion may have a larger width than a shaft. The head portion may function to affix the seal extender to the pusher, receiving and driving and/or retracting force from a pusher, or both. The seal extender may allow for the valve assembly to be dependent on the actuator assembly, carousel, or both. As an alternative, the valve assembly may be independent from the carousel.

The device may include a serving bowl. The serving bowl may function to retain one or more consumables (e.g., liquid, food), allow an animal to drink and/or eat the one or more consumables, cooperate with other components of the device to receive fresh and/or filtered food and/or liquid, cooperate with other components of the device to have food and/or liquid removed therefrom, provide an area of shallower depth for liquid consumption, or any combination thereof. The serving bowl may have any shape and/or size which allows for retaining one or more consumables, allowing an animal to drink and/or eat therefrom, or both. The serving bowl may have a shape which is substantially cylindrical, conical, cubical, cuboidal, the like, or a combination thereof. The serving bowl may have a shape substantially similar and/or reciprocal with a part of one or more housing portions. The serving bowl may have a shape substantially similar and/or reciprocal with a serving cavity. The serving bowl may be substantially bowl-shaped. The serving bowl may have a base with a wall projecting therefrom. The wall may extend about the entire perimeter. The wall may function to retain the consumable within the serving bowl. The wall and the base may form a hollow interior of the serving bowl. The base may be substantially planar, non-planar, or both. The base may have or be free of a slope. A slope may lead toward one or more drains. A slope may guide a liquid or other consumable toward a drain to encourage recirculation, emptying, and/or disposal. The serving bowl may be located in a front, rear, side, or a combination thereof of the device. The serving bowl may rest on (e.g., be housed by) one or more housing portions of the device. The serving bowl may rest on an intermediate housing, bottom housing, or both. The serving bowl may rest within a serving cavity of a housing portion. The serving bowl may be insertable into a serving cavity. The serving bowl may nest within a serving cavity. The serving bowl may be removable. The serving bowl may be referred to as a removable serving bowl. The serving bowl may be located under a spout. The serving bowl may be partially located under a spout pocket, spout housing, or both. The serving bowl may receive one or more consumables, such as liquid, from the spout. The serving bowl may be emptied of one or more consumables via one or more perforations. One or more perforations may be part of a drain. A perforated serving bowl may be referred to as a perforated serving bowl.

The serving bowl may include one or more drains. The one or more drains may function to transfer liquid from the serving bowl into a drain channel, reservoir, or both. A drain may include one or more apertures formed on a surface of the serving bowl in fluid communication with a drain channel. A drain may include a plurality of apertures or a single aperture. A drain may be formed in a base of the serving bowl. The drain may be formed toward a front and/or rear of the serving bowl. The drain may be formed toward a portion of the serving bowl closest to and/or located within a cavity of the device. The drain may be formed toward a portion of the serving bowl closest to an animal's position while drinking the liquid. The drain may be formed toward a lower point of a slope in a serving bowl. The drain may be formed toward a portion of the serving bowl closest to a drain channel of a housing portion. A base of the serving bowl may be sloped toward the drain, a rear of the serving bowl, a front of the serving bowl, or any combination thereof. Liquid running through the drain may pass through one or more filters.

The device may include one or more filters. One or more filters may function to provide a physical barrier, block or trap debris and/or bacteria from passing therethrough, or a combination thereof. One or more filters may function to filter one or more liquids passing therethrough. By filtering liquid, the filters may remove bad tastes and odors from the liquid, maintain the liquid fresher for longer, or both. One or more filters may filter liquid that is being circulated, such as during a circulation mode, filling mode, or both. One or more filters may filter liquid which passes therethrough when flowing from a serving bowl toward a reservoir, such as during a filling and circulation mode. One or more filters may have any size and/or shape suitable for filtering the liquid as it passes therethrough. One or more filters may have a shape reciprocal with a location of the device in which it is located. A filter may have a shape which is substantially cylindrical, ovoidal, spherical, cuboidal, conical, pyramidical, the like, or any combination thereof. For example, a filter may have a disc-like shape. For example, a filter may have a cuboid-like shape. One or more filters may be any filter suitable for filtering liquids such as water such that the liquid is appropriate for consumption, more desirable for consumption to an animal, or both. One or more filters may include one or more mechanical filters, absorption filters, sequestration filters, ion exchange filters, reverse osmosis filters, the like, or a combination thereof. One or more filters may include ceramic, carbon, polyphosphate, the like, or a combination thereof. The one or more filters may be located anywhere between the serving bowl and one or more water storage and/or receiving areas of the device. The one or more filters may be located within one or more housing portions, such as an intermediate housing. The one or more filters may be located between a serving bowl and a serving cavity, reservoir, channel, carousel, or any combination thereof. The one or more filters may be located between a serving bowl and a serving cavity. The one or more filters may be located between a serving cavity and a reservoir. The one or more filters may be located within a drain channel. The one or more filters may be located downstream of a drain, adjacent to a drain or one or more perforations, or both.

The device may include one or more housing portions. The one or more housing portions may function to retain (e.g., house) and/or support one or more components of the device, outer shells of the device, or both. The one or more housing portions may include a bottom housing, intermediate housing, front housing, and/or any combination thereof. One or more housing portions assembled with one or more other housing portions may be referred to as a housing, a housing assembly, a housing subassembly, and/or the like.

The one or more housing portions may include a bottom housing. A bottom housing may support one or more components of the device. A bottom housing may support an intermediate housing, serving bowl, used tank, scale, or any combination thereof. A bottom housing may cooperate with a resting surface such that device is able to rest on the resting surface, remain level on the resting surface, or both. A resting surface may be a floor, a table, and/or other supporting surface. A bottom housing may have a bottom surface which is substantially planar, flat, reside in one plane, or a combination thereof. The bottom housing may include one or more resting supports. One or more resting supports may or may not be configured to adapt to uneven surfaces. One or more resting supports may include one or more feet, ridges, and/or the like. The one or more resting supports may be adjustable so that the device may rest level on a resting surface. The bottom housing may have an overall shape which is similar to an overall profile shape of the device. From a top view, the bottom housing may have a similar shape as the entire device. The bottom housing may have a two-dimensional shape which is substantially circular, ovular, square, rectangular, trapezoidal, triangular, rhombus, the like, or any combination thereof. For example, the bottom housing may have a two-dimensional shape which is a circle adjacent to a partial circle (e.g., similar to the number 8). The two-dimensional shape may refer to the shape from a top view of the device.

The one or more housing portions may include an intermediate housing. An intermediate housing may support a serving bowl, a carousel, a drive unit, a filter, an actuation assembly, one or more tanks (e.g., fresh tank, used tank), a channel, a front housing, a spout cover, the like, or a combination thereof. The intermediate housing may include and/or house a serving cavity, drain channel, reservoir, carousel cavity, tank support, drive unit cavity, the like, or a combination thereof. The serving cavity may be in fluid communication to the reservoir via a drain channel. The serving cavity may have a shape substantially similar and/or reciprocal to a serving bowl. The serving cavity may lead, be adjacent, and/or connect to a drain channel. A drain channel may be in fluid communication with a drain. A drain channel may be able to receive one or more liquids from a serving bowl via a drain. A drain channel may provide a fluid connection between the serving cavity and a reservoir. A drain channel may be a narrowing in the intermediate housing. The drain channel may lead to, be adjacent to, and/or connect to a reservoir. A reservoir may function to house a valve assembly, cooperate with a carousel, or both. A reservoir may function to receive used water from a serving dish, fresh water from a fresh tank, or both. A reservoir may function to retain liquid to be received by a carousel. A reservoir may lead to, be adjacent to, and/or connect to a carousel cavity. A carousel cavity may have a shape substantially similar to and/or reciprocal with at least a portion of the carousel. For example, the carousel cavity may have a shape which is partially annular and/or crescent shaped. The carousel cavity may include one or more alignment features. One or more alignment features may function to maintain a carousel aligned within the carousel cavity. One or more alignment features may include one or more projections (e.g., tabs), walls, the like, or a combination thereof. The carousel cavity may be formed adjacent to a tank support. A tank support may provide a base to support one or more tanks. A tank support may allow for a used tank to rest thereon. A tank support may allow for a used tank to be adjacent to and/or in fluid communication with a portion of a channel (e.g., channel outlet).

The one or more housing portions may include a front housing. The front housing may function to conceal one or more interior components of the device, prevent access to one or more components by an animal and/or human, support one or more components, or any combination thereof. The front housing may function to house and/or include one or more spouts, drive units, spout covers, image sensors, the like, or any combination thereof. The front housing may include one or more panels. The front housing may include a front panel. The front housing may include or be free of a bottom panel. A front panel may have a shape substantially continuous with the shape of one or more tanks. A front panel may have a shape which continues the shape of the outer wall of a fresh tank. The front panel may cooperate with a fresh tank to form a continuous exterior wall about an upper portion of the device. A front housing may include one or more openings. The one or more openings may function as windows, pass throughs, or both. The one or more openings may include one or more sensor windows, spout openings, or both. The one or more openings may be formed in the front panel. The one or more sensor windows may be aligned with one or more sensors. The one or more sensor windows may be in proximity to a spout opening. A front panel may include one or more indentations and/or protuberances formed therein. A front panel may include a spout pocket. A spout pocket may be formed as a concave contour. The spout pocket may be positioned such as to be adjacent and/or behind a serving bowl. A spout pocket may allow for a cavity to be formed thereunder for a serving bowl. As an alternative to a spout pocket, the front panel may include a spout housing formed as a protuberance. A protuberance may be a bump out in the profile of the front panel. The protuberance may allow for a portion of a spout cover to rest therein, be concealed, or both. A spout housing may allow for a spout to be positioned over a serving The front housing may have a spout opening formed therein. The spout opening may be an aperture in the front panel. The spout opening may be formed in the spout pocket, spout housing, or both. The spout opening may allow for a spout to be located therein, extend through, or both. The spout may be formed as part of a spout cover. The front housing may mate or otherwise engage with a spout cover.

The device may include a spout cover. A spout cover may function to house one or more drive units, spouts, carousel cavities, lighting elements, sterilizing elements, the like, or a combination thereof. The spout cover may cooperate with one or more housing portions, one or more tanks, or both. A spout cover may be located between a front housing and a fresh tank. A spout cover may be located between a carousel and a fresh tank. A spout cover may include one or more openings. One or more openings may include one or more gear pass-throughs, one or more spouts, one or more spout funnels, or a combination thereof. The spout cover may include one or more collars and/or bosses to support a component (e.g., portion of drive unit). The spout cover may cooperate with a front housing and/or intermediate housing to form a spout cavity. A spout cavity may be the gap formed between the front housing, the intermediate housing, and the spout cover. All or a portion of the drain channel and/or reservoir may be located within the spout cavity. The spout cover may house a sterilizing element. The spout cover may retain a sterilizing element over the drain channel, reservoir, or both. The spout cavity may house a drive unit, mounting plate, mounting brackets, a spout, one or more gears, the like, or any combination thereof. The spout cover may mate with one or more housing portions, a fresh tank, or both. The spout cover may mate with a front housing, bottom of a fresh tank, or both. The spout cover may include one or more flanges and/or rims.

The spout cover may support at least a portion of a carousel. The spout cover may have a portion which is at an angle. The angle may be obtuse, acute, and/or substantially perpendicular. The angle may be at an angle substantially similar to the angle the carousel, the track plane, or both.

The spout cover may have a spout funnel. The spout funnel may be integrally formed as part of the spout cover. The spout funnel may include an opening extending through spot cover. The spout funnel may extend outward and taper to a spout. The spout funnel at the opening may have a shape at least partially reciprocal with one or more components of the device. The shape may refer to the peripheral shape of the spout funnel (e.g., edge defining entry into funnel). The spout funnel at the opening may have a shape substantially similar to a portion of the carousel. The opening may have a shape substantially similar and/or reciprocal to an inner periphery of the carousel. The opening may have a shape which is similar to a segment of an annular shape (e.g., a chord, arched). The spout funnel may be located adjacent to a carousel cavity.

A carousel cavity may be formed in the spout cover. A carousel cavity may have a shape substantially similar and/or reciprocal with the carousel. A carousel cavity may cooperate with the carousel cavity formed in one or more housing portions, tanks, or both. A carousel cavity may cooperate with a carousel cavity formed in an intermediate housing, fresh tank, or both. A carousel cavity of the spout cover may abut with a carousel cavity of the intermediate housing. Together, the two carousel cavities may form a shape substantially reciprocal with a portion of the carousel. For example, the two carousel cavities may form an annular shape. The carousel cavity may abut to one or more other opposing carousel cavities. An opposing carousel cavity may be part of one or more tanks. The carousel cavity and opposing carousel cavity may come together to form an annular cylinder and/or spherical ring.

The device may include one or more drive units. A drive unit may function to apply one or more driving forces; rotate a carousel in one or more directions; generate rotation of a carousel such that the carousel is in a filling mode, circulation mode, and/or emptying mode; or a combination thereof. A drive unit may be engaged, in rotational communication, or both with a carousel. A drive unit may be engaged with a track of a carousel, a hub of a carousel, or both. The drive unit may be centered or off-center relative to a carousel. One or more portions of the drive unit may be off-center or centered while other portions may be centered or off-center. The drive unit may be partially or completely located within one or more housing portions. The drive unit may be located between a housing portion and a tank, spout cover, or both. The drive unit may be located between a front housing and a spout cover. The drive unit may be located within a spout cavity. The drive unit or portions thereof may be located between a front housing and a fresh tank, between a front housing and a spout cover, between an intermediate housing and a spout cover, between an intermediate housing and a fresh tank, between a spout cover and a fresh tank, or any combination thereof. A portion of the drive unit may be seated in a reciprocal cavity within the intermediate housing. A portion of the drive unit may extend through an opening in a spout cover. The drive unit may include one or more cogs, pulleys, sprockets, gears, belts, direct drives, motors, drive shafts, the like, or any combination thereof.

The drive unit may include a drive source. The drive source may convert electrical energy into mechanical energy. The drive source may be configured to be in electrical communication with a power source. A power source may be an outlet, direct current, alternating current, the like, or a combination thereof. A drive source may be a motor or other power supply. The drive source may be an electronic motor, pneumatic power supply, hydraulic power supply, another power supply, or a combination thereof. The drive source may be mounted to a mounting plate. The drive source may transfer or produce torque in a drive shaft.

The drive unit may include a drive shaft. The drive shaft may receive torque from the drive source, output torque, or both. The drive shaft may be in communication with the drive source. The drive shaft may be rotationally affixed to the drive source. The drive shaft may extend through a mounting plate.

The drive unit may include and/or be in communication with one or more gears. The drive source, drive shaft, or both may be in rotational communication with one or more gears. The drive source, drive shaft, or both may transfer torque and/or drive one or more gears. One or more gears may include one or more drive gears. One or more gears may be directly engaged or in communication with the drive shaft. One or more gears may be configured to engage and/or mate with the carousel. One or more drive gears may be configured to engage and/or mate with a track of a carousel.

A drive unit may apply a first direction of torque, a second direction of torque, or both. A first direction of torque may be opposite a second direction of torque. A first direction of torque may result in a carousel rotating in a first direction, counterclockwise, in a filling and/or recirculation direction, or any combination thereof. A second direction of torque may result in a carousel rotating in a second direction, clockwise, in an emptying direction, or any combination thereof. One or more directions of torque may be applied during one or more modes of the device. A first direction of torque may be applied during a filling and/or circulating mode. A second direction of torque may be applied during an emptying mode. One or more directions of torque may result in fresh liquid being released from a fresh tank, liquid being recirculated within the device, liquid being transferred into a used tank, or any combination thereof.

The device may include one or more tanks. One or more tanks may function to retain one or more consumables, fresh liquid, used liquid, or any combination thereof. One or more tanks may include one or more fresh tanks, used tanks, or both. One or more tanks may have any suitable shape and/or size for retaining a desired volume of consumables (e.g., liquid).

A plurality of tanks may be assembled to form a tank assembly. A tank assembly may include a fresh tank assembled to used tank. A tank assembly may include a cap, handle, fresh tank, fresh tank bottom, used tank, used tank lid, stopper valve assembly, tank cap assembly, valve assembly, the like, or any combination thereof.

One or more tanks may include a fresh tank. The fresh tank may function to retain and/or store fresh liquid, dispense fresh liquid into a reservoir, provide fresh liquid to refill a serving bowl, or any combination thereof. A fresh tank may cooperate with a cap, handle, cap assembly, valve assembly, retainer, reservoir, channel, one or more housing portions, carousel, or any combination thereof. Fresh liquid may be liquid that has not yet been circulated, been in the carousel, or both. The fresh tank may have any suitable size and/or shape for retaining liquid, guiding liquid toward an outlet, cooperating with a carousel, cooperating with one or more housing portions, cooperating with a handle, the like, or any combination thereof. The fresh tank may have a three-dimensional shape which is substantially cylindrical, spherical, ovoidal, cuboidal, conical, pyramidical, the like, or any combination thereof. The three-dimensional shape may even be oblique, slanted, or both. The fresh tank may have a three-dimensional shape which is generally an oblique cylinder. The fresh tank may be located above, below, adjacent, and/or distanced from a used tank. A fresh tank may be supported by one or more other tanks, housing portions, or both. A fresh tank may be supported by, rest upon, or both one or more used tanks. For example, a fresh tank may rest on and above a used tank. The fresh tank may include a bottom wall, outer wall, top wall, inlet opening, outlet opening, extension, handle, the like, or a combination thereof.

The outer wall may project from the bottom wall, toward the top wall, or both. The outer wall may project at an acute, perpendicular, and/or obtuse angle relative to the bottom wall. The outer wall may project at an acute angle such that the outer wall tapers toward the top wall from the bottom wall. The bottom wall, outer wall, and top wall may define the hollow interior of the fresh tank. The bottom wall may be located opposite from the top wall. The top wall, bottom wall, or both may be partially or completely parallel or skewed relative to one another. For example, a portion of the bottom wall may be at least partially slanted. The bottom wall may be slanted such that one side of the fresh tank has a shorter height than an opposing side of the fresh tank. Height may be measured as the distance from the bottom wall to the top wall. The slanted portion may form part of a carousel cavity. The carousel cavity may be formed within the bottom wall. The carousel cavity may be reciprocal with, similar to, abut to, and/or mate with a carousel cavity of a spout cover, intermediate housing, used tank, or any combination thereof.

The fresh tank may include one or more openings. The opening(s) may function to allow liquid or other consumables to be disposed into, disposed from, or both the fresh tank. One or more walls may include one or more openings. The top wall may include or be free of an inlet opening. The inlet opening may be configured to cooperate with a cap, a handle, or both. The top wall may be free of an inlet opening while still housing a handle. The inlet opening may include a threaded interior surface. The threaded interior surface may mate with a cap and associated threads. The bottom wall may include an outlet opening. The outlet opening may be an outlet opening or both an inlet opening and outlet opening. The outlet opening may be formed as part of an extension. The extension may be a neck and/or funnel projecting from the bottom wall. The extension may be referred to as a fill extension. The fill extension may include a valve assembly therein. The fill extension may define a fill opening. The fill opening may be the same as an outlet. The fill opening may be defined as an aperture in a valve seat. The valve seat may be the surface near the outlet of a fill extension. The opening may include the hollow interior of the extension. The extension may have or be free of a retainer, cap, or both about at least a portion of its periphery. The extension may project away from the bottom wall, toward a reservoir, toward an actuator assembly, over and/or about a valve assembly, or a combination thereof. The extension may be located within, extend through, or both a void of a carousel.

The fresh tank may have an interior volume of about 0.25 gallons (0.95 liters) or greater, about 0.5 gallons (1.89 liters) or greater, or even about 1 gallon (3.79 liters) or greater. The fresh tank may have an interior volume of about 3 gallons (11.36 liters) or less, about 2 gallons (7.57 liters) or less, or even about 1.5 gallons (5.68 liters) or less.

One or more tanks may include a used tank. The used tank may function to retain used liquid. The used tank may cooperate with a channel, channel outlet, or both to receive used liquid from a carousel. The used tank may cooperate with a handle, stopper valve assembly, or both for retaining the used liquid, dispensing the used liquid, or both. Used liquid may be liquid that has already been circulated one or more times through the device, has already been within the serving bowl of the device, or both. The used tank may have any suitable size and/or shape for retaining liquid, receiving liquid from a channel, cooperating with a carousel, cooperating with one or more housing portions, cooperating with another tank, the like, or any combination thereof. The used tank may have a three-dimensional shape which is substantially or partially lunar, cylindrical, spherical, ovoidal, cuboidal, conical, pyramidical, the like, or any combination thereof. For example, the used tank may have a substantially crescent moon cylindrical shape. The used tank may have a volume equal to, less than, or even greater than a fresh tank. The used tank may be located adjacent to a channel. A used tank may be located below, above, adjacent, and/or distanced from a fresh tank. A used tank may be supported by one or more housing portions. A used tank may rest on an intermediate housing, bottom housing, or both. A used tank may rest behind a spout cover. A used tank may be located on an opposing side of the device as a serving dish.

The used tank may include a bottom, outer wall, lid, one or more inlets and/or outlets, the like, or a combination thereof. The outer wall may project from the bottom wall, toward a top wall, or both. The top wall may be in the form of a removal lid and/or may be integral with the outer wall. The bottom wall, top wall, and outer wall may form a hollow interior. The bottom wall may be located opposite the top wall (e.g., lid). The top wall may be a mostly solid surface or may be mostly open. The top wall, bottom wall, or both may be partially or completely parallel, or skewed relative to one another. The top wall or lid may be at an angle offset relative to the bottom wall. The top wall or lid may slope downward from a rear toward a front (e.g., toward carousel, serving bowl).

The used tank may include one or more openings. The one or more or more openings may function to allow liquid to be disposed into, disposed from, or both the fresh tank. The one or more openings may include an inlet opening, outlet opening, or both. The outlet opening may be formed by the outer wall when the lid (e.g., top wall) is removed. The outlet opening may be formed at a bottom of the used tank in a bottom wall. The outlet opening may be plugged by a stopper valve. The outlet opening may be referred to as a drain opening. The outlet opening may be opposite the lid. The inlet opening may be configured to cooperate with a channel and/or channel outlet. The inlet opening may be aligned with and/or receive a portion of a channel outlet therein. The inlet opening may receive used liquid from the channel outlet. The inlet opening may be formed in the outer wall, the top wall, the lid, or combination thereof. The inlet opening may be formed as a void. The inlet opening may be reciprocal with a profile and/or cross-sectional shape of a channel outlet. The inlet opening may be referred to as a channel opening.

The device may include one or more caps. One or more caps may function to prevent access into one or more tanks, allow access into one or more tanks, close off an inlet opening, enable removal of one or more tanks, the like, or a combination thereof. The cap may have any suitable shape allow for placement, removal, or both of the cap relative to one or more other components of the device. The cap may have at least a portion substantially reciprocal with an inlet opening of a fresh tank. The cap may include a handgrip. The handgrip may include one or more indentations, openings, projections, or both. The handgrip may be formed by opposing indentations and/or openings. The indentations and/or openings may have any suitable shape for allowing gripping of a handle body. The indentations and/or openings may have a cross-sectional shape which may be substantially D-shaped, rectangular shaped, and/or the like. A cross-section shape may be taken at a cross-section substantially perpendicular to a longitudinal axis of the device. The handle body may be a surface of the handgrip located between the indentations and/or openings. As an example, opposing indentations or openings may be distanced from one another form a handle body therebetween. One or more caps may be removably affixed to one or more tanks. One or more caps may be removably affixed to a fresh tank. The cap may be affixed to the fresh tank via a mechanical fit (e.g., threaded), friction fit, snap fit, locking tabs, the like, or a combination thereof. The cap may be affixed to a tank at an inlet opening. The cap may partially rest within an inlet opening. The cap may function as a cover for a fresh tank. The cap may have an overall shape which is configured to mate with an inlet opening of a tank. The handle may have a shape reciprocal with an inlet opening of a tank.

The device may include one or more handles. The one or more handles may function to grasp one or more tanks, house one or more stopper valve assemblies, or both. The one or more handles may include one or more handle portions, channel portions, stopper valve assemblies, release buttons, or any combination thereof. One or more handles may be affixed to one or more tanks. One or more handles may be affixed to a fresh tank, used tank, or both. A handle may be segmented into portions. A handle portion may be affixed to a fresh tank. A channel portion may be affixed to a used tank. The handle portion and channel portion may abut with one another and form one continuous channel. The handle portion may house a release button. The release button may be able to translate and/or be translated by a translation rod. The translation rod may reside within the housing portion, channel portion, or both. The translation rod may be separate pieces which abut with one another such as to be able to apply and transfer a force to one another and fit into separate portions of the handle. The translation rod may be moveably affixed to a stopper valve assembly.

The device may include one or more stopper valve assemblies. One or more stopper valve assemblies may function to seal a tank and prevent the flow of liquid from the tank, unseal a tank and allow for the flow of liquid from the tank, cooperate with a handle, cooperate with a release button, or any combination thereof. A stopper valve assembly may cooperate with a used tank, handle, or both. A stopper valve assembly may function to allow used liquid to be dispensed from a used tank while the stopper valve assembly is open. A stopper valve assembly may plug a drain opening of a used tank when the stopper valve assembly is closed. The stopper valve assembly may include a valve link, link pin, stopper valve, spring, or any combination thereof. The valve link may rotate about a pin upon receiving a downward translation force from the translation rod. The downward force may be created by depressing of a release button. Due to the rotation, the downward force is converted into an upward force by the valve link. The valve link then applies the upward force to a stopper valve. The stopper valve is moved upward within the used tank, past the drain opening. This movement causes the drain opening to be unsealed and the used liquid to drain from the drain opening. Once force is no longer being applied to a release button, a biasing force from a biasing device (e.g., spring), applied a biasing force to the valve link. The biasing force is translated as an upward force to the translation rod. The translation rod moves upward, and the release button is returned to a normal, non-depressed position. The biasing force results in the valve link applying a downward force to the stopper valve. The stopper valve seats within and seals the drain opening.

The device may include one or more channels. The one or more channels may function to receive used liquid from a carousel, dispose of used liquid into a used tank, or both. The one or more channels may cooperate with a fresh tank, used tank, spout cover, carousel, or a combination thereof. The one or more channels may have a cross-section shape which is substantially circular, ovular, elliptical, square, rectangular, trapezoidal, triangular, rhombus, the like, or any combination thereof. For example, the cross-section shape may be partially circular joined to a rectangle with rounded edges. The channel may have a cross-sectional shape resembling a question mark. The cross-section shape may be taken parallel to a resting surface of the device, perpendicular to a longitudinal axis, of the device, or both. The channel may have a bottom surface, one or more outer walls, and one or more inner walls. The one or more outer walls and inner walls may project from the bottom surface. The one or more outer and inner walls together with the bottom surface may create a trough. The trough may go about an opening of the channel. The inner wall may define the inner periphery of the channel. The outer wall may define an outer periphery of the channel. The inner wall and/or outer wall may include or be free of one or more engagement features. The one or more engagement features may function to affix the channel to a channel retainer, an extension of a fresh tank, a fresh tank, or any combination thereof. The outer wall may or may not completely go about the channel. The outer wall may define a portion of a channel outlet. A channel outlet may be a spout of the channel. A channel outlet may guide liquid from the channel toward a used tank. A channel outlet may be located within, abut to, and/or be aimed at an inlet opening of a used tank. The one or more channels may have an opening formed therein. The opening may allow for the channel to cooperate with an extension. The opening may align with a cap assembly, fill extension, or both. The one or more channels may be located within and/or adjacent to a carousel. The one or more channels may be located within a void of a carousel. The one or more channels may be located adjacent to a spout funnel, used tank, fresh tank, or any combination thereof. The one or more channels may be located between a spout funnel and a used tank. The one or more channels may rest on a spout cover. The one or more channels may be located adjacent to, in proximity, or both to a fresh tank. The one or more channels may be located about an extension of a fresh tank. The one or more channels may be engaged with an extension of a fresh tank via a retainer. A retainer may have a threaded and/or other locking engagement with both the channel and the extension.

The device may include one or more sensing devices. The one or more sensing devices may function to sense a presence, distance, amount, or a combination thereof of liquid or other consumable within a serving bowl, a fresh tank, a used tank, a reservoir, or any combination thereof. One or more sensing devices may sense the amount and/or quality of a liquid or other consumable within the device. One or more sensing devices may sense one or more conditions of an ambient environment. The one or more sensing devices may include one or more image sensors, level measuring sensors, quality sensors, environment sensors, or a combination thereof. One or more level measuring sensors may include one or more mass sensors, ultrasonic level sensors, pressure sensors, radar level sensors, open channel level sensors, capacitance level sensors, the like, or a combination thereof. The one or more quality sensors may include one or more pH sensors, temperature sensors, conductivity sensors, residual sensors, turbidity sensors, oxidation-reduction potential (ORP) sensors, chemical oxygen demand (COD) sensors, ammonia nitrogen ion sensors, the like, or a combination thereof. The one or more environment sensors may detect one or more conditions of an ambient environment in which the device is located. The one or more environment sensors may be any sensor which measures an ambient temperature, humidity, pressure, air quality, the like, or any combination thereof. The one or more environment sensors may include one or more thermometers, hygrometers, barometers, the like, or any combination thereof. As an alternative to having one or more environment sensors located therein, the device may be in communication with one or more environment sensors. For example, via the communication module, one or more ambient conditions may be received from one or more environment devices. These devices may include one or more thermostats (e.g., smart home thermostat), local weather applications, the like, or a combination thereof. One or more sensing devices may be affixed to one or more housing portions, spout covers, mounting brackets, tanks, the like, or a combination thereof. One or more sensing devices may be located within the liquid holding area of a component or look into the liquid holding area of a component. One or more sensing devices may sense one or more conditions of the device. One or more sensed conditions may trigger one or more operation of one or more modes of the device.

One or more sensing devices may include one or more mass sensors. One or more mass sensors may measure a weight/mass of liquid contained within the device or a portion of the device, the weight/mass of the device with the liquid contained therein as a whole, or both. A measured mass may be converted into a volume by a controller and/or processor. One or more mass sensors may include one or more strain gauges (incl. load cell), impedance sensors (e.g., capacitive-based weight sensor), hydraulic sensors, pneumatic sensors, the like, or any combination thereof. One or more mass sensors may be located at a base of the device. The base of the device may include or refer to a bottom housing, feet, a scale, or any combination thereof. One or more mass sensors may be located directly below a serving bowl, directly below a fresh tank, directly below a used tank, below a reservoir, below an intermediate housing, the like, or any combination thereof. One or more mass sensors may be generally aligned with (e.g., centered) or off-center with a center of mass of the device. The center of mass may be when the fresh tank is full while the used tank is empty, while the fresh tank is emptied, or a combination thereof. One or more mass sensors may be integrated into a scale. The scale may be part of or affixed to the bottom housing.

One or more sensing devices may include one or more cameras (e.g., camera modules). The one or more cameras may be suitable for capturing one or more videos, images, frames, the like, or any combination thereof. The one or more cameras may be positioned within a setting to have a line of sight on a serving bowl, animal, ambient environment, or any combination thereof. Line of sight may mean the camera is in view of at least part, or all of a serving bowl, an animal drinking from the serving bowl, an animal approaching the device, an ambient environment, or any combination thereof. The camera(s) may be located behind a front housing; between a front housing, intermediate housing, and spout cover; adjacent to a serving bowl; or a combination thereof. The camera(s) may be mounted onto a rear side of a front housing. The camera(s) may be aligned with one or more sensor windows of a front housing.

The device may include one or more temperature control devices. The one or more temperature control devices may function to maintain and/or change the temperature of liquid within the device to a temperature desirable for one or more animals to promote consumption of the liquid, to prevent growth of bacteria, or both. The one or more temperature control devices may function to maintain, decrease, and/or increase the temperature of the liquid. The one or more temperature control devices may control temperature of liquid contained within the fresh tank, used tank, reservoir, serving bowl, carousel, the like, or any combination thereof. The one or more temperature control devices may function by being in direct and/or indirect contact with the liquid. The one or more temperature control devices may include one or more probes, plates, and/or the like. The one or more temperature control devices may be one or more thermo-electric devices. The one or more thermoelectric devices may include one or more Peltier devices. The one or more temperature control devices may convert electrical power into cooling power. The one or more temperature control devices may include one or more chilling elements. One or more chilling elements may be chilled in advanced and placed within the device. One or more chilling elements may include one or more cold packs. A cold pack may be reusable or disposable. A cold pack may be a freezable silica gel, hydroxyethyl cellulose, polymer, and/or the like. The one or more temperature control devices may be at least partially located within the fresh tank, used tank, reservoir, serving bowl, bottom housing, intermediate housing, or any combination thereof. For example, a thermoelectric device or chilling element may be located under a serving bowl. The temperature control device may be housed within a serving cavity, with a drawer, or both. The drawer may be removably affixed to the bottom housing and located under a serving cavity, serving bowl, or both. The one or more temperature control devices may be part of one or more surfaces of a fresh tank, used tank, reservoir, serving bowl, carousel, bottom housing, intermediate housing, the like, or any combination thereof.

The device may include one or more sterilizing elements. One or more sterilizing elements may function to reduce and/or prevent bacterial from growing within one or more portions of the device, within the liquid retained in the device, or both. One or more sterilizing elements may cooperate with one or more filters or work independently of them. One or more sterilizing elements may function to eliminate bacteria too small for one or more filters to capture. One or more sterilizing elements may sterilize liquid contained within one or more fresh tanks, used tanks, drain channels, reservoirs, serving bowls, the like, or any combination thereof. One or more sterilizing elements may be part of or separate from one or more filters. One or more sterilizing elements may be located downstream, upstream, or both of one or more filters. One or more sterilizing elements may include one or more ultraviolet light steriliz-ing elements. One or more sterilizing elements may be located within and/or adjacent to one or more fresh tanks, used tanks, drain channels, reservoirs, serving bowls, car-ousels, or any combination thereof. The one or more ster-ilizing elements may be located such that the ultraviolet light radiation comes into contact with and goes through the liquid. One or more sterilizing elements may be located between a spout cover, front housing, and intermediate housing. One or more sterilizing elements may be mounted to a spout cover, bottom wall of a fresh tank, intermediate housing, or any combination thereof. One or more sterilizing elements may be located below the liquid and illuminate the liquid from below. One or more housing portions may include one or more transparent windows. The one or more transparent windows may be located below a location where liquid is held. The one or more transparent windows may allow for the sterilizing element to pass through and sterilize the liquid. The intermediate housing may include a trans-parent window. The transparent window may be in the drain channel, reservoir, or both. The transparent window may be sealed. The sterilizing element may be mounted in the bottom housing, between the bottom housing and the inter-mediate housing, or both.

The device may include one or more lighting elements. One or more lighting elements may function to light up a stream of liquid, attract an animal to the liquid, or both. One or more lighting elements may provide ambient lighting. One or more lighting elements may be mounted such as to illuminate a serving bowl, a stream of water from a spout, or both. One or more lighting elements may be any type of light suitable for illumination in close proximity to liquid and animals. One or more lighting elements may include one or more light emitting diodes (LED). One or more lighting elements may include one or more light pipes. The one or more light pipes may be inserted into, pass through, even extend beyond a spout opening, spout, spout funnel, or any combination thereof. The one or more light pipes may be aligned with a stream of liquid being dispensed from a spout. The one or more light pipes may illuminate the stream of liquid as it passes through the spout.

The device may be in communication with or include one or more power sources. A power source may function to provide power to one or more components of the device. A power source may be any typical power source for consumer products. A power source may be an outlet, direct current, alternating current, the like, or a combination thereof. The device may house an adapter for a power source, such as in a bottom housing and/or intermediate housing.

The device may include one or more controllers. The one or more controllers may function to receive one or more signals, transmit one or more signals, control operations of one or more components of the device, or a combination thereof. The one or more controllers may be in communi-cation with one or more sensors, communication modules, other components, or any combination thereof. The one or more controllers may be adapted to receive one or more signals from the one or more sensors. The one or more controllers may be in electrical communication with one or more sensing devices. The one or more controllers may interpret one or more signals from one or more sensors as one or more status signals. The one or more controllers may automatically receive, interpret, and/or transmit one or more signals. The one or more controllers may automatically control one or more operations of one or more components upon receipt of one or more signals or instructions. A controller may be housed and/or supported by a housing portion, spout cover, or both. A controller may be located between a front housing and spout cover. A controller may be located between a bottom housing and an intermediate housing. The one or more controllers may include one or more controllers, microcontrollers, microprocessors, proces-sors, storage mediums, or a combination thereof. The one or more controllers may include one or more computing devices, processors, storage mediums, or any combination thereof. The one or more controllers may be in communi-cation with one or more other computing devices, processor (s), storage mediums, or any combination thereof.

The device may include and/or be in communication with one or more computing devices. The one or more computing devices may function to receive and/or transmit one or more signals, convert one or more signals to data entries, to send one or more data entries to a storage medium, to store one or more data entries, to retrieve one or more data entries from a storage medium, to compute one or more algorithms, apply one or more rules, or any combination thereof. One or more computing devices may include or be in communication with one or more other computing devices, processors, storage mediums, databases, or any combination thereof. One or more computing devices may communicate with one or more computing devices, processors, storage mediums, databases, or any combination thereof. Communication between computing devices may be controlled or managed via a managed cloud service. The one or more computing devices may include one or more non-transitory storage mediums. A non-transitory storage medium may include one or more physical servers, virtual servers, or a combination of both. One or more servers may include one or more local servers, remote servers, or both. One or more computing devices may include one or more processors of the device, personal computers (e.g., laptop, desktop, etc.), mobile computing devices (e.g., tablet, mobile phone, etc.), or a combination thereof. One or more computing devices may use one or more processors.

One or more computing devices may include one or more processors. The one or more processors may function to analyze one or more signals from the device, one or more storage mediums, databases, communication modules, or any combination thereof. The one or more processors may be located within or in communication with one or more computing devices, servers, storage mediums, or any combination thereof. One or more processors may be in communication with one or more other processors. The one or more processors may function to process data, execute one or more algorithms to analyze data, apply one or more rules, evaluate data against one or more rules, or any combination thereof. The one or more processors may automatically process data, execute one or more algorithms, apply one or more rules, evaluate data, or a combination thereof; may wait for an instruction or signal such as from a user; or any combination thereof. Processing data may include receiving, transforming, outputting, executing, the like, or any combination thereof. One or more processors may be part of one or more hardware, software, systems, or any combination thereof. One or more hardware processors may include one or more central processing units, multi-core processors, front-end processors, the like, or any combination thereof. One or more software processors may include one or more word processors, document processors, the like, or any combination thereof. One or more system processors may include one or more information processors, the like, or a combination thereof. One or more processors suitable for use within the device as part of the one or more controllers may include a microcontroller, such as Part No. PIC18F45K22 and/or Part No. PIC18F46J50 produced by Microchip Technology Inc., incorporated herein by reference in their entirety for all purposes. The one or more processors may be located within a same or different non-transient storage medium as one or more storage mediums, other processors, communication modules, communication hubs, or any combination thereof. The one or more processors may be an ARM-based processor. Exemplary ARM-based processors may include one or more of the Cortex-M Family, versions ARM to ARMv6 (ARM 32-bit), version ARMv6-M to ARMv9-R (ARM 32-bit Cortex), versions ARMv8-A to ARMv-9 (ARM 64/32-bit), the like, or any combination thereof. The one or more processors may include one or more cloud-based processors. A cloud-based processor may be part of or in communication with a dispatch interface, an interaction interface, an authentication portal, or a combination thereof. A cloud-based processor may be located remote from a device, a computing device, one or more other processors, one or more databases, or any combination thereof. Cloud-based may mean that the one or more processors may reside in a non-transitory storage medium located remote from the device, computing device, processor, databases, or any combination thereof. One or more cloud-based processors may be accessible via one or more networks. A suitable cloud-based processor may be Amazon Elastic Compute Cloud™ (EC2™) may be provided by Amazon Web Services®, incorporated herein by reference in its entirety for all purposes. Another suitable platform for a cloud-based processor may include Lambda™ provided by Amazon Web Services®, incorporated herein in its entirety by reference for all purposes. The one or more processors may convert data signals to data entries to be saved within one or more storage mediums. The one or more processors may access one or more algorithms to analyze one or more data entries and/or data signals. The one or more processors may access one or more algorithms saved within one or more memory storage mediums. The one or more algorithms being accessed by one or more processors may be located in a same or different storage medium or server as the processor(s).

One or more computing devices may include one or more memory storage mediums. The one or more memory storage mediums may include one or more hard drives (e.g., hard drive memory), chips (e.g., Random Access Memory "RAM)"), discs, flash drives, memory cards, the like, or any combination thereof. The one or more storage mediums may include one or more cloud-based storage mediums. A cloud-based storage medium may be located remote from a device, a computing device, one or more processors, one or more databases, or any combination thereof. Cloud-based may mean that the one or more storage mediums may reside in a non-transitory storage medium located remote from the device, computing device, processor, other databases, or any combination thereof. One or more cloud-based storage mediums may be accessible via one or more networks. A suitable cloud-based storage medium may be Amazon S3™ provided by Amazon Web Services®, incorporated herein by reference in its entirety for all purposes. One or more memory storage mediums may store one or more data entries in a native format, foreign format, or both. One or more memory storage mediums may store data entries as objects, files, blocks, or a combination thereof. The one or more memory storage mediums may include one or more algorithms, rules, databases, data entries, the like, or any combination therefore stored therein. The one or more memory storage mediums may store data in the form of one or more databases.

The device may include one or more communication modules. The one or more communication modules may allow for the device to receive and/or transmit one or more signals from one or more computing devices, be integrated into a network, or both. The one or more communication modules may have any configuration which may allow for one or more data signals from one or more controllers to be relayed to one or more other controllers, communication modules, communication hubs, networks, computing devices, processors, the like, or any combination thereof located external of the litter device. The one or more communication modules may include one or more wired communication modules, wireless communication modules, or both. A wired communication module may be any module capable of transmitting and/or receiving one or more data signals via a wired connection. One or more wired communication modules may communicate via one or more networks via a direct, wired connection. A wired connection may include a local area network wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth transmitter, an infrared transmitter, a radio frequency transmitter, an IEEE 802.15.4 compliant transmitter, cellular radio signal transmitter, Narrowband-Internet of Things (NB-IoT) transmitter, the like, or any combination thereof. A Wi-Fi transmitter may be any transmitter compliant with IEEE 802.11. A communication module may be single band, multi-band (e.g., dual band), or both. A communication module may operate at 2.4 Ghz, 5 Ghz, the like, or a combination thereof. A cellular radio signal transmitter may be any transceiver compatible with any cellular frequency band (e.g., 500, 900, 1,800, 1,900 MHz) and/or network (3G, LTE, LTE Cat1, LTE M, 4G, 5G). A communication module may communicate with one or more other communication modules, computing devices, processors, or any combination thereof directly; via one or more communication hubs, networks, or both; via one or more interaction interfaces; or any combination thereof.

Modes of Operation of Liquid Dispensing Device

The liquid dispensing device according to the present teachings may be able to operate in one or more modes. The device may be particularly useful for being able to operate in multiple modes to allow for a serving bowl to be refilled with fresh liquid, allow circulation of liquid already within a serving bowl, and/or provide for emptying of liquid which has already been consumed from by an animal. The device may have a filling mode, circulating mode, empty mode, or a combination thereof. One or more modes may operate simultaneously. For example, a filling mode and circulating mode may operate simultaneously or be one in the same. As another example, a circulating mode and empty mode may operate simultaneously or be one in the same. As yet another example, a filling mode and empty mode may operate simultaneously or be one in the same. One or more modes may be determined by a drive unit's direction of operation, a carousel's direction of rotation, an actuator assembly's position, a valve assembly's position, or any combination thereof.

The one or more modes may include a filling mode. A filling mode may function to transfer fresh liquid from a fresh tank into a reservoir, carousel, serving bowl, or any combination thereof.

A filling mode may be initiated by one or more drive units. One or more sensing devices may cause one or more drive units to initiate. Torque may be transmitted to one or more gears. A drive shaft may transfer torque to one or more gears from a motor. One or more drive units may pass torque on to a carousel. One or more gears may be engaged with the carousel. For example, a drive gear may be engaged with a track of the carousel. Rotation of the drive gear in a first direction may transfer torque to the carousel. The carousel may rotate in a first direction. Rotation of the carousel may cause actuation of one or more actuator assemblies, valve assemblies, or both into an open position.

Rotation of a carousel in a first direction may move an actuator assembly into an open position. Upon rotation of the carousel, one or more tabs of the carousel may contact one or more tangs of an actuator assembly. An actuation surface of an open tab may contact a lower tang. The actuation surface may contact a flat surface, inward facing surface, or both of a yoke. Upon contact, one or more tabs may transfer torque to the actuator assembly. The yoke may rotate into an open position upon receiving torque. The torque may be transferred to a rotatable mount, disc, or both. The torque may be transferred from a yoke to a rotatable mount and then to a disc. The disc may cooperate with a valve assembly to convert rotational motion into linear motion. Rotation of the disc may drive a pusher upward. Rotation of the pusher upward may cause a valve assembly to open.

A valve assembly moving into an open position may result in liquid being dispensed from one or more tanks (i.e., fresh tank). The valve assembly may include a seal extender. The seal extender may receive an axial force from a pusher of an actuator assembly. The axial force may be in a direction which causes a seal to unseat from an opening of the tank. The axial force may be in a direction toward the tank. For example, upward motion of the pusher results in upward motion of the seal extender. The seal extender may transfer the axial force to the seal. The seal may then move away from an opening of the fresh tank and create a gap. Liquid may flow from the gap through opening. Liquid may then flow into the reservoir. This liquid may be referred to as fresh liquid (e.g., liquid dispensed from the fresh tank into the reservoir).

As liquid flows into the reservoir, the liquid may then flow through the drain channel, toward the serving bowl, or both. Liquid may flow from the fresh tank until the liquid in the reservoir reaches a level position. The level position may be when the liquid is at or near a height of the seal, the opening of the fresh tank, or both. The valve assembly may remain in the open position when the carousel is rotating, when the carousel stops rotating (i.e., a resting position), or both. This may allow for fresh liquid to flow from the fresh tank with the aid of gravity as liquid is consumed, evaporated, or both without the carousel having to rotate, actuator assembly having to be further actuated, or both.

In addition to or separate from a gravity fill, as the carousel continues rotating in a first direction, the fresh liquid may be collected by the carousel. As the carousel rotates, one or more tub openings may pass through the fresh liquid. The one or more tub openings may pass through fresh liquid contained within the reservoir. As the tub opening pass through the fresh liquid, the fresh liquid may pass through the one or more tub openings into the corresponding tub (e.g., circulation tub). As the carousel continues to rotate, the fresh liquid may rest within the tub until the carousel reaches a spout funnel. When the carousel rotates such that the tub containing the fresh liquid is located over a spout funnel, the fresh liquid may move toward a spout of the tub. The spout may be a circulation spout. The fresh liquid may then be dispensed from the circulation spout into the spout funnel. From the spout funnel, the fresh liquid may be transferred to the spout and then dispensed into a serving bowl.

Fresh liquid may stop flowing to the serving bowl when the liquid is level with the valve assembly, the carousel stops rotating, or both.

The one or more modes may include a circulating mode. A circulating mode may function to circulate liquid already within a reservoir and/or serving bowl, pass liquid through a filter, provide for moving liquid to attract an animal to the device, or any combination thereof.

A circulating mode may be initiated by one or more drive units. One or more sensing devices may cause one or more drive units to initiate. Torque may be transmitted to one or more gears. A drive shaft may transfer torque to one or more gears from a motor. One or more drive units may pass torque on to a carousel. One or more gears may be engaged with the carousel. For example, a drive gear may be engaged with a track of the carousel. Rotation of the drive gear in a first direction, second direction, or both may transfer torque to the carousel. The carousel may rotate in a first direction, second direction, or both.

As the carousel rotates in a first or second direction, used liquid may be collected by the carousel. The used liquid may also be filtered liquid. The used liquid may have been liquid which was in a serving bowl, passed through one or more filters, and then flowed into a reservoir. As the carousel rotates, one or more tub openings may pass through the used liquid. The one or more tub openings may pass through used liquid contained within the reservoir. As the tub openings pass through the used liquid, the used liquid may pass through the one or more tub openings into the corresponding tub (e.g., circulation tub). As the carousel continues to rotate, the used liquid may rest within the tub until the carousel reaches a spout funnel. When the carousel rotates such that the tub containing the used liquid is located over a spout funnel, the used liquid may move toward a spout of the tub. The spout may be a circulation spout. The used liquid may then be dispensed from the circulation spout into the spout funnel. From the spout funnel, the used liquid may be transferred to the spout and then dispensed into a serving bowl.

A recirculation mode may be completed at the same time as a filling mode. For example, fresh liquid may be dispensed into a reservoir which also has used liquid therein. A recirculation mode may be completed separate from a filling mode. A recirculation mode may be executed when a fresh tank is empty but there is still liquid within the serving bowl, reservoir, or both of the device.

The one or more modes may include an empty mode. An empty mode may function to transfer liquid from a serving bowl, reservoir, carousel, or a combination thereof into a used tank. An empty mode may function to dispose of liquid that has already been consumed from at least once.

An empty mode may be initiated by one or more drive units. Torque may be transmitted to one or more gears. A drive shaft may transfer torque to one or more gears from a motor. One or more drive units may pass torque on to a carousel. One or more gears may be engaged with the carousel. For example, a drive gear may be engaged with a track of the carousel. Rotation of the drive gear in a second direction may transfer torque to the carousel. The carousel may rotate in a second direction.

As the carousel rotates in a second direction, the carousel may pass through used liquid within a reservoir. Used liquid may be liquid which has already been consumed from by an animal, has been previously circulated, or both. The used liquid may be collected by the carousel for dispensing into a used tank. As the carousel rotates, one or more tub openings may pass through the used liquid. The one or more tub openings may pass through used liquid contained within the reservoir. As the tub openings pass through the used liquid, the used liquid may pass through the one or more tub openings into the corresponding tub (e.g., empty tub). As the carousel continues to rotate, the used liquid may rest within the tub until the carousel reaches a channel. When the carousel rotates such that the tub containing the used liquid is located over a channel, the used liquid may move toward a spout of the tub. The spout may be a used liquid spout. The used liquid may then be dispensed from the used liquid spout into the channel. From the channel, the used liquid may be transferred to a channel outlet. The used liquid may then be dispensed from the channel outlet to a used liquid tank.

Rotation of a carousel in a second direction may move an actuator assembly into a closed position. Upon rotation of the carousel, one or more tabs of the carousel may contact one or more tangs of an actuator assembly. An actuation surface of a close tab may contact an upper tang. The actuation surface may contact a flat surface, inward facing surface, or both of a yoke. Upon contact, one or more tabs may transfer torque to the actuator assembly. The yoke may rotate into a closed position upon receiving torque. The torque may be transferred to a rotatable mount, disc, or both. The torque may be transferred from a yoke to a rotatable mount and then to a disc. The disc may cooperate with a valve assembly to convert rotational motion into linear motion. Rotation of the disc may drive a pusher downward. Rotation of the pusher downward may cause a valve assembly to close.

A valve assembly moving into a closed position may result in liquid no longer being dispensed from one or more tanks (i.e., fresh tank). The valve assembly may include a seal extender. The seal extender may receive an axial force from a pusher of an actuator assembly. The axial force may be in a direction which causes a seal to sit within an opening of the fresh tank. The axial force may be in a direction away the fresh tank. For example, downward motion of the pusher results in downward motion of the seal extender. The seal extender may transfer the axial force to the seal. The seal may then move toward an opening of the fresh tank and seal a gap. Liquid may stop flowing from the gap through opening.

The carousel may rotate in a second direction and then in a first direction. This may cause the device to first enter an empty mode to empty used liquid into a used tank, then move to a filling and/or recirculation mode to refill a reservoir and/or serving bowl with fresh liquid, recirculate the liquid, or both.

The rotation may stop after rotating in a first direction for a period of time. This may cause the device to remain in a filling mode, stop a recirculation mode, or both. This may allow for fresh liquid to keep being dispensed from the fresh tank as liquid is consumed, evaporated, and the like.

The carousel may rotate in a second direction, first direction, then back in a second direction. This may cause the device to first enter an empty mode to empty used liquid into a used tank, then move to a filling and/or recirculation mode to refill a reservoir and/or serving bowl with fresh liquid and/or recirculated liquid, and then seal the fresh tank with a valve assembly in a closed position.

Filling, Circulating, and Emptying Algorithm

The device and method of the present teachings may rely on one or more algorithms to initiate and/or stop one or more modes of operation, learn consumption trends of an animal, or both. The one or more algorithms may be stored within one or more memory storage devices, executed by one or more processing devices, or both. The one or more computing devices, memory storage devices, processing devices, or combination thereof may be located within and/or remotely from the device. The one or more algorithms may rely on inputs from one or more sensing devices, historical operation of the device, or both. The one or more algorithms may determine an amount of liquid consumed. Consumption may be determined based on determining the amount of liquid consumed, depleted, evaporated, emptied, filled, the like, or any combination thereof.

Evaporation may be determined based on one or more environment sensors and/or environment inputs (e.g., smart phone weather app). Evaporation may be determined based on relative (ambient) humidity, ambient temperature, or both. Depletion may be figured out by determining a change in water level over a period of time. The water level may be determined via one or more levels sensors. Emptying may be figured out by one or more level sensors located within the used tank, measuring an input of used liquid into the used tank, or both. Consumption may be determined based on evaporation, depletion, emptying, and the like.

For example, to determine the amount of liquid which has evaporated versus consumed, the device may be weighed to determine a baseline weight, full weight, and in-use weight. The weight may be automatically determined by one or more mass sensors and one or more processors. The baseline weight may be a weight of the device entirely empty of any liquid. The full weight may be the weight of the device when a fresh tank is completely filled with liquid and then located on to the device. The full weight may also mean that the used tank is empty when the fresh tank is completely filled. Once the device is in-use (i.e., having liquid consumed), an ambient temperature and relative humidity may be used to determine an evaporation rate. The ambient temperature and relative humidity may be determined by one or more of the sensing devices. Once the device is in-use, a rate of depletion may also be determined. The rate of depletion may be determined by a change in level of liquid over time. By comparing the evaporation rate with the depletion rate, a consumption rate and amount may then be determined. Knowing a consumption amount and/or rate versus just knowing a depletion amount and/or rate may provide an animal owner more insight into the drinking trends of an animal, provide more accurate predictions as to when a device may need to be refilled, or both.

ILLUSTRATIVE EXAMPLES

FIGS. 1 and 2 illustrate a device 1. The device 1 is a liquid dispensing device. The device 1 includes a serving bowl 10. The serving bowl 10 includes a drain 12. Between the serving bowl 10 and the drain 12 is a filter 13. The serving bowl 10 and filter 13 are retained in place by an intermediate housing 20. Below and supporting the intermediate housing 20 is a bottom housing 30. The bottom housing 30 includes a plurality of feet 35. Located above the intermediate housing 20 is a front housing 40. The front housing 40 includes a spout pocket 42. The device 1 includes a fresh tank 50. The fresh tank 50 includes a cap 65. The device 1 includes a handle 60. The handle 60 includes a release button 67. Located below the fresh tank 50 is also a used tank 80.

Figure 3:
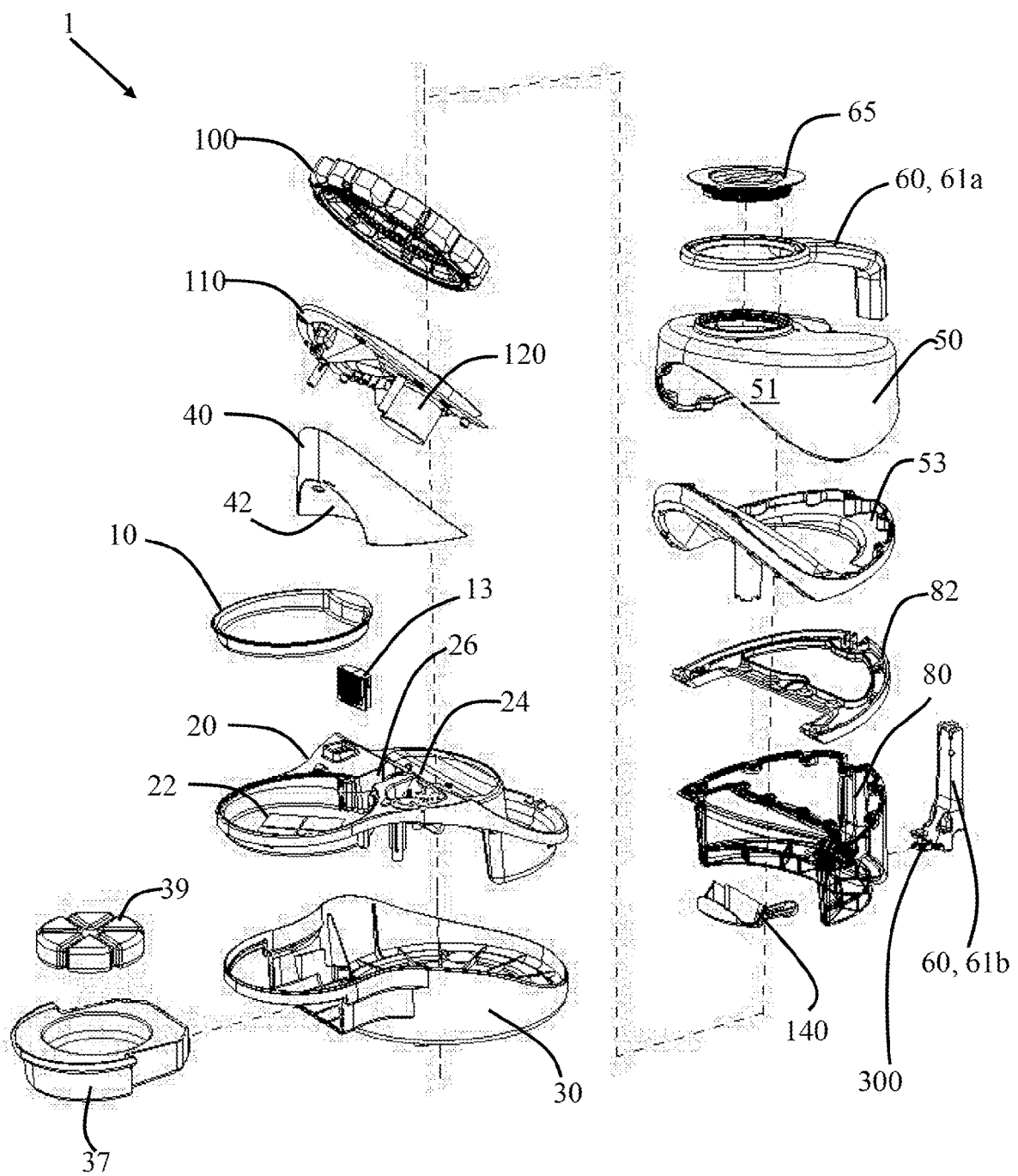
FIG. 3 is an exploded view of a device.

FIG. 3 is an exploded view of device 1. The device 1 includes a carousel 100. The carousel 100 is supported by a spout cover 110. The spout cover 110 houses a drive unit 120. The drive unit 120 drives the carousel 100. The spout cover 110 is retained by a front housing 40. The front housing 40 includes a spout pocket 42. The front housing 40 is assembled to an intermediate housing 20. The intermediate housing 20 includes a serving cavity 22 and a reservoir 24. The cavity 22 is in fluid communication with the reservoir 24 via a drain channel 26. A filter 13 may be located within the drain channel 26. A serving bowl 10 is retained in the intermediate housing 20. The serving bowl 10 is located within the serving cavity 22. The intermediate housing 20 is supported by a bottom housing 30. The bottom housing 30 includes a drawer 37. The drawer 37 is located under the serving bowl 10 and serving cavity 22. Within the drawer 37 is a chilling element 39. The front housing 40, intermediate housing 20, bottom housing 30, and even the spout cover 110 may together be referred to as a housing or housing assembly. The device includes an actuator assembly 200 (not shown). The actuator assembly 200 is engaged with a valve assembly 56 (not shown). The device 1 includes a channel 140. The channel 140 is in fluid communication with both the carousel 100 and a used tank 80. The device 1 includes a tank assembly. The tank assembly may refer to a fresh tank 50 assembled to a used tank 80. The carousel 100 is housed below the fresh tank 50. The fresh tank 50 rests upon a used tank 80. The used tank 80 includes a lid 82. The used tank 80 rests upon a rear of the intermediate housing 20. The fresh tank 50 also includes a fresh tank outer wall 51 and fresh tank bottom 53. The outer wall 51 and bottom 53 are assembled together such as to form the hollow interior of the fresh tank 50. Located at the top of the fresh tank 50 is a cap 65. Also located at the top of the fresh tank 50 is a handle 60. The handle 60 includes a handle portion 61a and a channel portion 61b. The handle portion 61a is affixed to the fresh tank 50. The channel portion 61b is affixed to the used tank 80. The used tank 80 is sealed via a stopper valve assembly 300. The stopper valve assembly 300 is affixed to the channel portion 61b.

Figure 4:
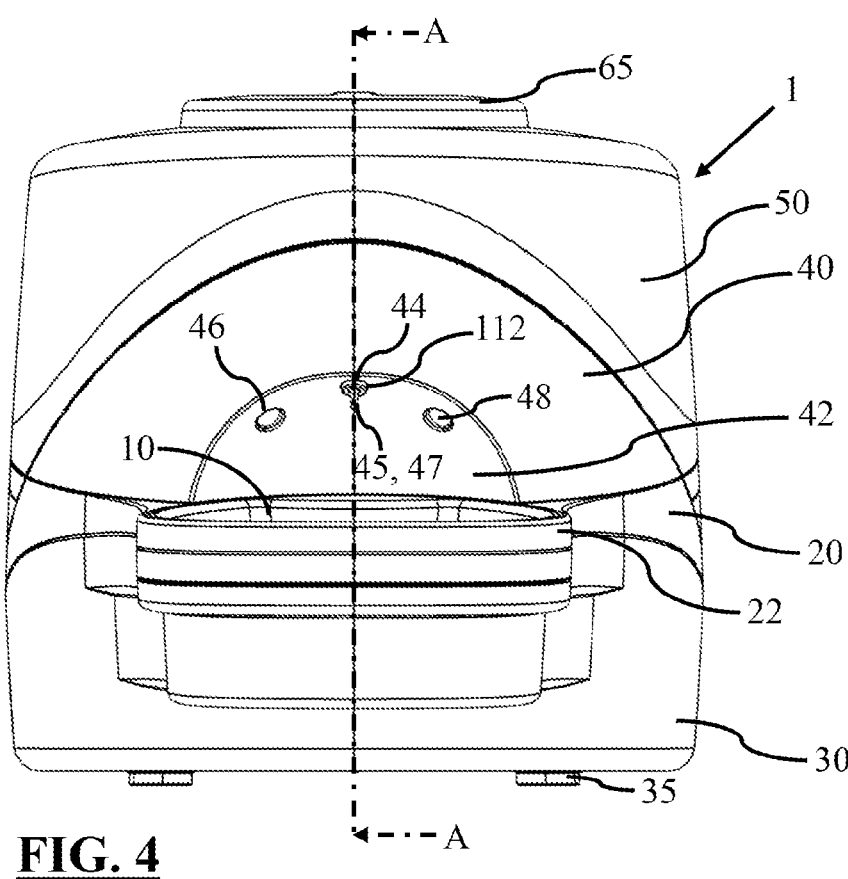
FIG. 4 is a front view of a device.

FIG. 4 is a front view of device 1. The device 1 includes a front housing 40 with a spout pocket 42. The spout pocket 42 includes sensor windows 46. Aligned with the sensor windows 46 are image sensors 48. The spout pocket 42 includes a spout opening 44. A spout 112 is located within the spout opening 44. Protruding from the spout 112 is a light pipe 47 of a lighting element 45. The spout 112 and spout opening 44 are located over the serving bowl 10. The serving bowl 10 resides in a serving cavity 22. The serving cavity 22 is part of an intermediate housing 20. The intermediate housing 20 is supported by a bottom housing 30. The bottom housing 30 includes feet 35. Seated atop the front housing 40 is a fresh tank 50. The fresh tank 50 includes a cap 65.

Figure 5:
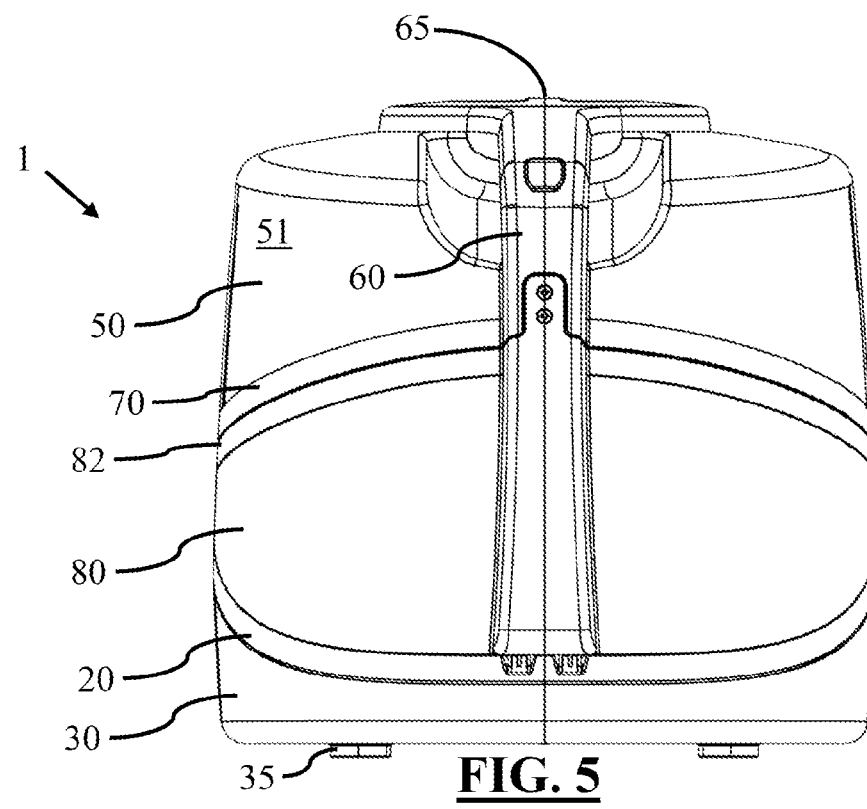
FIG. 5 is a rear view of a device.

FIG. 5 is a rear view of a device 1. The device 1 includes a handle 60. A portion of the handle 60 surrounds the cap 65. The handle 60 is affixed to a fresh tank 50. The fresh tank includes a fresh tank outer wall 51 and fresh tank bottom 53. The device 1 includes a used tank 80. The used tank 80 is covered by a used tank lid 82. The handle 60 extends down and is also affixed to the used tank 80. The used tank 80 is supported by an intermediate housing 20. The intermediate housing 20 rests on a bottom housing 30.

Figures 6, 7:
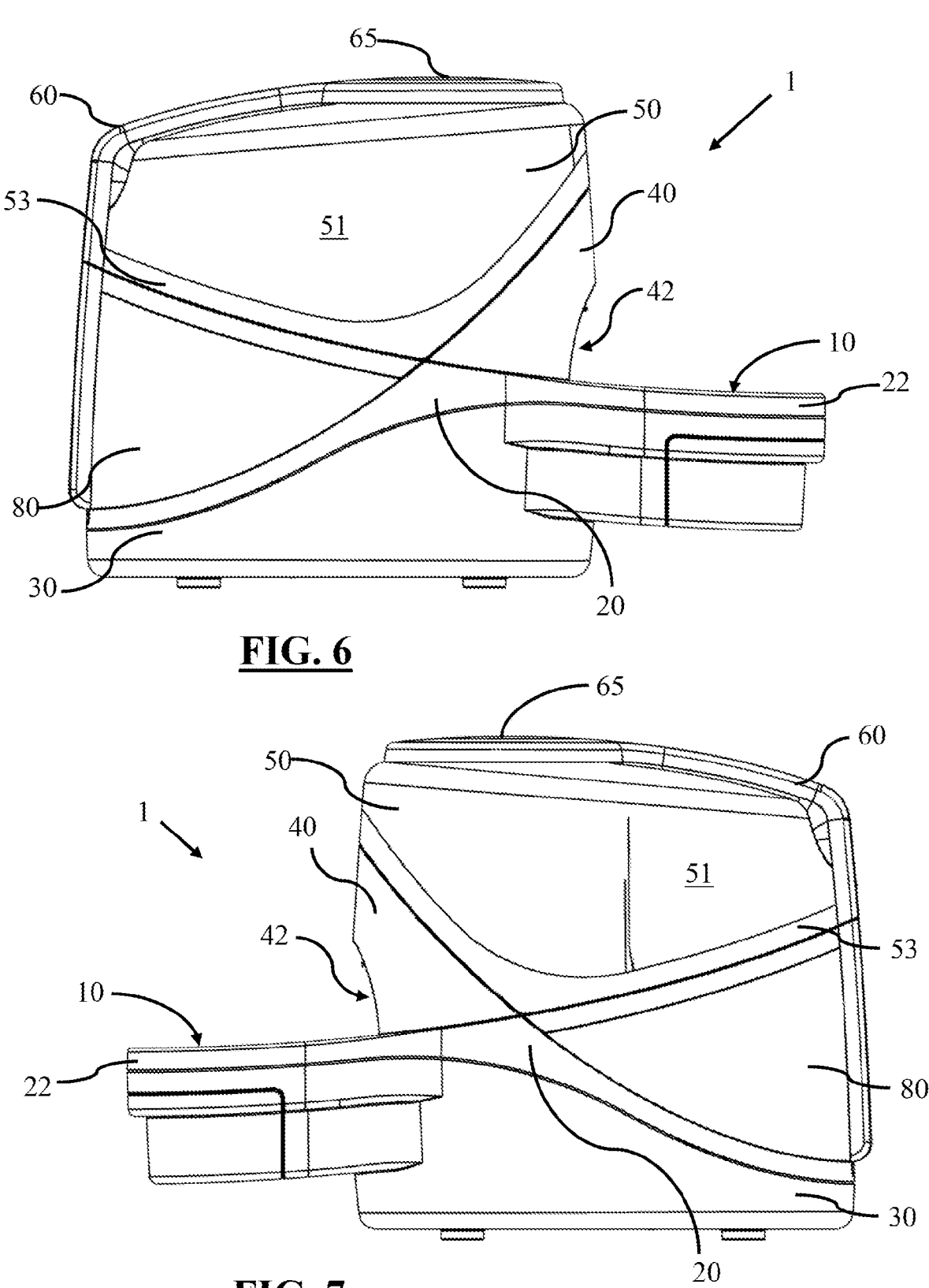
FIG. 6 is a left side view of a device.
FIG. 7 is a right side view of a device.

FIGS. 6 and 7 are side views of device 1. The device 1 includes a cap 65. The cap 65 seals the fresh tank 50. The device includes a handle 60. The handle 60 is affixed to both a fresh tank 50 and a used tank 80. The fresh tank 50 includes a fresh tank bottom 53 and fresh tank outer wall 51. In front of the fresh tank 50 is a front housing 40. The front housing 40 includes a spout pocket 42. The spout pocket 42 is located over a serving bowl 10. The serving bowl 10 rests within a serving cavity 22. The serving cavity 22 is part of an intermediate housing 20. The used tank 80 rests on the intermediate housing 20. The intermediate housing 20 rests on a bottom housing 30.

Figures 8, 9:
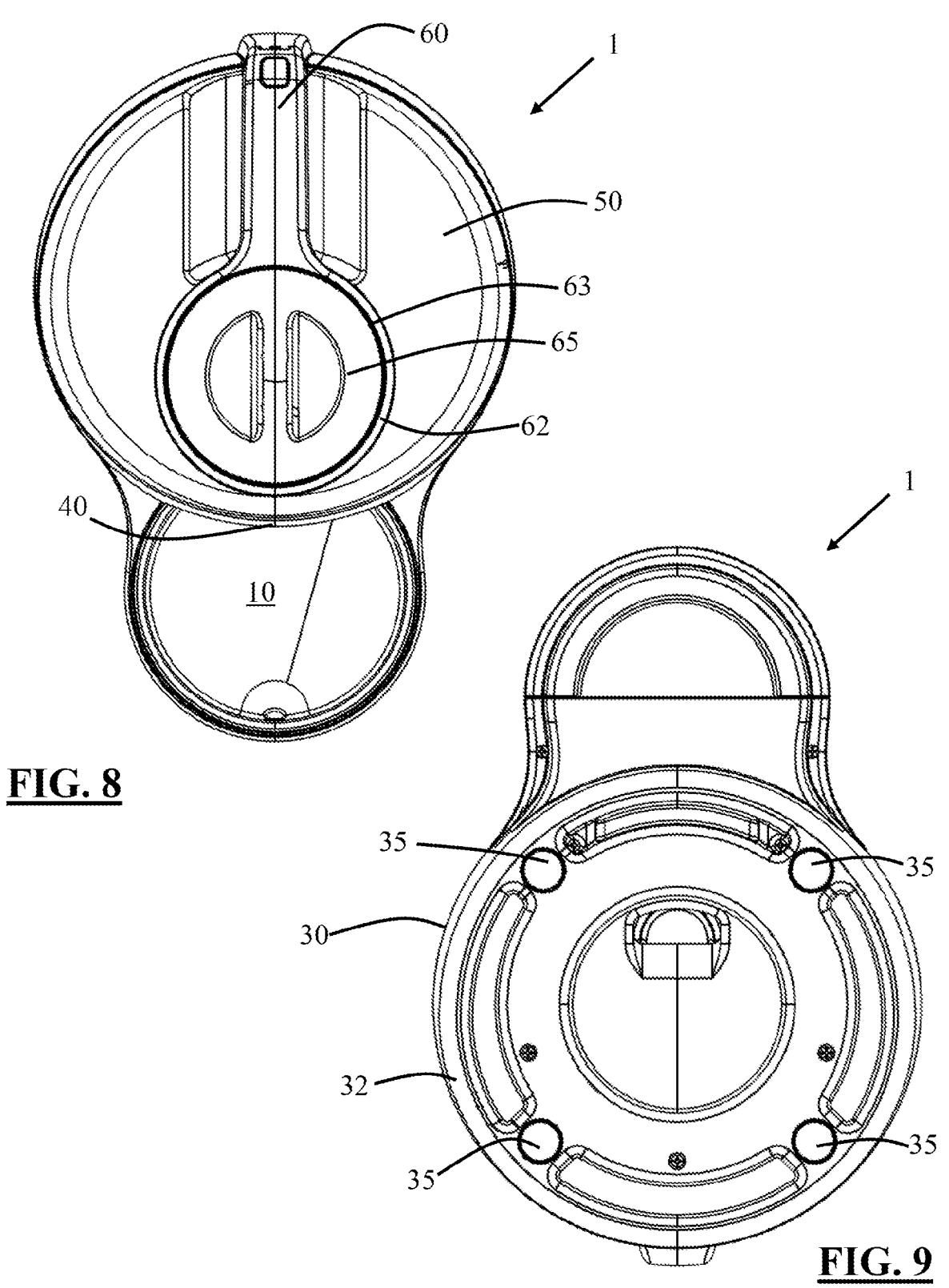
FIG. 8 is a top view of a device.
FIG. 9 is a bottom view of a device.

FIG. 8 is a top view of device 1. The device includes a fresh tank 50. The fresh tank 50 is sealed by a cap 65. The cap 65 may have a threaded engagement with an interior of an opening 63 of the fresh tank 50. The device 1 includes a handle 60. The handle 60 is supported on the fresh tank 50. The handle 60 includes a cap portion 62. The cap portion 62 encircles the cap 65. In front of the fresh tank 50 is a front housing 40. The front housing 40 is partially located over a serving bowl 10.

FIG. 9 is a bottom view of device 1. The device 1 includes a bottom housing 30. The bottom housing 30 includes the bottom surface 32. The bottom housing 30 includes a plurality of feet 35. The feet 35 are substantially evenly distributed about the bottom surface 32.

Figure 10:
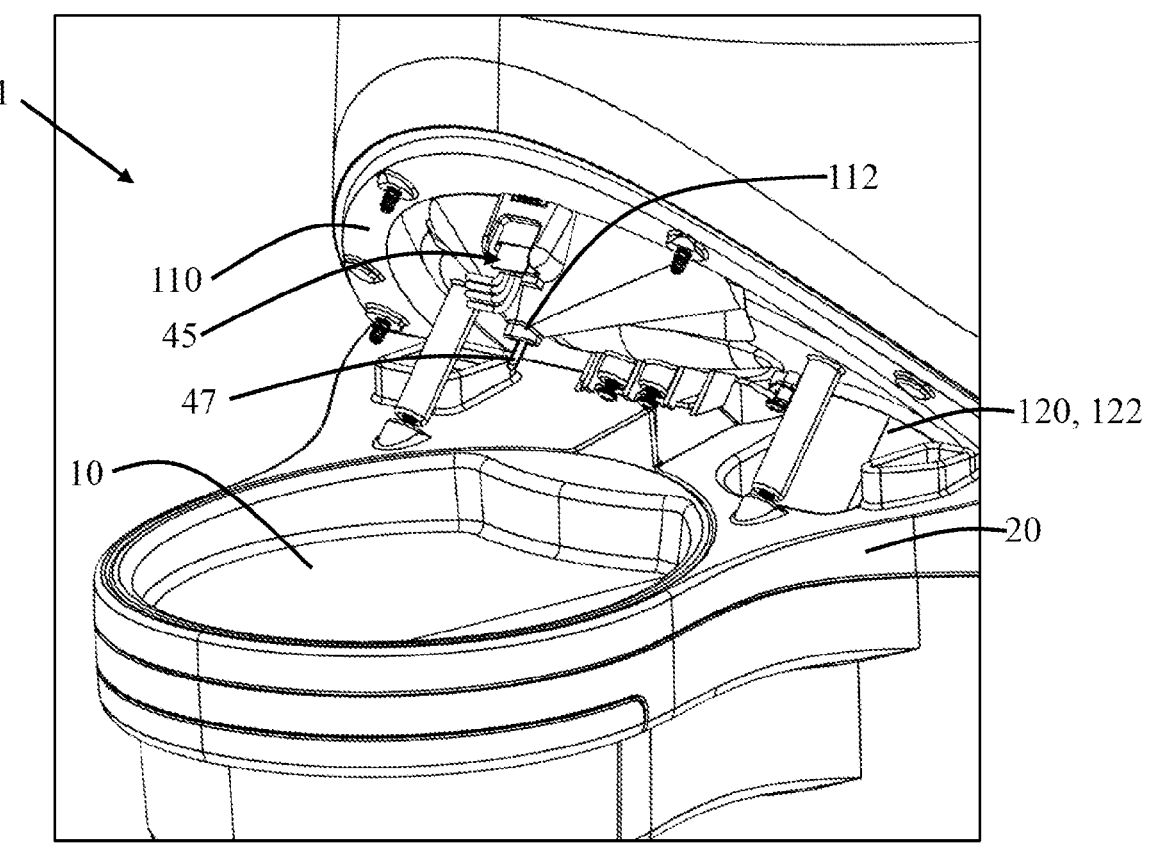
FIG. 10 is a perspective view of a device without a front housing.

FIG. 10 is a perspective view of device 1 with front housing 40 (not shown) removed. The device 1 includes a spout cover 110. The spout cover 110 includes a spout 112. Protruding from the spout 112 is a light pipe 47. The light pipe 47 is part of a lighting element 45. The spout 112 is positioned over a serving bowl 10. The serving bowl 10 rests on an intermediate housing 20. Resting in the intermediate housing 20 is a drive unit 120. The drive unit 120 includes a motor 122. Affixed to the motor 122 is a drive shaft 124 (not shown). Rotationally engaged with the drive shaft 124 may be a drive gear 126 (not shown).

Figure 11:
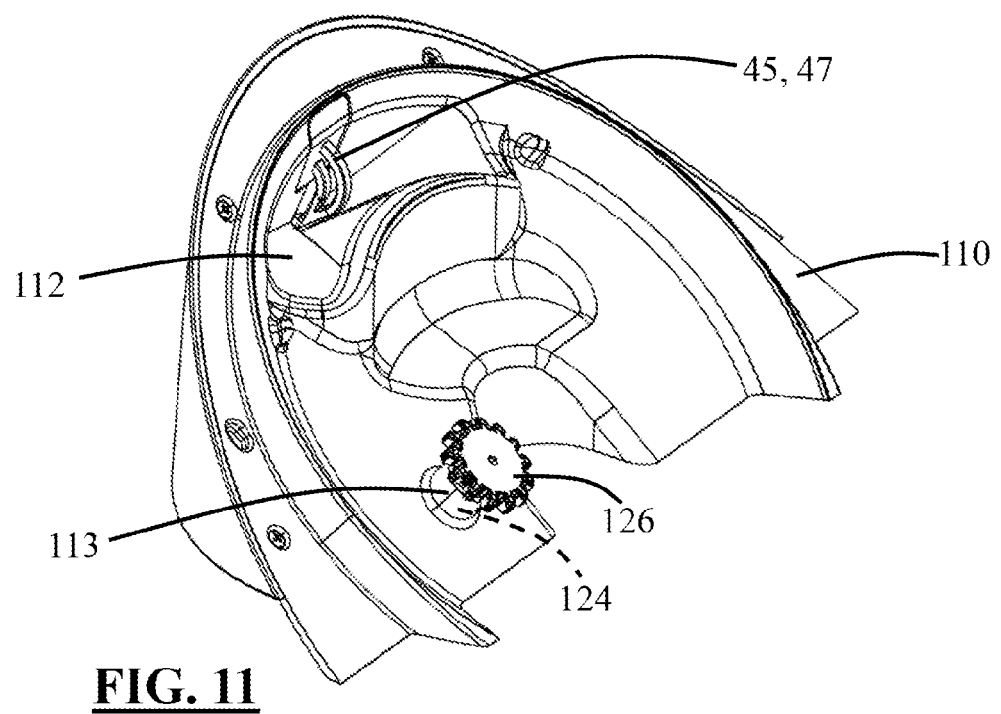
FIG. 11 is a top perspective view of a spout cover and supported components.

FIG. 11 is a rear perspective view of a spout cover 110. The spout cover 110 includes a spout 112. Extending into the spout 112 is a light pipe 47 of a lighting element 45. The spout cover 110 includes a drive housing 113. The drive housing 113 is formed as a hollow projection. A portion of the drive unit 120 projects through the drive housing 113. A drive shaft 124 may extend through and mate with a drive gear 126. The drive unit includes a drive gear 126.

Figures 12, 13:
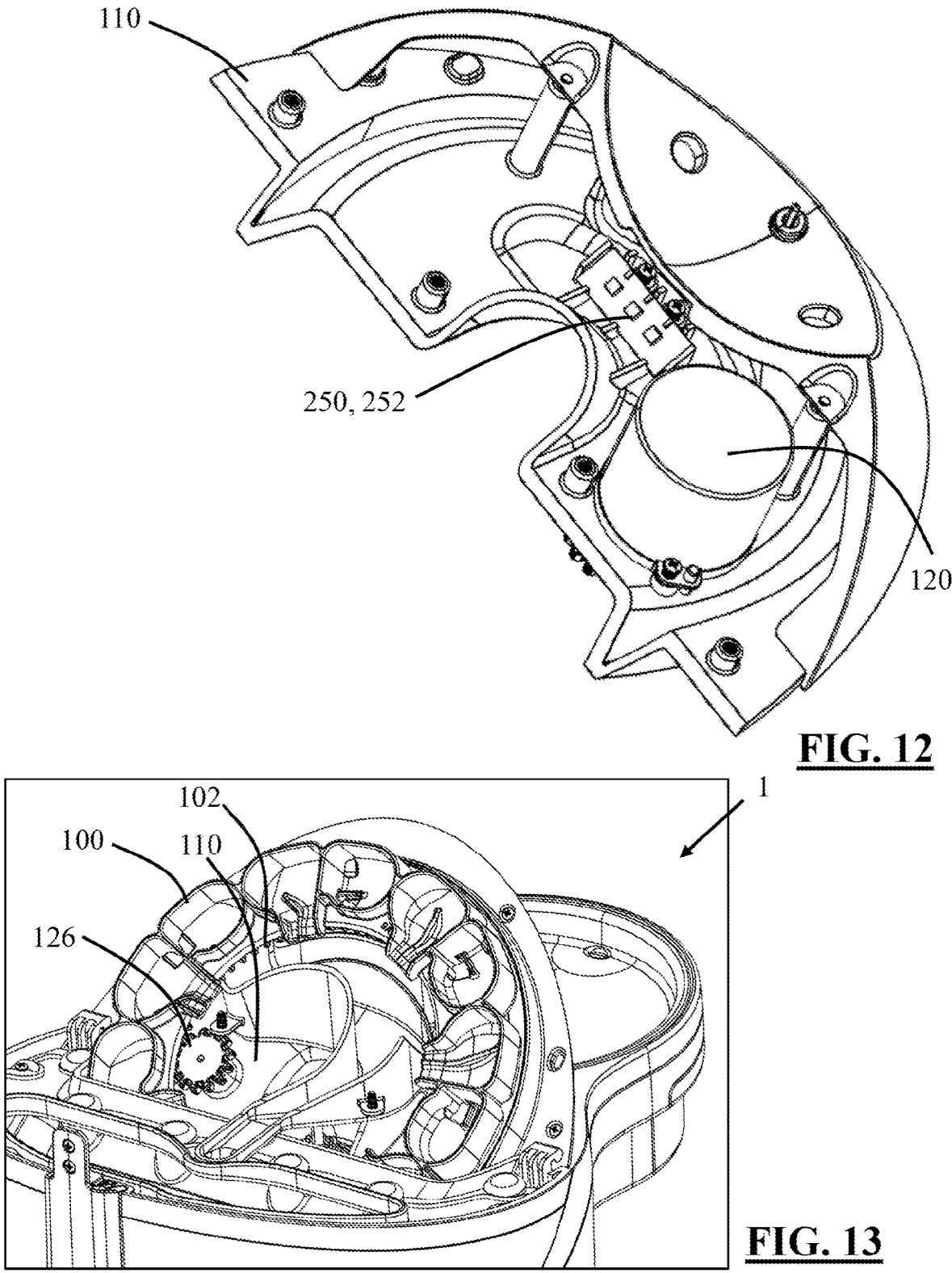
FIG. 12 is a bottom perspective view of a spout cover and supported components.
FIG. 13 is a perspective view of a device without a fresh tank.

FIG. 12 is a bottom perspective view of a spout cover 110. The spout cover 110 houses a portion of the drive unit 120. The spout cover 100 supports a sterilizing element 250. The sterilizing element 250 may be a UV light 252.

FIG. 13 is a partial view of the device 1 with a fresh tank 50 removed. The device 1 includes a carousel 100. The carousel 100 includes a track 102. The track 102 is a toothed wheel integrated about an interior perimeter of the carousel 100. The track 102 mates with a drive gear 126. The drive gear 126 is supported by the spout cover 110.

Figure 14:
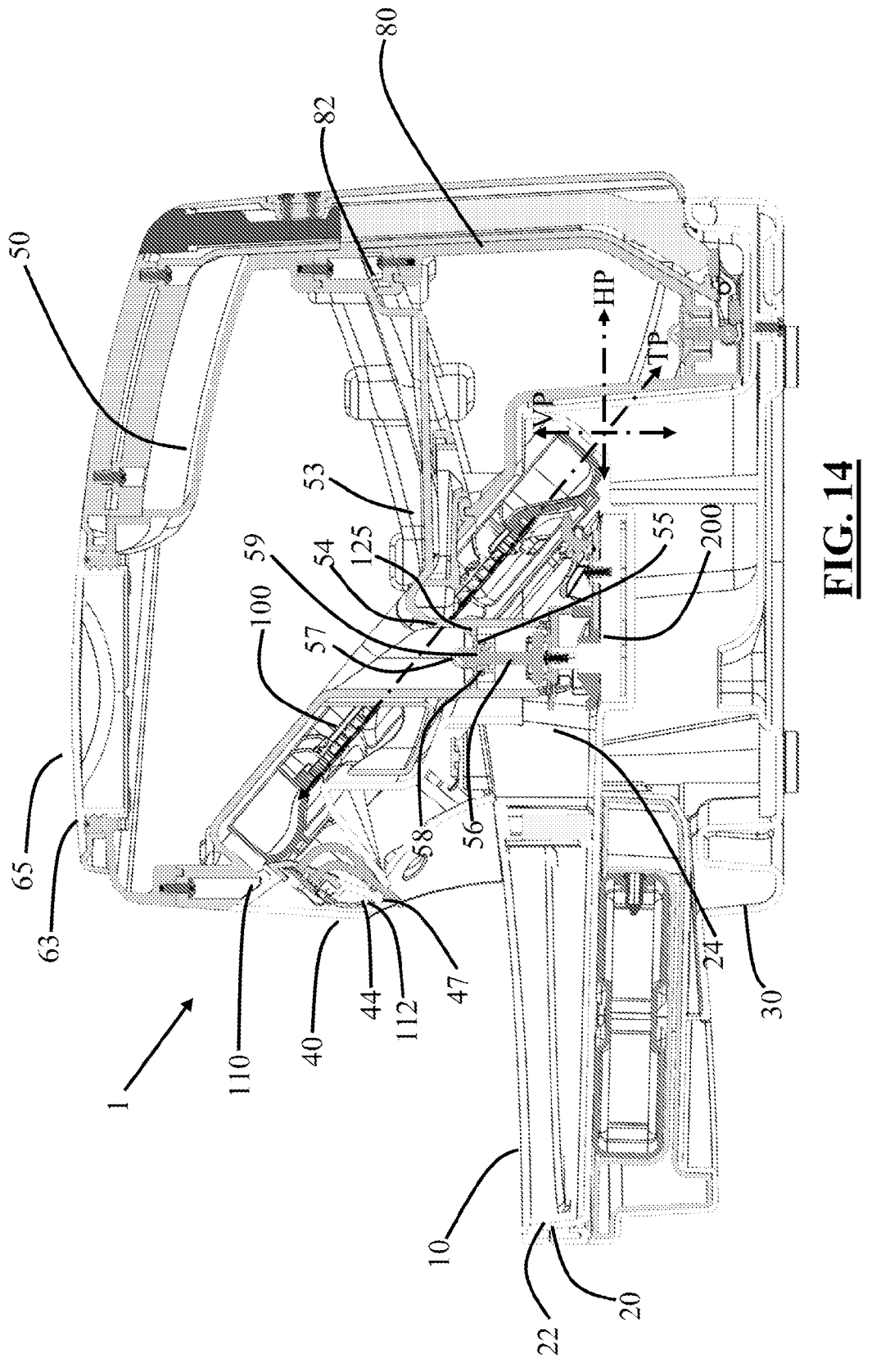
FIG. 14 is a cross-section view of a device along section A-A of FIG. 4.

FIG. 14 illustrates a cross-section of a device 1. The device 1 includes a cap 65. The cap 65 is located within an opening 63 of a fresh tank 50. Located in front of the fresh tank 50 is a front housing 40. Located between the fresh tank 50 and the front housing 40 is a spout cover 110. The spout cover 110 includes a spout 112. The spout 112 extends into a spout opening 44 of the front housing 40. Extending through the spout 122 is a lighting pipe 47. The spout 112 is located over a serving bowl 10. The serving bowl 10 is located within a serving cavity 22. The serving cavity 22 is part of an intermediate housing 20. The intermediate housing 20 also forms a reservoir 24. The intermediate housing 20 rests on a bottom housing 30. Supported by the intermediate housing 20 is a used tank 80. The used tank 80 is covered by a used tank lid 82. Located between the intermediate housing 20 and the fresh tank 50 is a carousel 100. The carousel 100 includes a track 102. The track defines a track plane TP. The track plane TP is angled relative to both a horizontal plane HP and vertical plane VP. The fresh tank 50 extends into the carousel 100. Specifically, a fill extension 54 formed on the bottom wall 53 of the fresh tank 50. The fill extension 54 includes a valve seat 125 having a fill opening 55 formed therethrough. Within the fill extension 54 is a valve assembly 56. The valve assembly 56 includes a seal 57 and a seal extender 59. The valve assembly 56 is moveably engaged with an actuator assembly 200. The carousel 100 interacts with an actuator assembly 200. The actuator assembly 200 is configured to move the seal extender 59 and seal 57 of the valve assembly 56 within the fill extension 54 such as to seal and unseal the fresh tank 50.

When the fresh tank 50 is unsealed by the valve assembly 56 (e.g., seal 57 and seal extender 59 are raised), liquid from the fresh tank 50 is able to flow into the reservoir 24. To unseal, the seal 57 and seal extender 59 of the valve assembly 56 are moved up within fill extension 54. To seal the fresh tank 50, the seal 57 and seal extender 59 of the valve assembly 56 are moved down within the fill extension 54. Upon moving down, the seal 57 rests on the valve seat 125. The valve assembly 56 is moved from a sealed position to an unsealed position, and vice-versa, by the actuator assembly 200.

Figure 15:
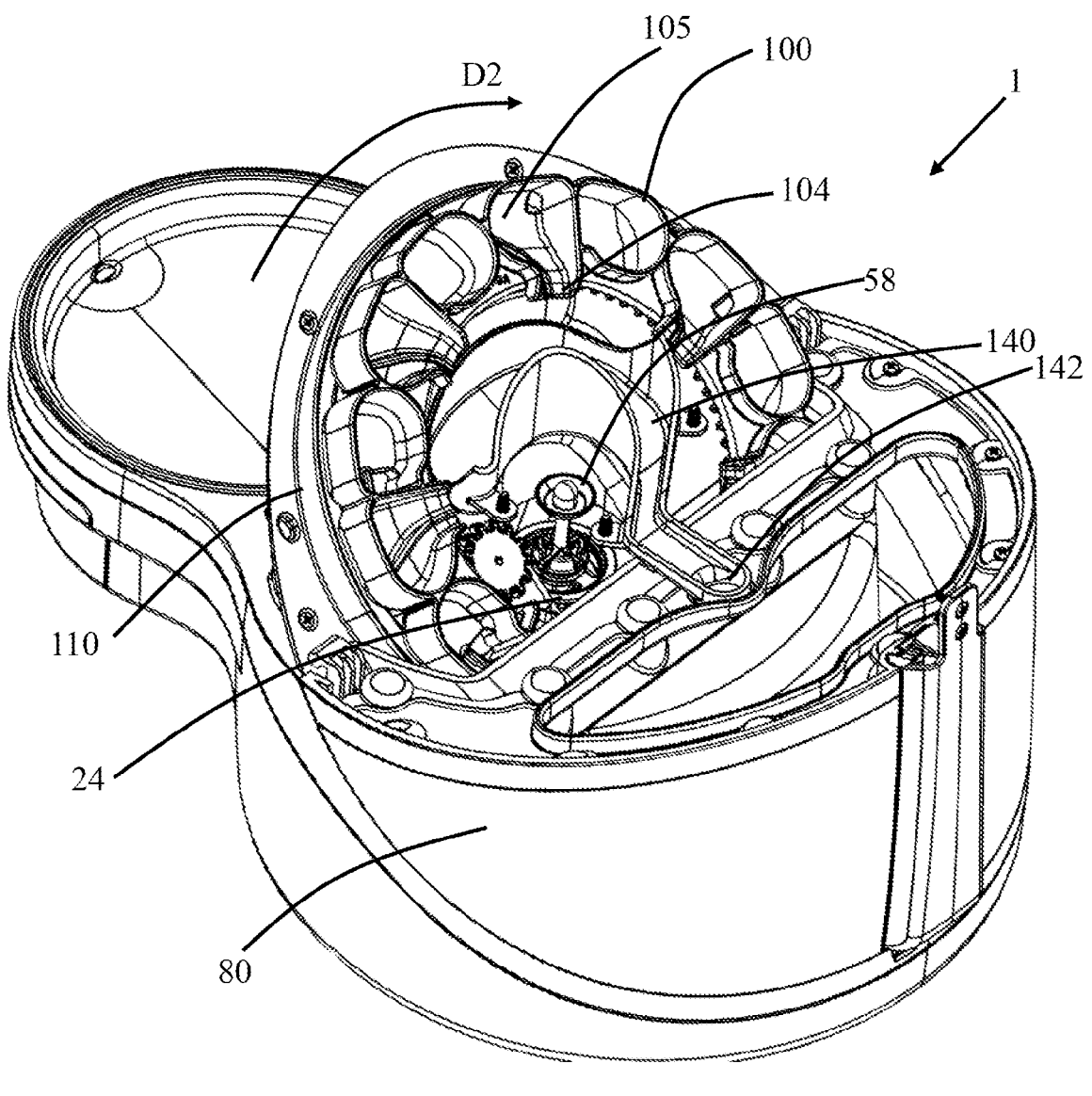
FIG. 15 is a perspective view of a device without a fresh tank.

FIG. 15 illustrates the device 1 with the used tank 80 exposed. The device 1 includes a carousel 100. The carousel 100 is supported by a spout cover 110. Within the central void of the carousel 100 is the cap assembly 58. Also within the central void of the carousel 100 is a channel 140. The channel 140 may be held in place by being supported by the spout cover 110 and/or being affixed to an underside of the fresh tank 50 (not shown). The channel 140 is in fluid communication with the carousel 100 and used tank 80. The carousel 100 includes a plurality of used liquid spouts 104. The channel 140 includes a channel outlet 142. The channel outlet 142 is in fluid communication with the used tank 80. As liquid collects in the channel 140, the liquid then drains from the channel 140 via the channel outlet 142 and into the used tank 80. The liquid enters the channel 140 from the carousel 100 via the used liquid spouts 104. The carousel 100 collects liquid from the reservoir 24 within empty tubs 105 when rotating in a second direction D2 (e.g., empty direction, clockwise direction from top view). The carousel 100 empties the liquid via the used liquid spouts 104 when rotating in the second direction D2. When rotating in an opposing, first direction D1 (not shown), the carousel 100 may fill the reservoir 24 with liquid and/or recirculate liquid into a serving bowl 10 via a spout 112 (not shown).

Figures 16, 17, 18:
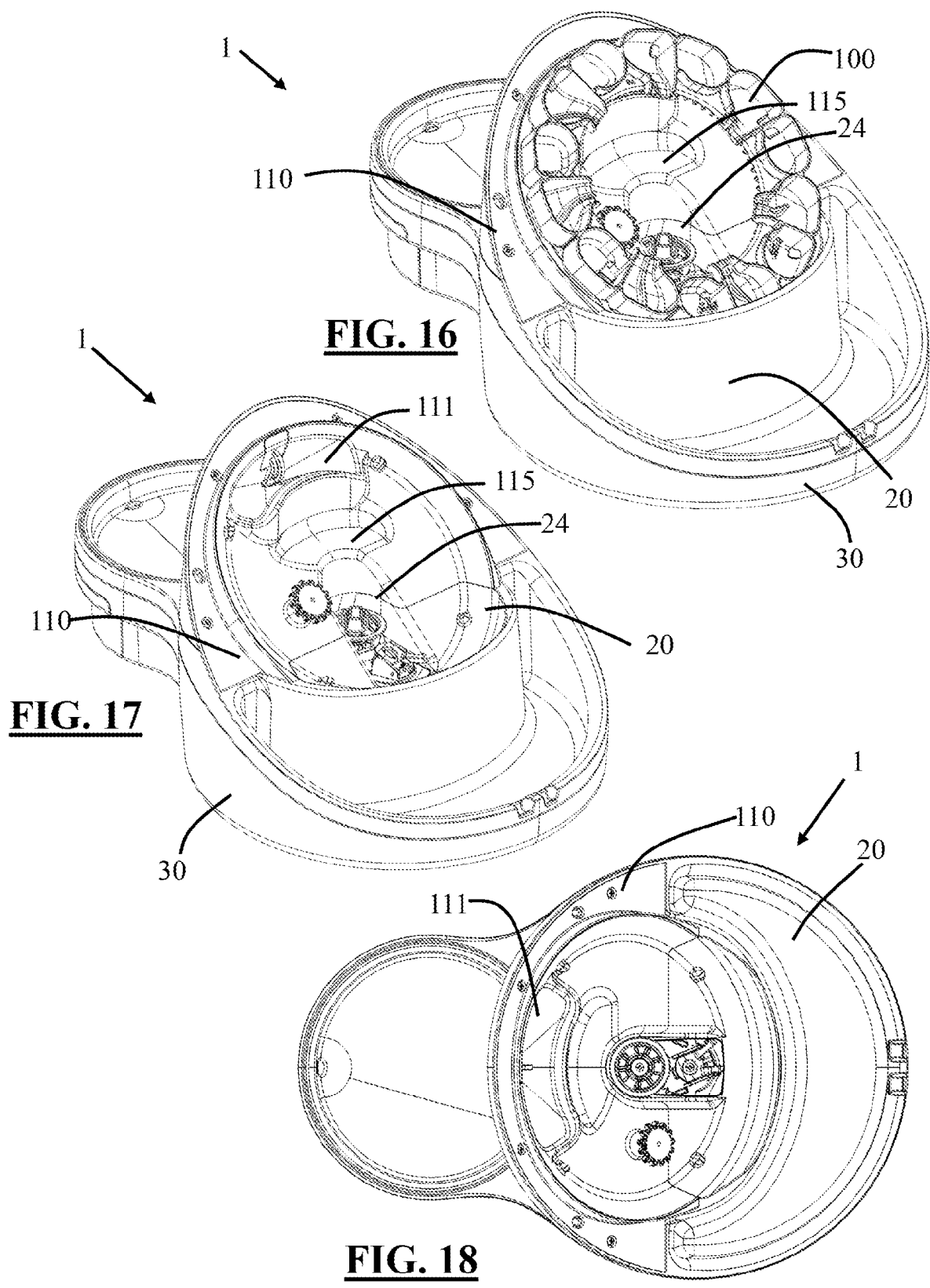
FIG. 16 is a perspective view of a device without a fresh tank or a used tank.
FIG. 17 is a perspective view of a housing and supported components.
FIG. 18 is a top view of a housing and supported components.

FIGS. 16 and 17 are rear perspective views of the device 1. Both views have the fresh tank 50 and used tank 80 removed. FIG. 16 illustrates the carousel 100. The carousel is supported by both the spout cover 110 and the intermediate housing 20. The intermediate housing 20 rests upon bottom housing 30. Together, the spout cover 110 and intermediate housing 20 form the reservoir 24. The spout cover 110 includes channel a cavity 115. A portion of the channel 140 (not shown) may reside within and be supported by the channel cavity 115. FIG. 16 exposes a spout funnel 111 which tapers toward the spout (not shown).

FIG. 18 is a top view of the device 1 with the fresh tank 50 and carousel 100 removed with the spout cover 110 and intermediate housing 20 exposed. The spout cover 110 includes a spout funnel 111. The spout funnel 111 tapers toward the spout 112 (not shown).

Figures 19, 20, 21, 22:
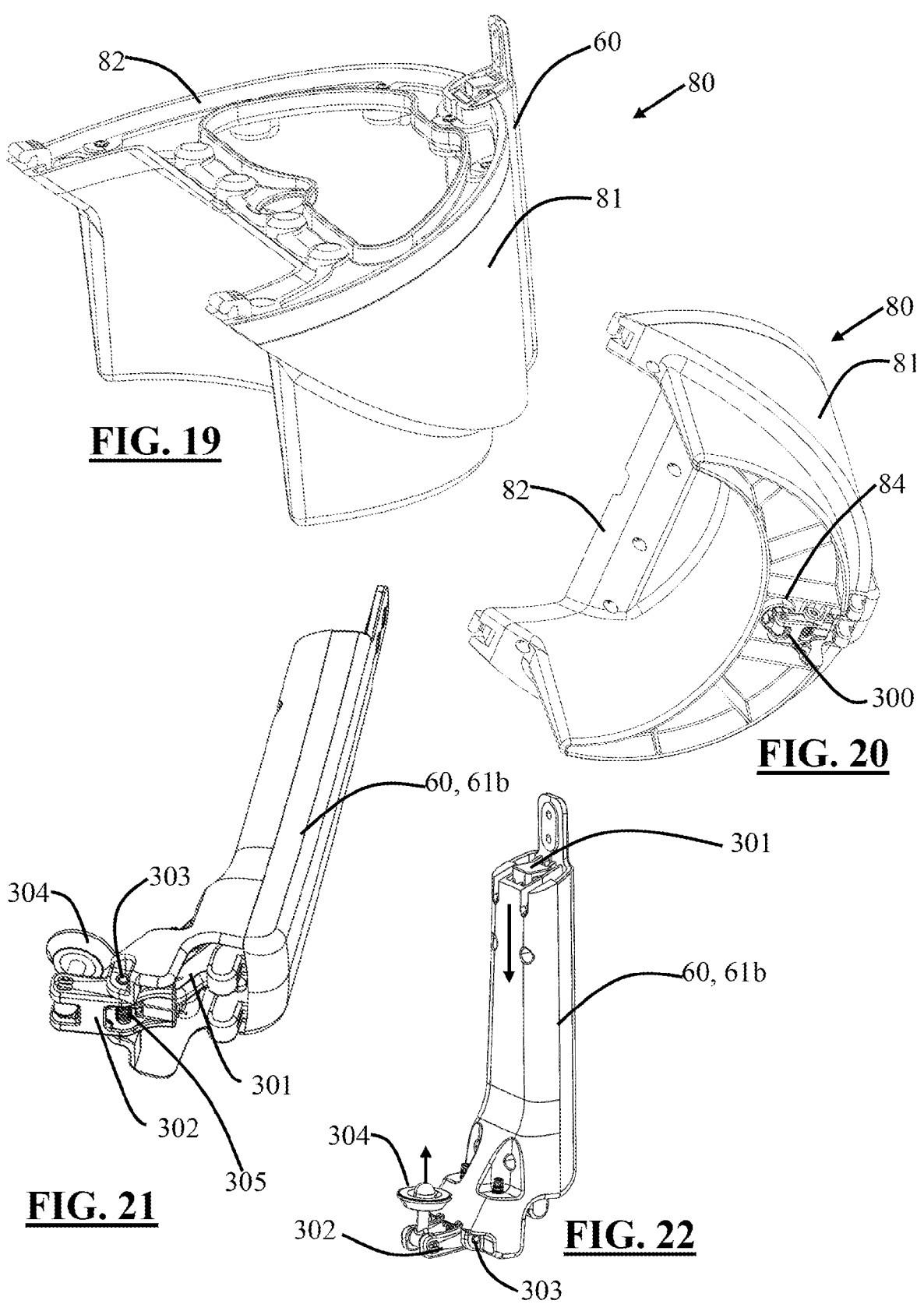
FIG. 19 is a front perspective view of a used tank.
FIG. 20 is a bottom perspective view of a used tank.
FIG. 21 is a perspective view of a stopper valve assembly.
FIG. 22 is a perspective view of a stopper valve assembly.

FIGS. 19-20 illustrate a used tank 80. The used tank 80 includes an outer wall 81. The outer wall 81 may form a hollow interior of the used tank 80. The used tank 80 may include a used tank lid 82. The used tank lid 82 may be able to engage with the bottom wall 53 of the fresh tank 50 (not shown). The used tank lid 82 includes a channel opening 83. The channel opening 83 may be aligned with and/or receive a portion of a channel outlet 142 (not shown). Opposite the used tank lid 82 is a stopper valve assembly 300. The stopper valve assembly 300 plugs a drain opening 84 of the used tank 80. The stopper valve assembly 300 is assembled to the handle 60.

FIGS. 21-22 illustrate a portion of a handle 60 and stopper valve assembly 300. The portion of the handle 60 may be a channel portion 61*b*. The handle 60 is hollow such as to form a channel. Within the handle 60 is a translation rod 301. The translation rod 301 is driven downward when a release button 67 (not shown) on the handle 60 is pressed. Upon the translation rod 301 translating downward, the translation rod 301 causes rotation of a valve link 302. The valve link 302 rotates about link pin 303. Rotation of the valve link 302 causes upward movement of a stopper valve 304. The upward movement of the stopper valve 304 results in a drain opening 84 (not shown) being opened such that liquid may drain through the drain opening 84. Once the release button 67 (not shown) is released, a spring 305 may bias the valve link 302 such as to cause downward movement of the stopper valve 304. The biasing also causes the valve link 302 to translate the translation rod 301 upward.

Figures 23A, 23B, 24:
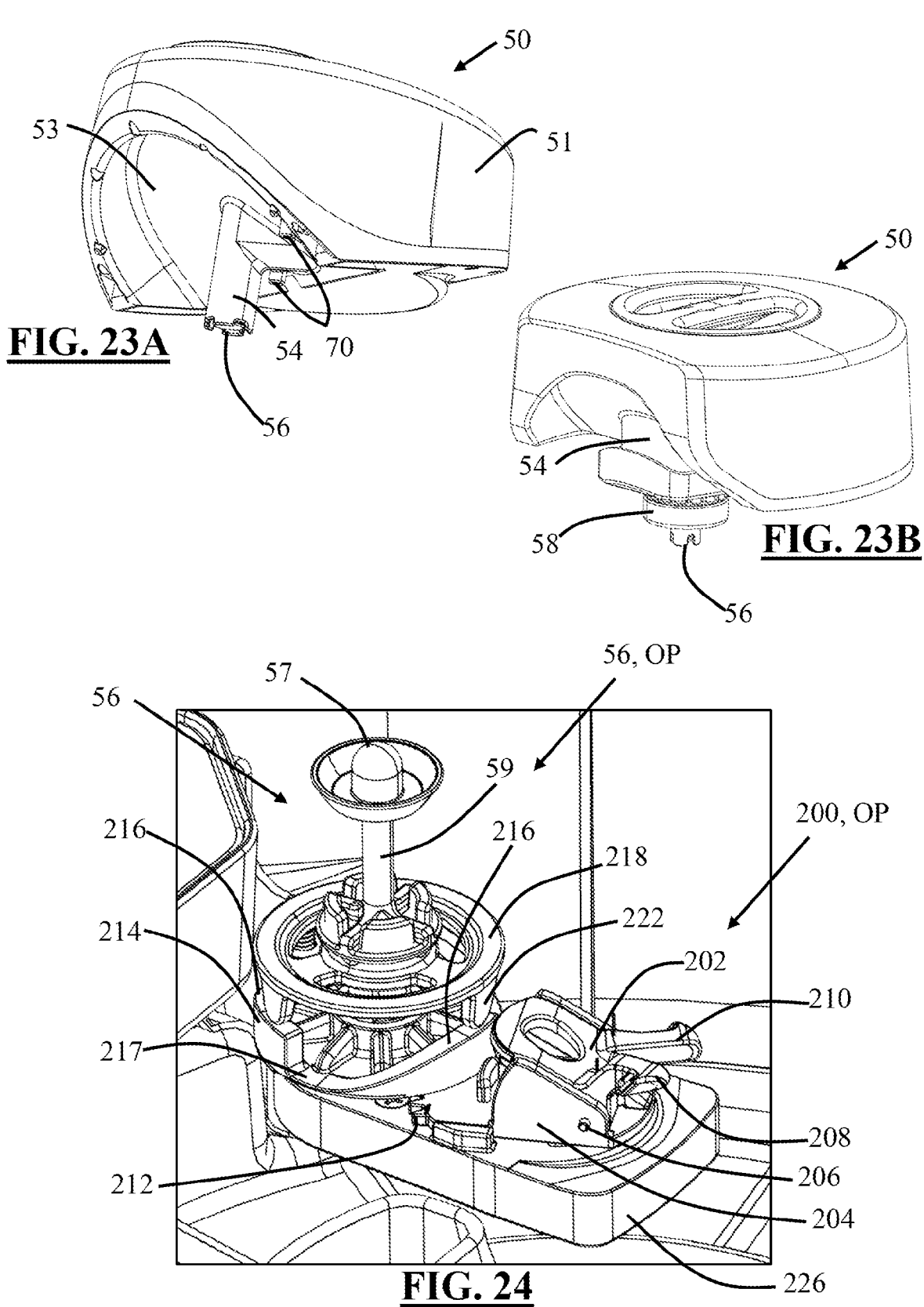
FIG. 23A is a perspective view of a fresh tank.
FIG. 23B is a perspective view of a fresh tank.
FIG. 24 is a perspective view of an actuator assembly and valve assembly.
Figures 25, 26, 27:
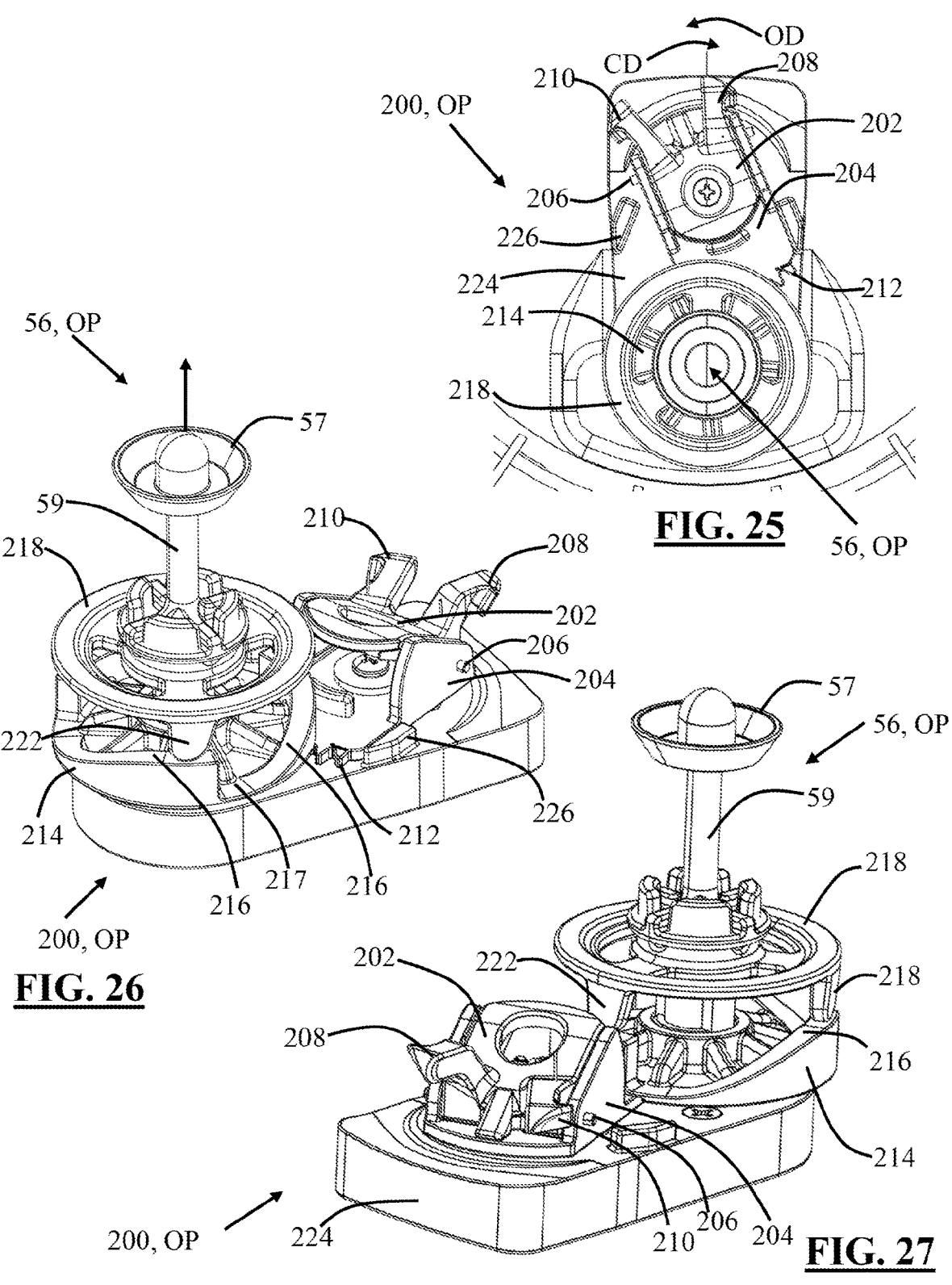
FIG. 25 is a top view of an actuator assembly and a valve assembly.
FIG. 26 is a front perspective view of an actuator assembly and a valve assembly.
FIG. 27 is a rear perspective view of an actuator assembly and a valve assembly.

FIGS. 23A and 23B are a front perspective view of a fresh tank 50. The fresh tank 50 includes an outer wall 51 and a bottom wall 53. Formed in the bottom wall 53 is a fill extension 54. In FIG. 23A, also formed in the bottom wall 53 are bosses 70. The bosses 70 may receive fasteners of a channel 140 (not shown) so as to affix the channel 140 to the fresh tank 50. In FIG. 23A, a valve assembly 56 is engaged with the fill extension 54. In FIG. 23B, the fill extension 54 is engaged with a cap assembly 58. The cap assembly 58 may be used to engage with and retain a channel 140 (not shown). The cap assembly 58 includes the valve assembly 56 therein.

Figure 28:
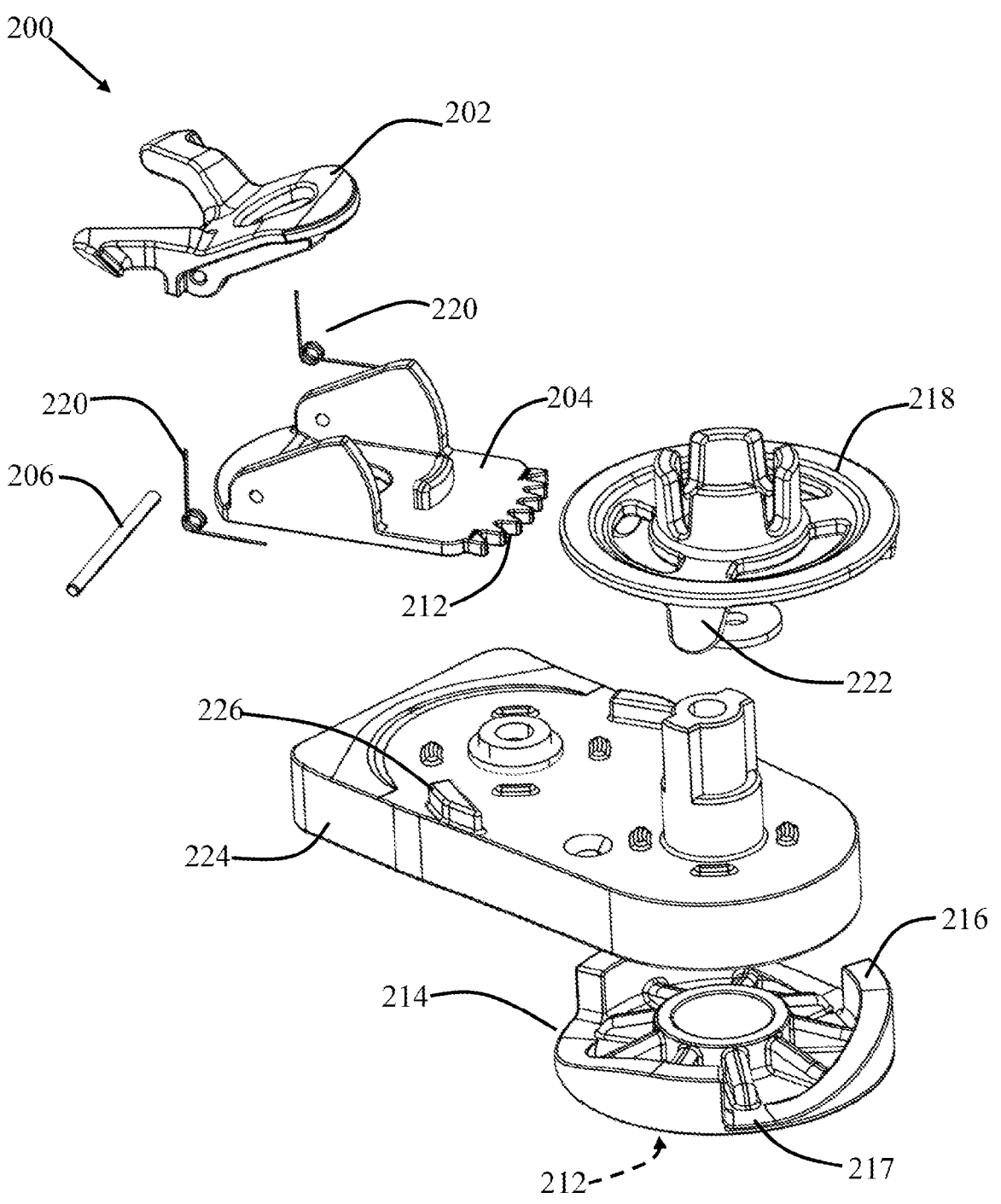
FIG. 28 is an exploded view of an actuator assembly.

FIGS. 24-27 illustrate an actuator assembly 200 and a valve assembly 56 in an open position OP. FIG. 28 is an exploded view of the actuator assembly 200. The actuator assembly 200 includes a yoke 202. The yoke 202 includes an upper tang 208 and a lower tang 210. The yoke 202 is affixed to a rotatable mount 204. The yok 202 and rotatable mount 204 are rotatable. Rotation occurs in a closing direction CD and/or opening direction OP. The rotatable mount 204 is rotatably mounted on an insert 224. The insert 224 includes stops 226. The stops 226 limit rotation of the yoke 202 and rotatable mount 204. The yoke 202 is affixed to the rotatable mount 204 via a pin 206. The yoke 202 is able to rotate about the pin 206. The yoke 202 is biased via a spring 220 (as shown in FIG. 28). The spring 220 may reside between an inside of a wall of the rotatable mount 204 and an outside of the yoke 202. The spring 220 may be located on the pin 206. The rotatable mount 204 includes gear teeth 212. The gear teeth 212 intermesh with gear teeth 212 (not shown) of a disc 214. The disc 214 includes a ramped surface 216 and a non-ramped surface 217. Above the disc 214 is a pusher 218. The pusher 218 includes extensions 222. The pusher 218 is configured to remain rotationally static relative to the disc 214. The pusher 218 is configured to longitudinally translate (e.g., up and down) via rotation of the disc 214. The actuator assembly 200 is affixed to the valve assembly 56. The valve assembly 56 includes a seal 57 and seal extender 59. The pusher 218 is affixed to a seal extender 59. The seal extender 59 is affixed to a seal 57.

Figures 29, 30, 31:
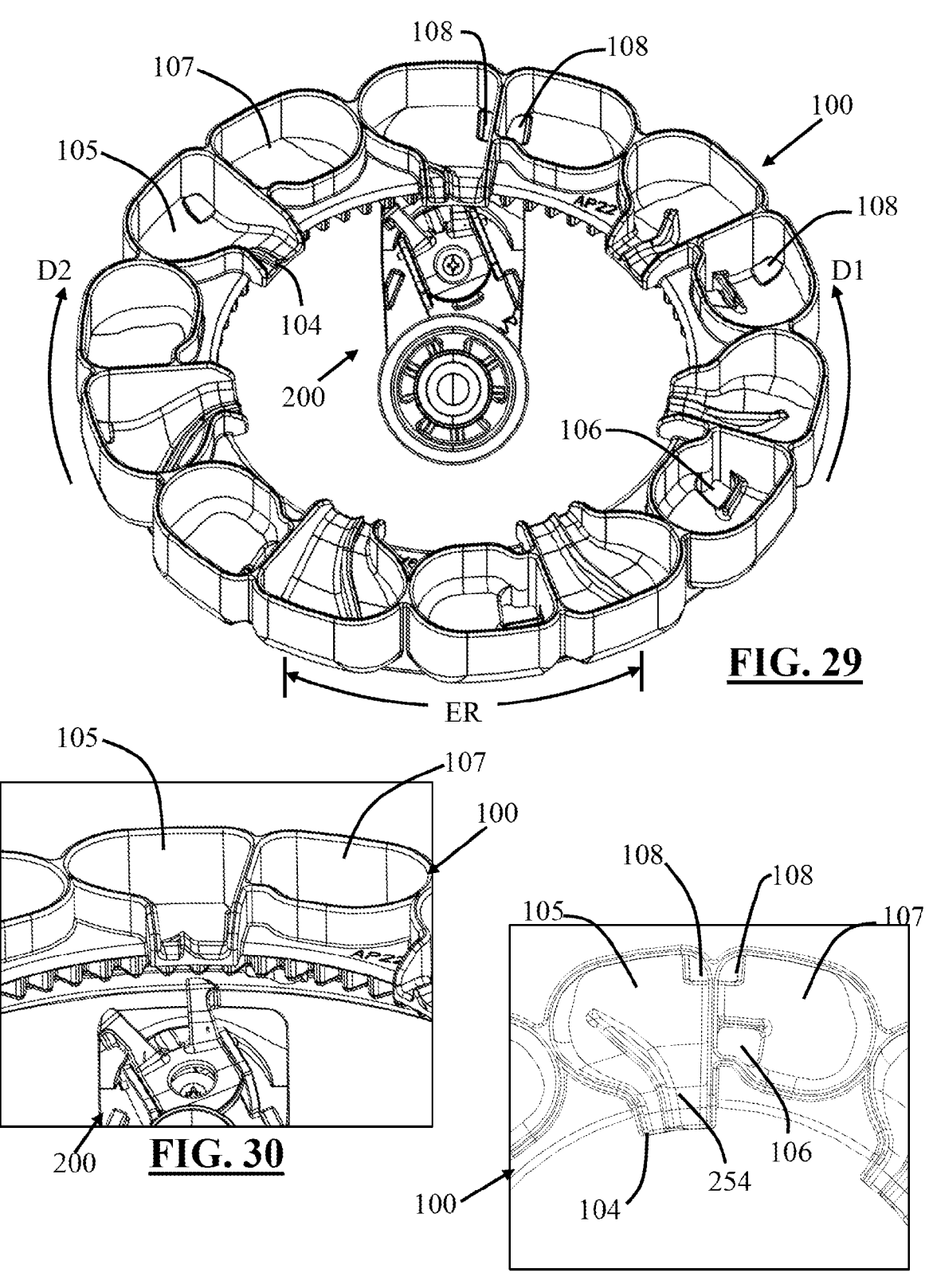
FIG. 29 is a top view of a carousel in relation to an actuator assembly.
FIG. 30 is a close-up view of a carousel and actuator assembly.
FIG. 31 is a close-up view of a carousel.

FIGS. 29 and 30 are a top view of an actuator assembly 200 and carousel 100. The carousel 100 is rotatable in a first direction D1 and in a second direction D2. The carousel 100 includes a plurality of empty tubs 105 and circulation tubs 107. Each of the empty tubs 105 and circulation tubs 107 includes a tub opening 108. The tub opening 108 allows for the empty tubs 105 and circulation tubs 107 to be in fluid communication with the reservoir 24 (not shown). Rotating in the first direction D1, the carousel 100 passes through the reservoir 24 (not shown). Liquid within the reservoir 24 enters the circulation tubs 107 via the tub openings 108. Rotating in the second direction D2, the carousel 100 passes through the reservoir 24 (not shown). Liquid within the reservoir 24 enters the empty tubs 105 via the tub openings 108. When each empty tub 105 or circulation tub 107 is rotated to an emptying range ER, liquid may drain from the empty or circulation tub 105, 107 via a respective used liquid or circulation spout 104, 106. Liquid draining from a used liquid spout 104 may flow into a channel 140 (such as shown in FIGS. 12 and 13). Liquid draining from a circulation spout 106 may flow into a spout funnel 111 (such as shown in FIGS. 12-14).

FIG. 31 is a close-up view of an empty tub 105 and a circulation tub 107 of a carousel 100. The circulation tub 107 includes a tub opening 108. Opposite the tub opening 108 is a circulation spout 106. The empty tub 105 includes a tub opening 108. The tub openings 108 of adjacent circulation tubs 107 and empty tubs 105 are substantially mirrored to one another. The empty tub 105 includes a guide wall 254. The guide wall 254 leads up to the used liquid spout 104.

Figure 32:
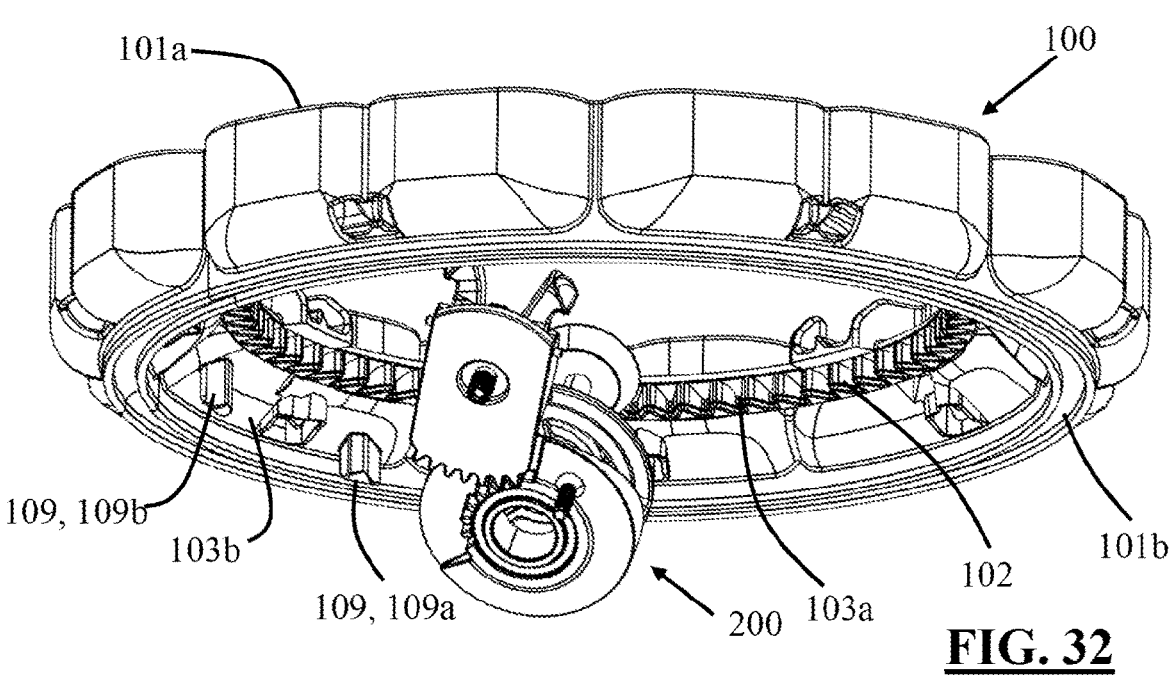
FIG. 32 is a bottom perspective view of a carousel in relation to an actuator assembly.
Figure 33:
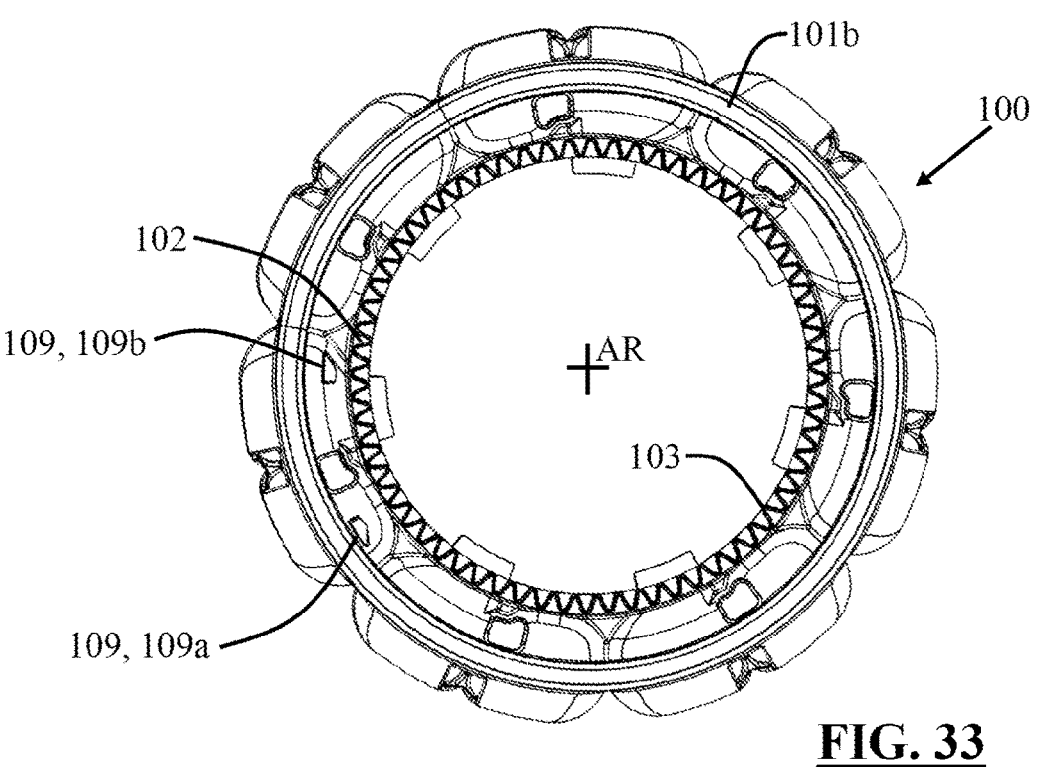
FIG. 33 is a bottom view of a carousel.

FIGS. 32 and 33 are bottom views of a carousel 100, with FIG. 32 including an actuator assembly 200. The carousel 100 includes a track 102 about an inside periphery 103. The track 102 enables rotation about an axis of rotation AR. The track 102 is closer to an upper surface 101$a$ than a lower surface 101$b$. The carousel 100 includes an interior surface 103$b$. The interior surface 103$b$ tapers from a lower surface 101$b$ toward the track 102 upper surface 101$a$. An interior surface 103$b$ of the carousel 100 includes two tabs 109. The two tabs 109 include an open tab 109$a$ and a close tab 109$b$.

Figure 34:
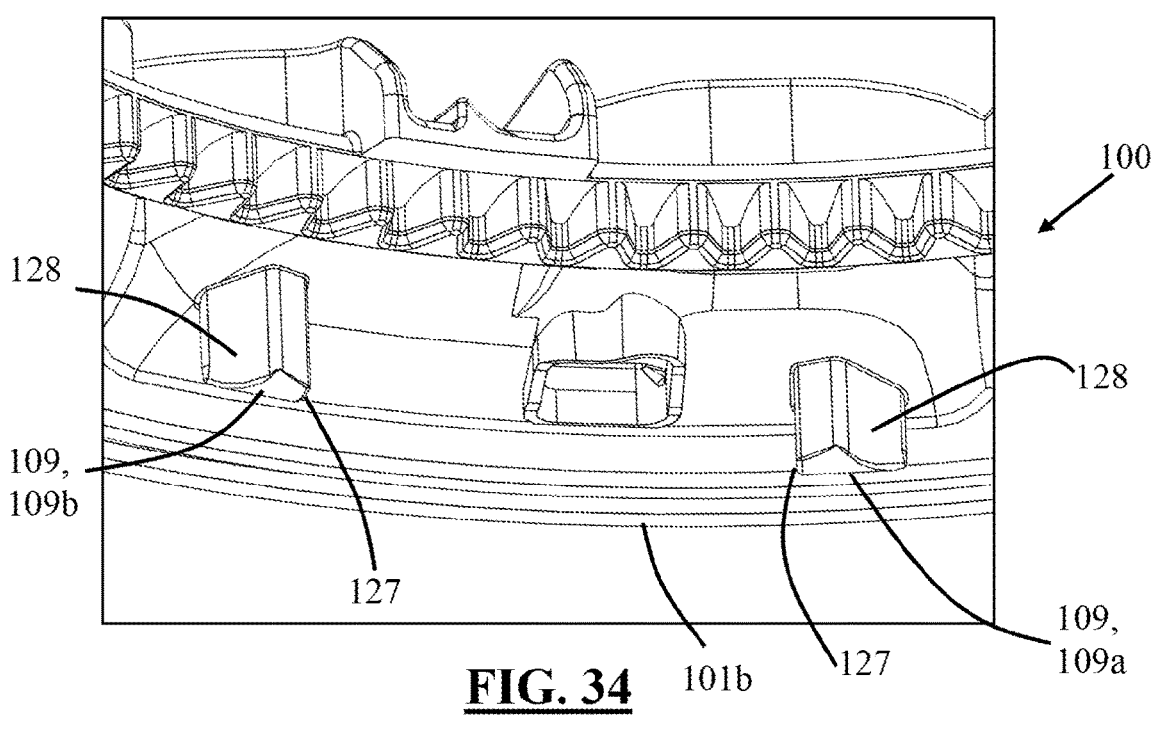
FIG. 34 is a close-up inner view of tabs of a carousel.
Figure 35:
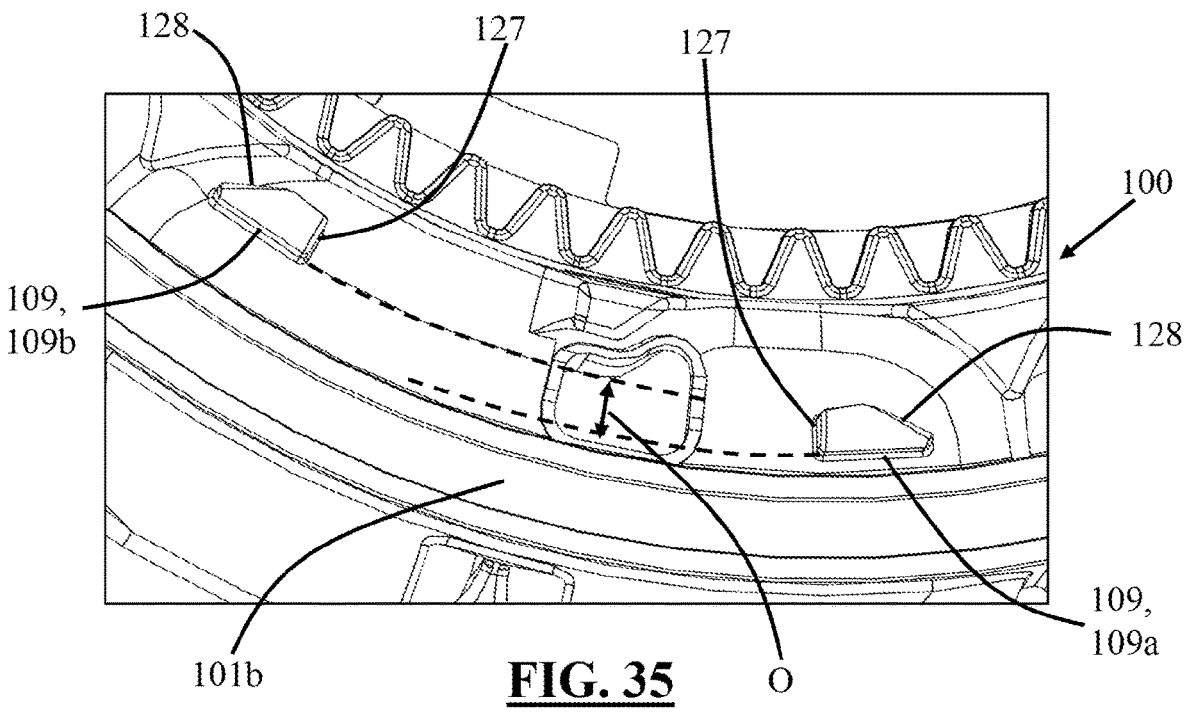
FIG. 35 is a close-up bottom view of tabs of a carousel.

FIGS. 34-35 are close-up views of tabs 109 of a carousel 100. Both tabs 109 include an actuation surface 127 and a bypass ramp 128. The actuation surfaces 127 of both tabs 109 face toward one another. Each bypass ramp 128 is generally opposite and askew (e.g., offset angle between parallel and perpendicular) to the actuation surface 127 of the same tab 109. The two tabs 109 are offset O from each other and relative to their distance from the downward facing edge 101$b$.

Figure 36:
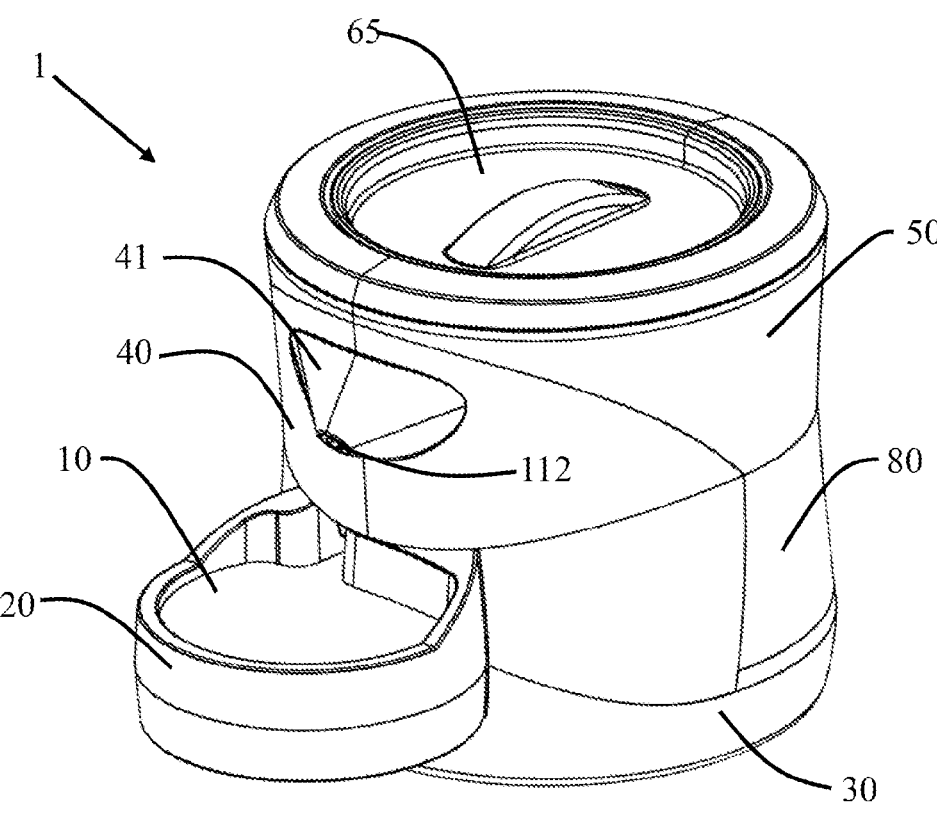
FIG. 36 is a front perspective view of a device.
Figure 37:
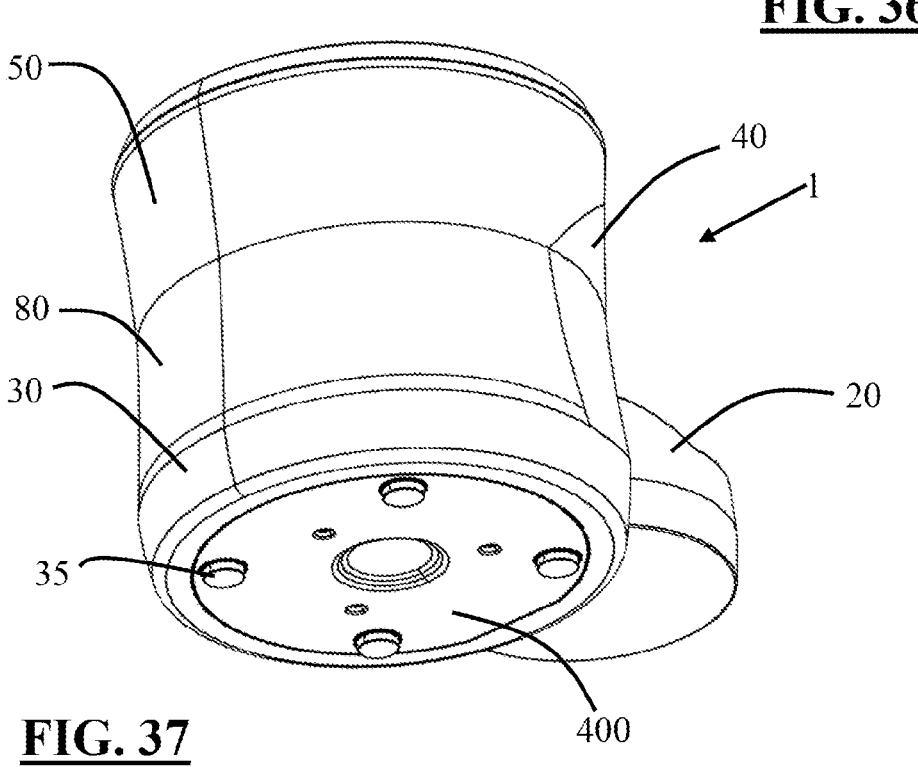
FIG. 37 is a rear perspective view of a device.

FIGS. 36 and 37 illustrate a device 1. The device 1 is a liquid dispensing device. The device 1 includes a serving bowl 10. The serving bowl 10 is retained by an intermediate housing 20. Below and supporting the intermediate housing 20 is a bottom housing 30. The bottom housing 30 houses a scale 400. The scale 400 includes a plurality of feet 35. Located above the intermediate housing 20 is a front housing 40. The front housing 40 includes a spout housing 41. A spout 112 is located within the spout housing 41. The device 1 includes a fresh tank 50. The fresh tank 50 includes a cap 65. Located below the fresh tank 50 is also a used tank 80.

Figure 38:
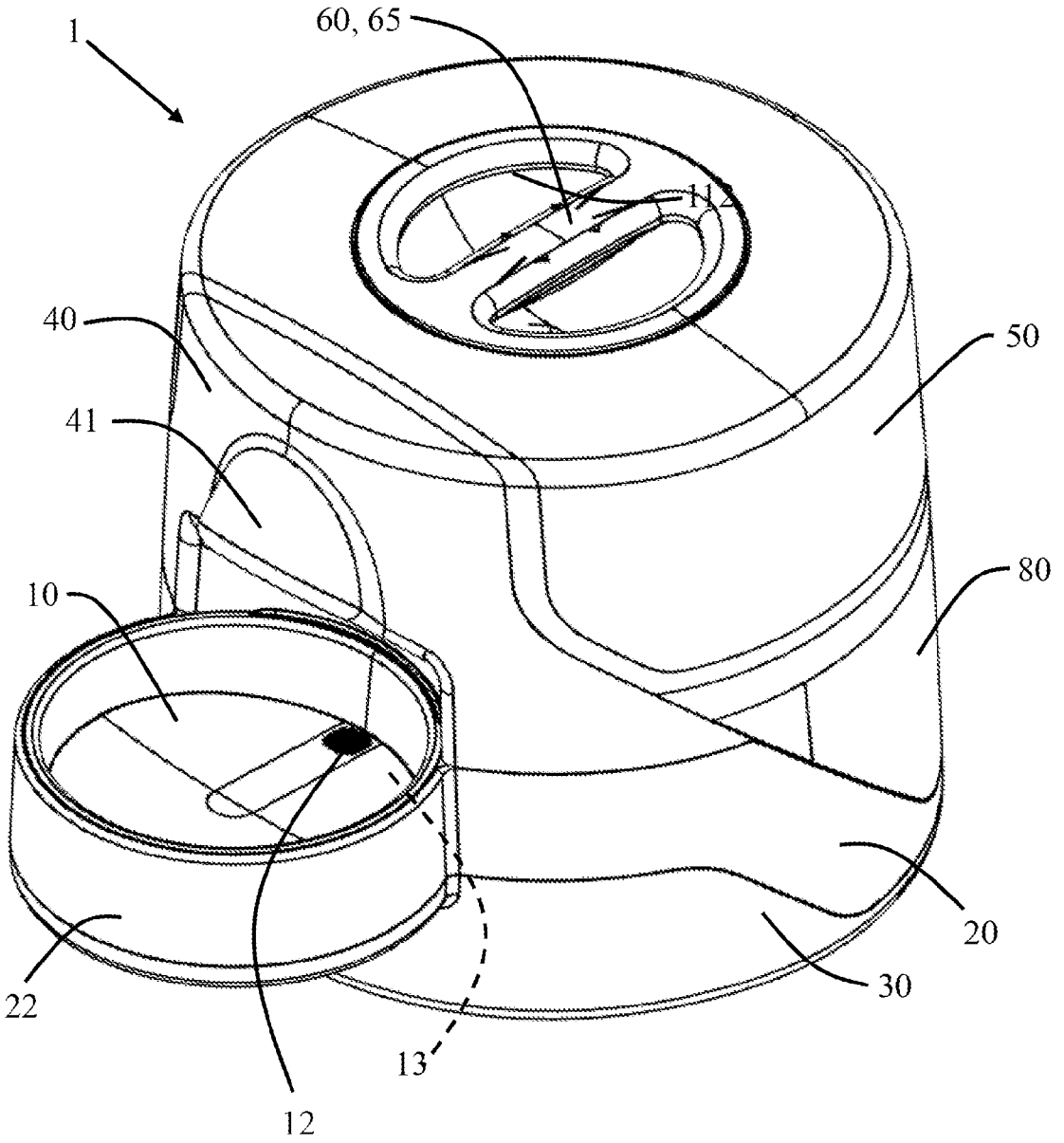
FIG. 38 is a front perspective view of a device.

FIG. 38 illustrates a device 1. The device 1 is a liquid dispensing device. The device 1 includes a serving bowl 10. The serving bowl 10 includes a drain 12. Between the drain 12 and an interior of the device 1 is a filter 13. The serving bowl 10 and filter 13 are retained in place by an intermediate housing 20. Below and supporting the intermediate housing 20 is a bottom housing 30. Located above the intermediate housing 20 is a front housing 40. The front housing 40 includes a spout housing 41. The device 1 includes a fresh tank 50. The device 1 includes a cap 65 and handle 60. Located below the fresh tank 50 is also a used tank 80.

WORKING EXAMPLES

Example A: Actuator Assembly and Carousel

With reference to the exemplary teachings of FIGS. 24-35.

The actuation surface 127 of the open tab 109$a$ is configured to contact a flat side of flat side of a lower tang 210. The contact occurs when the carousel 100 is rotated in a first direction D1. The contact between the contact surface 127 of the open tab 109a and the lower tang 210 actuates the actuator assembly 200. The contact between the contact surface 127 of the open tab 109a and the lower tang 210 transfers torque from the carousel 100 to the yoke 202. Upon receiving torque, the yoke 202 is rotated in the same direction as the carousel 100. Rotation of the yoke 202 results in the same rotation of the rotatable mount 204. Rotation from the rotatable mount 204 results in torque being transferred to and rotating the disc 214. Rotation of the disc 214 also results in rotation of the ramped surface 216. The ramped surface 216 is rotated into a position which raises pusher 218. Upon raising pusher 218, the valve assembly 56 is opened. Upon the valve assembly 56 being opened, liquid is dispensed from the fresh tank 50 into the reservoir 24.

The bypass ramp 128 of the close tab 109b is configured to contact the rounded side of the upper tang 208 when rotating in a first direction D1. Contact between the bypass ramp 128 and the rounded side of the upper tang 208 pivots the yoke 202 about pin 206. The yoke 202 is rotated such that the tangs 208 and 210 rotate upward and the yoke 202 compresses the spring 220. The rotation of the upper tang 208 allows the open tab 109a to bypass the yoke 202. After the close tang 109b bypasses the yoke 202, the spring 220 biases the yoke 202 back to a resting position.

The actuation surface 127 of the close tab 109b is configured to contact a flat side of the upper tang 208. The contact occurs when the carousel 100 is rotated in an opposite direction. The opposite direction is a second direction D2 and opposite of the first direction D1. The contact between the contact surface 127 of the close tab 109b and the upper tang 208 actuates the actuator assembly 200. The contact between the contact surface 127 of the close tab 109b and the upper tang 208 transfers torque from the carousel 100 to the yoke 202. Upon receiving the torque from the carousel, the yoke 202 is rotated in a same direction. Rotation of the yoke 202 by the close tab 109b is in the opposite direction as by the open tab 109a. Rotation of the yoke 202 results in the same rotation of the rotatable mount 204. Rotation from the rotatable mount 204 is transferred to and rotates the disc 214. Rotation of the disc 214 also results in rotation of the ramped surface 216 and non-ramped surface 217. The ramped surface 216 and non-ramped surface 217 are rotated into a position which lowers pusher 218. Upon lowering pusher 218, the valve assembly 56 is closed. Upon the valve assembly 56 (not shown) closing, the liquid from the fresh tank 50 is prevented from being dispensed and is sealed within the fresh tank by the valve assembly 56.

The bypass ramp 128 of the open tab 109a is configured to contact the rounded side of the lower tang 210 when rotating in a second direction D2. Contact between the bypass ramp 128 and the rounded side of the lower tang 210 pivots the yoke 202 about pin 206. The yoke 202 is rotated such that the tangs 208 and 210 rotate upward and the yoke 202 compresses the spring 220. The rotation of the lower tang 210 allows the open tab 109a to bypass the yoke 202. After the open tab 109a bypasses the yoke 202, the spring 220 biases the yoke 202 back to a resting position.

Example B: Actuator Assembly

With reference to the exemplary teachings of FIGS. 14 and 23-35.

FIGS. 23-27 illustrates the actuator assembly 200 and valve assembly 56 in an open position OP. In the open position, the rotatable mount 204 is rotated in an opening direction OP. Rotation of the rotatable mount is stopped by a stop 226. The rotation of the rotatable mount 204 drives the disc 214. Rotation of the disc 214 moves the ramped surface 216 and the non-ramped surface 217. The ramped surface 217 is rotated toward the extensions 220. The non-ramped surface 217 is rotated away from the extensions 220. As the ramped surface 216 is rotated toward the extensions 220, the extensions 220 are elevated to the highest portion of the ramped surface 216. Elevating of the extensions 220 results in the pusher 218 being pushed upwards. The pusher 218 being pushed upwards results in the actuator assembly 200 being in the open position OP. The raising of the pusher 218 drives the valve assembly 56 into an open position OP.

To be moved into a closed position (not shown), the rotatable mount 204 is rotated in a closing direction CD. The closing direction CD is opposite the opening direction OD. The rotatable mount 204 is prevented from over-rotating by a stop 226. The rotation of the rotatable mount 204 drives the disc 214. Rotation of the disc 214 moves the ramped surface 216 and non-ramped surface 217. The ramped surface 216 is rotated away from the extensions 220. The non-ramped surface 217 is rotated toward the extensions 220. As the non-ramped surface 217 is rotated toward the extensions 220, the extensions 220 are lowered to the non-ramped surface 217. This lowering results in the pusher 218 lowering and resting on the non-ramped surface 217 and the actuator assembly 200 in the closed position. The lowering of the pusher 218 then drives the valve assembly 56 (not shown) into a closed position.

Rotation of the actuator assembly 200 is caused by the carousel 100. The carousel includes tabs 109 (such as shown in FIGS. 32-35). The contact surfaces 127 of the tabs 109 during rotation of the carousel 100 contact and push respective tangs 208, 210 until contact is broken and/or the rotatable mount 204 contacts one or more stops 226. One or more stops 226 prevent further rotation of the rotatable mount 204. Torque upon the tangs 208, 210 via the tabs 109 results in rotation of the rotatable mount. Rotation of the rotatable mount 204 drives the disc 214.

When the actuator assembly 200 is rotated into the closed position, the pusher 218 moves into a lowered position. In the lowered position, the pusher 218 sits on the non-ramped surface 217 of the disc 214. The pusher 218 in the lowered position allows for the valve assembly 56 to be fully seated within a fill opening 55 of a fill extension 54. To be fully seated, the seal 57 rests on the valve seat 125 and has an interference fit with the fill opening 55. By being fully seated in the fill opening 55, the valve assembly 56 seals the fresh tank 50 such that liquid remains within the fresh tank 50 and is prevented from entering the reservoir 24.

When the actuator assembly 200 is rotated into the open position OP, the pusher 218 moves into a lifted position. In the lifted position, the pusher 218 sits on the ramped surface 216 of the disc 214. The pusher 218 in the lifted position drives the valve assembly 56 past the fill opening 55 and further into the fresh tank 50. A gap results between the seal 57 and the valve seat 125. This gap allows for liquid within the fresh tank 50 to drain into the reservoir 24.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A liquid dispensing device comprising:
   a) a serving bowl configured to retain a liquid for consumption by an animal;
   b) a fresh tank configured to store a fresh liquid therein;
   c) a used tank configured to store a used liquid therein, wherein the used liquid is at least some of the liquid which has already been available for consumption by the animal;
   d) a reservoir located within an interior of the liquid dispensing device which is configured to receive the fresh liquid, a filtered liquid, the used liquid, or any combination thereof;
   e) one or more carousels having one or more circulation tubs and one or more empty tubs, wherein the one or more carousels are located at least partially within the reservoir, and wherein the one or more carousels are configured to rotate about a rotational axis of the one or more carousels in a first direction and in a second direction opposing the first direction; and
   f) a drive unit configured to drive rotation of the one or more carousels in the first direction and the second direction, wherein the drive unit includes a drive source which is a motor.

2. The liquid dispensing device of claim 1, wherein the one or more carousels are configured such that when rotated in the first direction, the one or more carousels recirculate the liquid from the reservoir into the serving bowl.

3. The liquid dispensing device of claim 2, wherein the one or more carousels are configured such that when rotated in the second direction, the one or more carousels dispose of the used liquid from the reservoir into the used tank.

4. The liquid dispensing device of claim 1, wherein the fresh tank includes a valve assembly configured to seal the fresh tank when in a closed position and open the fresh tank when in an open position.

5. The liquid dispensing device of claim 4, wherein the liquid dispensing device includes an actuator assembly which is configured to move the valve assembly into the open position, the closed position, or both.

6. The liquid dispensing device of claim 5, wherein the actuator assembly is an electrical, mechanical, and/or electromechanical actuator assembly.

7. The liquid dispensing device of claim 5, wherein the actuator assembly includes a yoke which is configured to receive torque in one or more directions from the one or more carousels; and
   wherein yoke includes one or more tangs projecting therefrom.

8. The liquid dispensing device of claim 7, wherein the one or more tangs are two tangs which bifurcate from a body of the yoke.

9. The liquid dispensing device of claim 7, wherein the one or more carousels includes one or more tabs; and
   wherein the one or more tangs are configured to come into contact with and receive torque from the one or more tabs of the one or more carousels.

10. The liquid dispensing device of claim 9, wherein the one or more tabs are located on an interior and/or bottom surface of the one or more carousels; and
   wherein the one or more tabs are two tabs and the two tabs are spaced from and offset from one another.

11. The liquid dispensing device of claim 7, wherein rotation of the one or more carousels in the first direction applies torque to the one or more tangs in a first direction, and rotation of the one or more carousels in the second direction applies torque to the one or more tangs in a second direction.

12. The liquid dispensing device of claim 7, wherein the yoke is affixed to a rotatable mount such that upon receiving the first or second direction of torque, the rotatable mount rotates in a first direction or a second direction.

13. The liquid dispensing device of claim 1, wherein the liquid dispensing device includes one or more filters; and wherein the one or more filters are configured to filter the liquid which passes therethrough when flowing from the serving bowl toward the reservoir.

14. The liquid dispensing device of claim 1, wherein the serving bowl includes one or more drains, perforations, or both.

15. The liquid dispensing device of claim 1, wherein the one or more circulation tubs is a plurality of circulation tubs and the one or more empty tubs is a plurality of empty tubs.

16. The liquid dispensing device of claim 15, wherein the plurality of circulation tubs and the plurality of empty tubs are arranged in an alternating fashion.

17. The liquid dispensing device of claim 15, wherein the plurality of circulation tubs and the plurality of empty tubs are arranged in a radial fashion about the one or more carousels.

18. The liquid dispensing device of claim 1, wherein the one or more circulation tubs, the one or more empty tubs, or both include one or more tub openings; and wherein the one or more tub openings are configured to allow the fresh liquid and/or the used liquid to flow into the one or more circulation tubs, the one or more empty tubs, or both from the reservoir as the one or more circulation tubs, the one or more empty tubs, or both pass through the reservoir storing the fresh liquid and/or the used liquid therein.

19. The liquid dispensing device of claim 1, wherein the drive unit includes one or more gears, and wherein the one or more gears are one or more drive gears which are engaged with and drive rotation of the one or more carousels in the first direction, the second direction, or both.

20. The liquid dispensing device of claim 1, wherein the one or more carousels include a track, a hub, or both.

21. The liquid dispensing device of claim 1, wherein the liquid dispensing device includes one or more sensing devices, and wherein the one or more sensing devices are configured to sense an amount of liquid within the fresh tank, the used tank, the serving bowl, the reservoir, the liquid dispensing device as a whole or any combination thereof.

22. The liquid dispensing device of claim 1, wherein the liquid dispensing device includes one or more sterilizing elements.

23. The liquid dispensing device of claim 1, wherein the used tank includes a drain opening sealed by a stopper valve assembly.

24. A liquid dispensing, circulating, and emptying device comprising:

a) a serving bowl which is removable and configured to allow a liquid to pass therethrough, and configured to retain the liquid for consumption by an animal;

b) one or more filters in fluid communication with the serving bowl;

c) a reservoir configured to retain the liquid and communicate the liquid from the serving bowl to a carousel;

d) a fresh tank configured to store a fresh liquid therein;

e) a used tank configured to store a used liquid therein, wherein the used liquid is the liquid which has already been available for consumption by the animal;

f) the carousel having one or more circulation tubs and one or more emptying tubs, wherein the carousel is configured to rotate about its rotational axis in a first direction and in a second direction opposing the first direction, wherein the carousel is located at least partially within the reservoir; and g) a drive unit configured to drive rotation of the carousel in the first direction and the second direction, and wherein the drive unit includes a drive source which is a motor.

25. A method of operating a liquid dispensing device comprising:

a) rotating a carousel in a first direction to cause an actuator assembly to move a valve assembly in a fresh tank into an open position such that a fresh liquid flows into a reservoir;

b) the fresh liquid, and a used liquid, flowing into a plurality of circulation tubs of the carousel while rotating in the first direction via one or more tub openings; and c) the fresh liquid, and the used liquid, flowing out of the plurality of circulation tubs into a spout funnel and through a spout into a serving bowl;

d) rotating the carousel in a second direction opposite the first direction to cause the actuator assembly to move the valve assembly into a closed position such that the fresh liquid stops flowing into the reservoir and the reservoir is filled with the used liquid;

e) the used liquid flowing into a plurality of empty tubs of the carousel while rotating in the second direction via the one or more tub openings; and f) the used liquid flowing out of the plurality of empty tubs toward and into a used tank.

* * * * *